US006544604B2

(12) United States Patent
Matsui et al.

(10) Patent No.: US 6,544,604 B2
(45) Date of Patent: Apr. 8, 2003

(54) LIQUID CRYSTALLINE COMPOUND HAVING DIFLUOROPROPYLENEOXY GROUP AS BONDING GROUP, LIQUID CRYSTAL COMPOSITION AND LIQUID CRYSTAL DISPLAY ELEMENT

(75) Inventors: Shuichi Matsui, Ichihara (JP); Yasuyuki Sasada, Ichihara (JP); Kazutoshi Miyazawa, Ichihara (JP); Hiroyuki Takeuchi, Ichihara (JP); Katsuyuki Kawano, Ichihara (JP); Yasuhiro Kubo, Ichihara (JP); Etsuo Nakagawa, Ichihara (JP); Mayumi Furuya, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 09/925,484

(22) Filed: Aug. 10, 2001

(65) Prior Publication Data

US 2002/0119260 A1 Aug. 29, 2002

(30) Foreign Application Priority Data

Aug. 10, 2000 (JP) ....................................... 2000-241998
Apr. 18, 2001 (JP) ....................................... 2001-119215

(51) Int. Cl.[7] ........................ C09K 19/34; C09K 19/30; C09K 19/20; C07D 239/02; C07D 495/00; C07D 319/06; C07C 69/76; C07C 25/13

(52) U.S. Cl. .............. 428/1.1; 252/299.61; 252/299.63; 252/299.66; 252/299.67; 544/335; 549/11; 549/369; 560/65; 570/127; 570/144; 570/129

(58) Field of Search ....................... 252/299.61, 299.63, 252/299.66, 299.67; 570/127, 129, 144; 428/1.1; 560/65; 549/369, 11; 544/335

(56) References Cited

U.S. PATENT DOCUMENTS 5,032,313 A 7/1991 Goto et al.
5,045,229 A 9/1991 Bartmann et al.
6,007,740 A 12/1999 Andou et al.

FOREIGN PATENT DOCUMENTS

EP 0 893 423 1/1999
JP 2-233626 9/1990
JP 5-112778 5/1993

OTHER PUBLICATIONS

Deuling, H.J. "Deformation Pattern of Twisted Nematic Liquid Crystal Layers in an Electric Field", Mol. Cryst. Liq. Cryst., vol. 27 (1975), pp. 81–93.
Reiffenrath, V., et al. "New liquid–crystalline compounds with negative dielectric anisotropy", Liquid Crystals, vol. 5, No. 1 (1989), pp. 159–170.
Abstract of JP 10204016.

*Primary Examiner*—Shean C. Wu
(74) *Attorney, Agent, or Firm*—Wenderoth, Lind & Ponack, L.L.P.

(57) ABSTRACT

The present invention provides a liquid crystalline compound having a difluoropropyleneoxy group as a bonding group, which is represented by Formula (1):

(1)

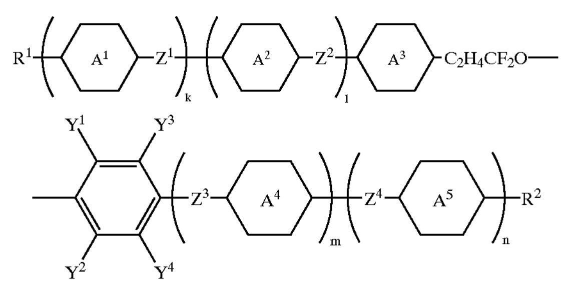

wherein $R^1$ and $R^2$ each independently represent hydrogen, halogen, a cyano group or an alkyl group having 1 to 20 carbon atoms; rings $A^1$ to $A^5$ each independently represent a 1,4-cyclohexylene group, a 1,4-cyclohexenylene group or a 1,4-phenylene group; $Z^1$ to $Z^4$ each independently represent a single bond, —$CH_2CH_2$—, —$CH_2O$—, —$OCH_2$—, —COO—, —OCO—, —CH=CH—, —C≡C—, —$CF_2O$— or —$OCF_2$—; $Y^1$, $Y^2$, $Y^3$ and $Y^4$ each independently represent hydrogen or fluorine; and k, l, m and n each independently represent 0 or 1. This liquid crystalline compound has a large absolute value (|Δε|) of a dielectric anisotropy and shows a relatively small refractive anisotropy. The present invention further provides a liquid crystal composition comprising this compound which makes it possible to drive display elements of various modes at a low voltage, and a liquid crystal display element containing this liquid crystal composition.

25 Claims, No Drawings

LIQUID CRYSTALLINE COMPOUND HAVING DIFLUOROPROPYLENEOXY GROUP AS BONDING GROUP, LIQUID CRYSTAL COMPOSITION AND LIQUID CRYSTAL DISPLAY ELEMENT

FIELD OF THE INVENTION

The present invention relates to a liquid crystalline compound and a liquid crystal composition, more specifically, to a liquid crystalline compound having a difluoropropyleneoxy group as a bonding group, which shows physical properties particularly suited as a component of a liquid crystal composition for a TN mode, an STN mode, a TFT mode and an OCB mode, a liquid crystal composition comprising the same and a liquid crystal display element containing this liquid crystal composition. A liquid crystalline compound herein means a compound showing a liquid crystal phase and also a compound which does not show a liquid crystal phase but is useful as a component of a liquid crystal composition.

BACKGROUND OF THE INVENTION

A liquid crystal display element makes use of optical anisotropy and dielectric anisotropy of a liquid crystal substance and is classified into various modes such as a twisted nematic (TN) mode, a dynamic scattering (DS) mode, a guest-host (GH) mode, a "deformation of aligned phases (DAP)" mode, a super twisted nematic (STN) mode, a voltage controlling birefringence (VCB, ECB or TB) mode, a vertical alignment (VA) mode, a multidomain vertical alignment (MVA) mode and an OCB mode according to a display mode thereof. Liquid crystal substances suited to the respective modes have different properties.

All liquid crystal substances, regardless of the modes, are required to have the following properties:

1) stability to external environmental factors such as moisture, air, heat and light;
2) a liquid crystal phase in a wide temperature range around room temperature;
3) a low viscosity;
4) a reduced driving voltage when driving a display element;
5) a suitable dielectric anisotropy ($\Delta\epsilon$); and
6) a suitable refractive anisotropy ($\epsilon$n).

Under the present circumstances, however, any single compound satisfying all the above characteristics is not available, and several to twenty or more kinds of liquid crystalline compounds are mixed to prepare a liquid crystal composition, which is used for a liquid crystal display element.

Accordingly, liquid crystalline compounds used as components of a composition have to show good compatibility with each other. Recently, they have been required to be used under various environments, and therefore, to have a good compatibility particularly at a very low temperature.

In recent years, a liquid crystal display element has been required to show higher display performances in a contrast, a display volume, a response time, and the like. In order to meet the requirement, there has been a demand for a display element of an active matrix mode represented by a TFT (thin film transistor) mode mainly in the fields of televisions and viewfinders.

A display element of an STN mode is produced in a simple process at a low cost while having a large display volume, so that it is generally used in the display fields of portable telephones, personal computers and the like.

A recent development in these fields has mainly been in miniaturization and portability of liquid crystal display elements as seen in TV and note type personal computers. Accordingly, liquid crystalline compounds having a low driving voltage, i.e., those which can reduce a threshold voltage, and liquid crystal compositions having a low threshold voltage which comprise the above compounds have been required as liquid crystal materials used in this case.

As known well, a threshold voltage (Vth) is shown by the following equation (H. J. Deuling, et al., Mol.

Cryst. Liq. Cryst., 27 (1975) 81):

$$Vth=\pi(K/\epsilon 0\Delta\epsilon)^{1/2}$$

wherein K is an elastic constant of a liquid crystal material, and $\epsilon 0$ is a dielectric constant in vacuo.

As seen from the above equation, increasing $\Delta\epsilon$ or decreasing K can be considered as a method for reducing Vth. However, it is still difficult to actually control an elastic constant K of a liquid crystal material by conventional techniques, and a liquid crystal material having large $\Delta\epsilon$ has generally been used to meet the requirement. Under such circumstances, liquid crystalline compounds having large As have actively been developed.

As a well-known method for increasing $\Delta\epsilon$ in a liquid crystalline compound, a substituent having a large hi dipole moment such as a cyano group and a trifluoromethyl group may be introduced as a terminal group of the molecule. Also effective is a method of substituting a 1,4-phenylene group constituting the compound with fluorine so that the dipole moment turns toward the same molecular axis direction as a dipole moment in a terminal group. In general, however, the number of fluorine substituted on a 1,4-phenylene group is relative to the viscosity, and a clearing point of the compound is reduced as the number of substituted fluorine increases. Accordingly, it has so far been considered difficult to elevate only $\Delta\epsilon$ while preventing both rise in the viscosity and reduction in the clearing point.

In recent years, liquid crystal display elements have become widely used in information terminals and portable games. These display elements are driven by batteries, and therefore, it is requested that the threshold voltage is low and the power consumption is low from a viewpoint of use for long time. Particularly in order to reduce a power consumption of an element itself, a reflective display element not requiring backlight has actively been developed recently, and increase in use thereof for portable telephones is anticipated. Liquid crystal compositions used for these reflective display elements are required to have a small refractive anisotropy ($\Delta$n) as well as a low threshold voltage. Accordingly, it is important in this field to develop a liquid crystalline compound having a-large dielectric anisotropy and a small refractive anisotropy as a liquid crystal material constituting the composition. The following compounds (13) and (14) (JP-A 2-233626) can be shown as a representative liquid crystal material for driving a display element at a low voltage, which is used for a liquid crystal display element of a TFT mode:

(13)

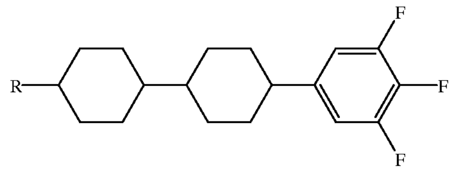

(14)

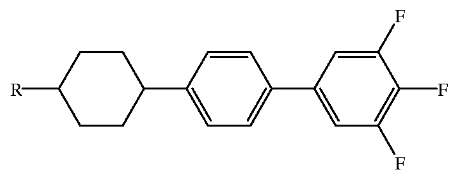

wherein R represents an alkyl group.

Both the compounds (13) and (14) have a 3,4,5-trifluorophenyl group at a terminal of a molecule and are expected as a liquid crystal material for driving a display element at a low voltage. However, the compound (13) has a small dielectric anisotropy (Δε=about 10) for use in the reflective display element described above, and the compound (14) has a satisfactory dielectric anisotropy (Δε=about 12) but has a large refractive anisotropy of about 0.12, so that it is considered difficult to prepare a liquid crystal composition which can sufficiently satisfy the above requirements by using these compounds.

In recent years, novel modes such as an in-plain switching (IPS) mode, a vertical alignment (VA) mode, a multidomain vertical alignment (MVA) mode and an OCB mode have been developed as a mode for overcoming a narrow view angle which is the largest problem of a liquid crystal display element. Among these modes, the VA mode and the MVA mode are particularly excellent in response and have a wide view angle, and further, a high contrast, so that they have been actively developed by respective display makers. Liquid crystal compositions used for the liquid crystal display elements of these modes are characterized in that they have a relatively small refractive anisotropy and a negative dielectric anisotropy. For example, the following compound (15) is reported as a compound showing a large negative dielectric anisotropy (V. Reiffenrath et al., Liq. Cryst., 5 (1), 159 (1989)).

(15)

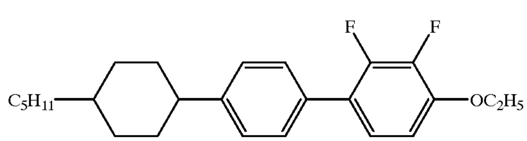

It can be found from the above literature that the compound (15) shows a large negative dielectric anisotropy (Δε=−4.1), but it has a large refractive anisotropy (Δn=0.18). Accordingly, it is anticipated that the above compound hardly satisfies the requirements of the VA mode or the MVA mode described above.

As explained above, a liquid crystalline compound having a large positive or negative dielectric anisotropy and showing a relatively small refractive anisotropy has been desired.

SUMMARY OF THE INVENTION

An object of the present invention is to overcome the disadvantages of conventional techniques described above and provide a liquid crystalline compound which has a large absolute value (|Δε|) of a dielectric anisotropy and shows a relatively small refractive anisotropy, a liquid crystal composition comprising this compound which makes it possible to drive display elements of various modes at a low voltage, and a liquid crystal display element containing this liquid crystal composition.

The present inventors have made intensive investigations in order to achieve the above object and, as a result, found that the compound having a difluoropropyleneoxy group as a bonding group represented by Formula (1) has a large absolute value (|Δε|) of a dielectric anisotropy and shows a relatively small refractive anisotropy. Further, they have found that a liquid crystal composition comprising this compound is the most suitable material for driving various liquid crystal display elements at a low voltage, and thus completed the present invention.

The present invention comprises the followings.

The first aspect of the present invention relates to:

[1] A liquid crystalline compound represented by Formula (1):

(1)

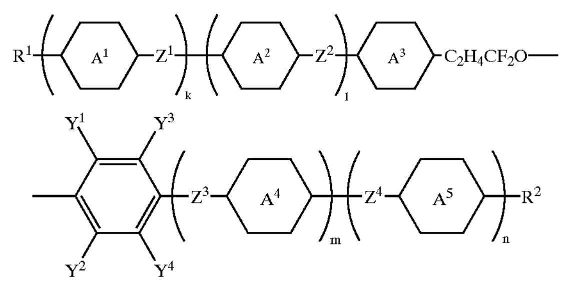

wherein $R^1$ and $R^2$ each independently represent hydrogen, halogen, a cyano group or an alkyl group having 1 to 20 carbon atoms, in which at least one —$CH_2$— may be substituted with —CH═CH—, —C≡C—, —O— or —S— but —O— is not adjacent to another —O—, and in which at least one hydrogen may be substituted with halogen; rings $A^1$ to $A^5$ each independently represent a 1,4-cyclohexylene group in which at least one —$CH_2$— not adjacent to each other may be substituted with —O— or —S—, a 1,4-cyclohexenylene group, or a 1,4-phenylene group in which at least one ═CH— may be substituted with ═N— and hydrogen on the ring may be substituted with halogen; $Z^1$ to $Z^4$ each independently represent a single bond, —$CH_2CH_2$—, —$CH_2O$—, —$OCH_2$—, —COO—, —OCO—, —CH═CH—, —C≡C—, —$CF_2O$— or —$OCF_2$—; $Y^1$, $Y^2$, $Y^3$ and $Y^4$ each independently represent hydrogen or fluorine; and k, l, m and n each independently represent 0 or 1.

The first embodiment of the present invention is described in the following items [2] to [13].

[2] The liquid crystalline compound represented by Formula (1-1) to (1-6):

(1-1)

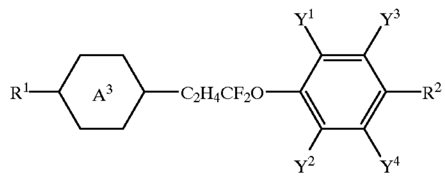

(1-2)

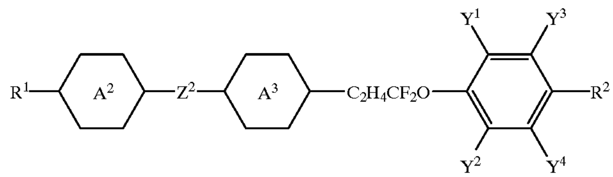

(1-3)

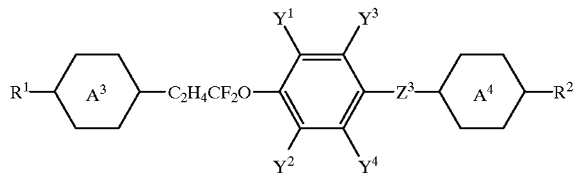

(1-4)

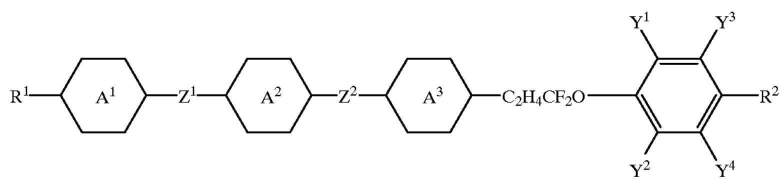

(1-5)

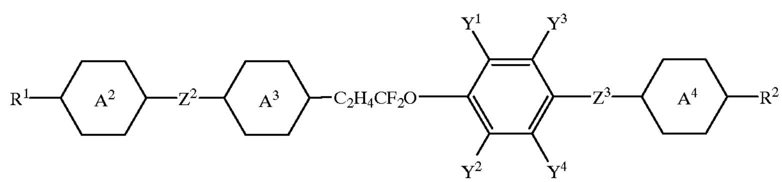

(1-6)

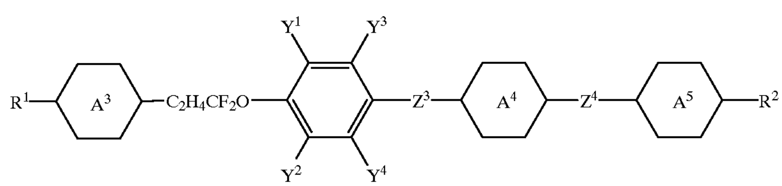

wherein $R^1$, $R^2$, rings $A^1$ to $A^5$, $Z^1$ to $Z^4$ and $Y^1$ to $Y^4$ have the same meanings as described above.

[3] The liquid crystalline compound of Formula (1), wherein ring $A^3$ is a 1,4-cyclohexylene group.

[4] The liquid crystalline compound of Formula (1), wherein both yl and $Y^3$ are fluorine atoms, and both $Y^2$ and $Y^4$ are hydrogens.

[5] The liquid crystalline compound of Formula (1), wherein both $y^1$ and $Y^2$ are hydrogens.

[6] The liquid crystalline compound of Formula (1-1), wherein ring $A^3$ is a 1,4-cyclohexylene group, both $Y^1$ and $Y^3$ are fluorines, and both $Y^2$ and $Y^4$ are hydrogens.

[7] The liquid crystalline compound of Formula (1-1), wherein ring $A^3$ is a 1,4-cyclohexylene group, and both $Y^1$ and Y2 are hydrogens.

[8] The liquid crystalline compound of Formula (1-2), wherein both ring $A^2$ and ring $A^3$ are 1,4-cyclohexylene groups, both $Y^1$ and $Y^3$ are fluorines, and both $Y^2$ and $Y^4$ are hydrogens.

[9] The liquid crystalline compound of Formula (1-2), wherein both ring $A^2$ and ring $A^3$ are 1,4-cyclohexylene groups, both $Y^1$ and $Y^3$ are hydrogens, both $Y^2$ and $Y^4$ are fluorines, and $R^2$ is an alkoxy group.

[10] The liquid crystalline compound of Formula (1-2), wherein both ring $A^2$ and ring $A^3$ are 1,4-cyclohexylene groups; and both $Y^1$ and $Y^2$ are hydrogens.

[11] The liquid crystalline compound of Formula (1-2), wherein both ring $A^2$ and ring $A^3$ are 1,4-cyclohexylene groups, both $Y^1$ and $Y^2$ are hydrogens, both $Y^3$ and $Y^4$ are fluorines, and $R^2$ is fluorine.

[12] The liquid crystalline compound of Formula (1-2), wherein both ring $A^2$ and ring $A^3$ are 1,4-phenylene groups in which hydrogen on the ring may be substituted with fluorine, $Z^2$ is a single bond, both $Y^1$ and $Y^2$ are hydrogens, both $Y^3$ and $Y^4$ are fluorines, and $R^2$ is fluorine.

[13] The liquid crystalline compound of Formula (1-3), wherein ring $A^3$ is a 2,3-difluoro-1,4-phenylene group.

The second aspect of the present invention relates to:

[14] A liquid crystal composition comprising at least one liquid crystalline compound as described in any one of the items [1] to [13]. The embodiment thereof is described in the following items [15] to [21].

[15] The liquid crystal composition as described in the item [14], further comprising at least one compound selected from the group consisting of compounds represented by Formulas (2), (3) and (4) as a second component:

(2)

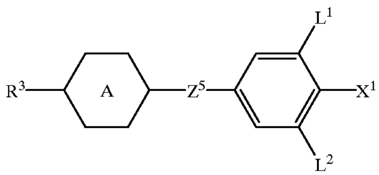

(3)

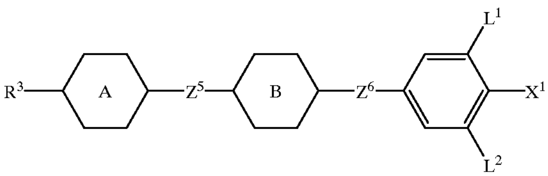

(4)

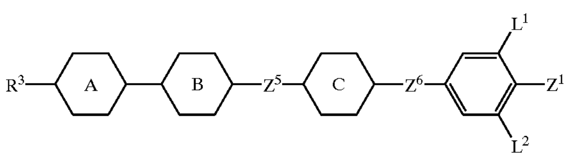

wherein $R^3$ represents an alkyl group having 1 to 10 carbon atoms, in which any —$CH_2$— not adjacent to each other may be substituted with —O— or —CH═CH— and any hydrogen may be substituted with fluorine; $X^1$ represents fluorine, chlorine, —$OCF_3$, —$OCF_2H$, —CF —$CF_2H$, —$CFH_2$, —$OCF_2CF$ $OCF_2CFHCF_3$; $L^1$ and $L^2$ each independently represent hydrogen or fluorine; $Z^5$ and $Z^6$ each independently represent —$(CH_2)_2$—, —$(CH_2)_4$—, —COO—, —$CF_2O$—, —$OCF_2$—, —CH═CH— or a single bond; rings A and B each independently represent 1,4-cyclohexylene, 1,3-dioxane-2,5-diyl, or 1,4-phenylene in which hydrogen may be substituted with fluorine; and ring C represents 1,4-cyclohexylene, or 1,4-phenylene in which hydrogen may be substituted with fluorine.

[16] The liquid crystal composition as described in the item [14], further comprising at least one compound selected from the group consisting of compounds represented by Formulas (5) and (6) as a second component:

(5)

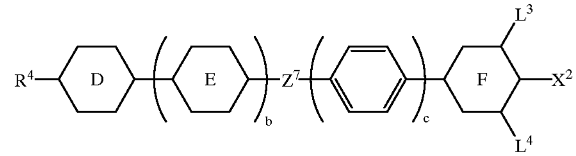

(6)

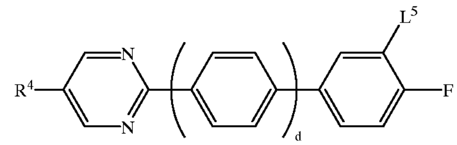

wherein $R^4$ and $R^5$ each independently represent an alkyl group having 1 to 10 carbon atoms, in which any —$CH_2$— not adjacent to each other may be substituted with —O— or —CH═CH— and any hydrogen may be substituted with fluorine; $X^2$ represents —CN or —C≡—C—CN; ring D represents 1,4-cyclohexylene, 1,4-phenylene, 1,3-dioxane-2,5-diyl or pyrimidine-2,5-diyl; ring E represents 1,4-cyclohexylene, 1,4-phenylene in which hydrogen may be substituted with fluorine, or pyrimidine-2,5-diyl; ring F represents 1,4-cyclohexylene or 1,4-phenylene; $Z^7$ represents —$(CH_2)_2$—, —COO—, —$CF_2O$—, —$OCF_2$— or a single bond; $L^3$, $L^4$ and $L^5$ each independently represent hydrogen or fluorine; and b, c and d each independently represent 0 or 1.

[17] The liquid crystal composition as described in the item [14], further comprising at least one compound selected from the group consisting of compounds represented by Formulas (7), (8) and (9) as a second component:

(7)

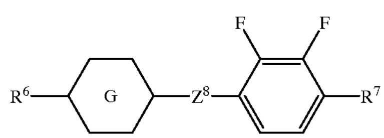

(8)

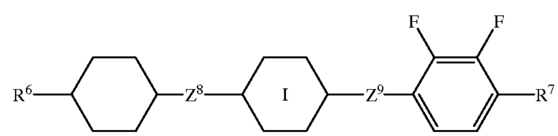

(9)

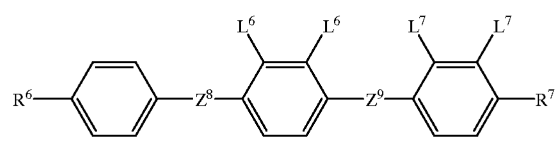

wherein $R^6$ and $R^7$ each independently represent an alkyl group having 1 to10 carbon atoms, in which any —$CH_2$— not adjacent to each other may be substituted with —O— or —CH═CH— and any hydrogen may be substituted with fluorine; rings G and I each independently represent 1,4-cyclohexylene or 1,4-phenylene; $L^6$ and $L^7$ each independently represent hydrogen or fluorine, but L6 and $L^7$ are not hydrogens at the same time; and $Z^8$ and $Z^9$ each independently represent —$(CH_2)_2$—, —COO— or a single bond.

[18] The liquid crystal composition as described in the item [14], further comprising at least one compound selected from the group consisting of the compounds represented by Formulas (2), (3) and (4) as a second component and at least one compound selected from the group consisting of compounds represented by Formulas (10), (11) and (12) as a third component:

(10)

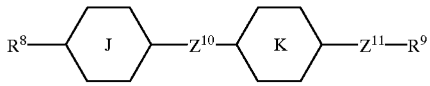

(11)

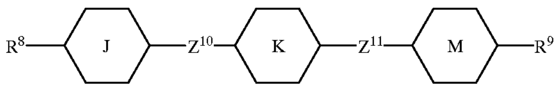

(12)

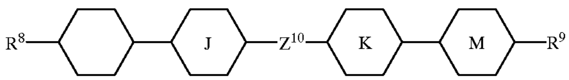

wherein $R^8$ and $R^9$ each independently represent an alkyl group having 1 to 10 carbon atoms, in which any —$CH_2$— not adjacent to each other may be substituted with —O— or —CH═CH— and any hydrogen may be substituted with fluorine; rings J, K and M each independently represent 1,4-cyclohexylene, pyrimidine-2,5-diyl, or 1,4-phenylene in which hydrogen may be substituted with fluorine; and $Z^{10}$ and $Z^{11}$ each independently represent —C≡—C—, —COO—, —$(CH_2)_2$—, —CH═CH— or a single bond.

[19] The liquid crystal composition as described in the item [14], further comprising at least one compound selected from the group consisting of the compounds represented by Formulas (5) and (6) as a second component and at least one compound selected from the group consisting of the compounds represented by Formulas (10), (11) and (12) as a third component.

[20] The liquid crystal composition as described in the item [14], further comprising at least one compound selected from the group consisting of the compounds represented by Formulas (7), (8) and (9) as a second component and at least one compound selected from the group consisting of the compounds represented by Formulas (10), (11) and (12) as a third component.

[21] The liquid crystal composition as described in the item [14], further comprising at least one compound selected from the group consisting of the compounds represented by Formulas (2), (3) and (4) as a second component, at least one compound selected from the group consisting of the compounds represented by Formulas (5) and (6) as a third component and at least one compound selected from the group consisting of the compounds represented by Formulas (10), (11) and (12) as a fourth component.

The third aspect of the present invention relates to:

[22] A liquid crystal composition comprising at least one liquid crystal composition as described in any one of the items [14] to [21], and further, at least one optically active compound.

The fourth aspect of the present invention relates to:

[23] A liquid crystal display element comprising the liquid crystal composition as described in any one of the items [14] to [22].

DETAILED DESCRIPTION OF THE INVENTION

The compound of the present invention represented by Formula (1) is characterized by having a moiety in which —O— in a difluoropropyleneoxy group is bonded directly to a 1,4-phenylene group which may be substituted with fluorine. The compound of Formula (1) in which ring $A^3$ is a 1,4-cyclohexylene group has a high clearing point, and the compound in which ring $A^3$ is a 1,4-phenylene group has a large absolute value of dielectric anisotropy. Further, the compound of Formula (1) in which both $Y^1$ and $Y^2$ are hydrogens shows a neutral or positive dielectric anisotropy. Especially, the compound in which at least one of $Y^3$ and $Y^4$ is fluorine shows a large positive dielectric anisotropy. For example, the compound of the present invention (compound No. 40) shown in the example described later has a dielectric anisotropy $\Delta\epsilon$ of 13.7, which is a much larger value than that of a compound in which a bonding group corresponding to a difluoropropyleneoxy group is a single bond ((13-1): $\Delta\epsilon$=9.7).

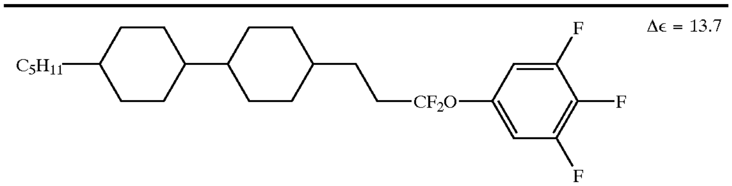

$\Delta\epsilon = 13.7$ (Compound No. 40)

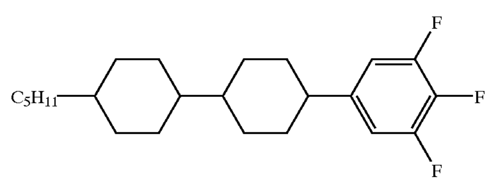

$\Delta\epsilon = 9.7$ (13-1)

On the other hand, the compound of Formula (1) in which both $Y^1$ and $Y^3$ are fluorines and both $Y^2$ and $Y^4$ are hydrogens shows a large negative dielectric anisotropy. Further, the compound of Formula (1) shows almost the same refractive anisotropy, while having a high clearing point, as compared with the compound in which a bonding group corresponding to a difluoropropyleneoxy group in the present invention is a single bond. As seen from these matters, the compound of Formula (1) has suitable characteristics as a liquid crystalline compound constituting a liquid crystal composition for a VA mode or an MVA mode as well as a reflective liquid crystal display element described in the Background of the Invention.

Compounds having a difluoropropyleneoxy group as a bonding group are partly described in WO97/37959 and represented by a general Formula similar to that of the present invention, but any structural Formula or physical properties of a specific compound is not disclosed. The excellent characteristics of the compound of the present invention described above have newly been found by the present inventors.

The liquid crystalline compound represented by Formula (1) is classified into the group of the compounds represented by Formulas (1-1) to (1-6) by suitably selecting k, l, m and n:

(1-1)

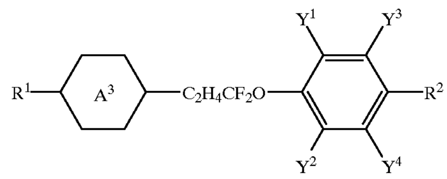

(1-2)

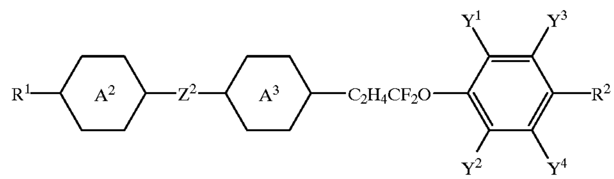

(1-3)

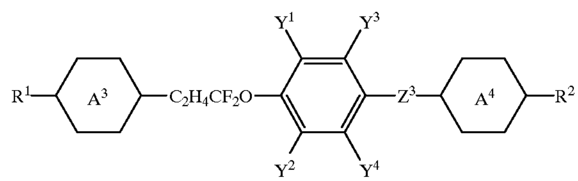

(1-4)

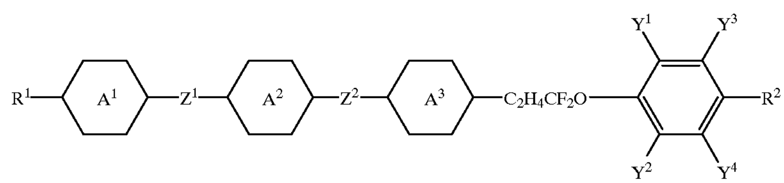

(1-5)

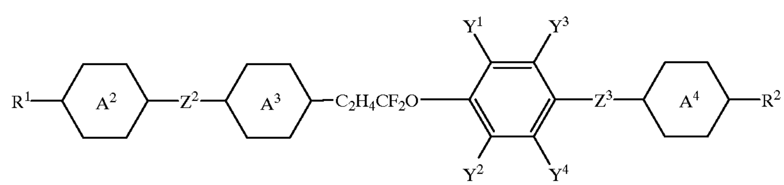

(1-6)

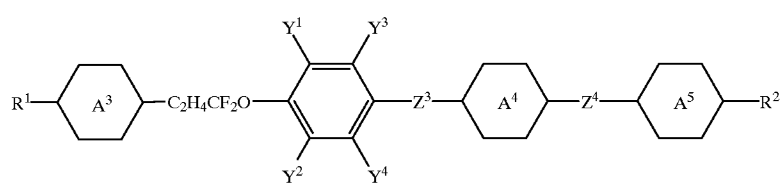

wherein $R^1$, $R^2$, rings $A^1$ to $A^5$, $Z^1$ to $Z^4$ and $Y^1$ to $Y^4$ have the same meanings as described above.

Among these compounds of more specific concept, a compound of two-ring system represented by Formula (1-1) has a relatively large absolute value of $\Delta\epsilon$ and a relatively small $\Delta n$, and it has a low viscosity and a good compatibility at low temperature. When this compound is used as a component for a liquid crystal composition, a viscosity of the composition can be reduced while maintaining an absolute value of $\Delta\epsilon$ thereof, and therefore, a liquid crystal composition for high-speed response can be provided.

Further, a compound of three-ring system represented by Formula (1-2) or (1-3) has a large absolute value of $\Delta\epsilon$ and a relatively small $\Delta n$, and it shows a liquid crystal phase in a relatively wide temperature range. This compound as a component for a liquid crystal composition can elevate an absolute value of $\Delta\epsilon$ of the composition without lowering a clearing point thereof, and therefore, it can provide a liquid crystal composition for driving a display element at a low voltage.

Compounds of four-ring system represented by Formulas (1-4) to (1-6) have a large absolute value of $\Delta\epsilon$ and show a relatively small $\Delta n$. Further, a liquid crystal phase is shown at high temperature in the wide range. Accordingly, when this compound is used as a component for a liquid crystal composition, an absolute value of $\Delta\epsilon$ can be increased, and a liquid crystal phase temperature range shown by the liquid crystal composition can be extended to a high temperature range.

Further, the compounds of these Formulas in which at least one of $Y^1$, $Y^2$, $Y^3$ and $Y^4$ is fluorine are characterized by having an excellent compatibility at low temperature.

In the compound represented by Formula (1), $R^1$ and $R^2$ each independently represent hydrogen, halogen, a cyano group, or an alkyl group having 1 to 20 carbon atoms, in which —$CH_2$— may be substituted with —CH═CH—, —C≡C—, —O— or —S— but —O— is not adjacent to another —O—, and in which at least one hydrogen may be substituted with halogen; rings $A^1$ to $A^5$ each independently represent a 1,4-cyclohexylene group in which at least one —$CH_2$— not adjacent to each other may be substituted with —O— or —S—, a 1,4-cyclohexenylene group, or a 1,4-phenylene group in which at least one ═CH— may be substituted with ═N— and hydrogen on the ring may be substituted with halogen; $Z^1$ to $Z^4$ each independently represent a single bond, —$CH_2CH_2$—, —$CH_2O$—, —$OCH_2$—, —COO—, —OCO—, —CH═CH—, —C≡C—, —$CF_2O$— or —$OCF_2$—; $Y^1$, $Y^2$, $Y^3$ and $Y^4$ each independently represent hydrogen or fluorine; and k, l, m and n each independently represent 0 or 1.

Specifically, $R^1$ and $R^2$ represent hydrogen, halogen, a cyano group, an alkyl group, an alkoxy group, an alkoxyalkyl group, an alkylthio group, an alkylthioalkyl group, an alkenyl group, an alkenyloxy group, an alkenylthio group, an alkynyl group, a fluoro-substituted alkyl group, a fluoro-substituted alkoxy group, a fluoro-substituted alkenyl group, a fluoro-substituted alkenyloxy group, a fluoro-substituted alkenylthio group and a fluoro-substituted alkynyl group.

More specifically, they represent fluorine, chlorine, bromine, methyl, ethyl, propyl, isopropyl, butyl, pentyl, hexyl, heptyl, octyl, nonyl, decyl, methoxy, ethoxy, propoxy, butoxy, pentoxy, heptyloxy, octyloxy, methoxymethyl, ethoxymethyl, propoxymethyl, propoxyethyl, methoxypropyl, ethoxypropyl, propoxypropyl, methylthio, ethylthio, propylthio, butylthio, pentylthio, hexylthio, heptylthio, octylthio, methylthiomethyl, ethylthiomethyl, propylthiomethyl, butylthiomethyl, methylthioethyl, ethylthioethyl, propylthioethyl, methylthiopropyl, ethylthiopropyl, propylthiopropyl, vinyl, 1-propenyl, 1-butenyl, 1-pentenyl, 3-butenyl, 3-pentenyl, ethynyl, 2-propynyl, 2-butynyl, 3-butynyl, 3-pentynyl, allyloxy, trifluoromethyl, fluoromethyl, 2-fluoroethyl, difluoromethyl, 2,2,2-trifluoroethyl, 1,1,2,2-tetrafluoroethyl, 2-fluoroethyl, 3-fluoropropyl, 4-fluorobutyl, 5-fluoropentyl, fluoromethoxy, trifluoromethoxy, difluoromethoxy, pentafluoroethoxy, 1,1,2,2-tetrafluoroethoxy, heptafluoropropoxy, 1,1,2,3,3,3-hexafluoropropoxy, trifluoromethoxymethyl, 2-fluoroethenyl, 2,2-difluoroethenyl, 1,2,2-trifluoroethenyl, 3-fluoro-1-butenyl, 4-fluoro-1-butenyl, trifluoromethylthio, difluoromethylthio, 1,1,2,2-tetrafluoroethylthio, 2,2,2-trifluoroethylthio and the like.

Specifically, rings $A^1$ to $A^5$ preferably have ring structures represented by Formulas (r-1) to (r-24):

(r-1)

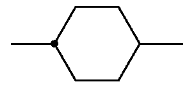

(r-2)

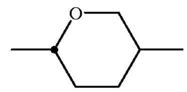

(r-3)

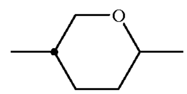

(r-4)

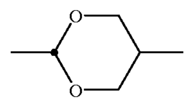

(r-5)

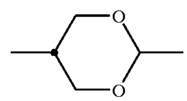

(r-6)

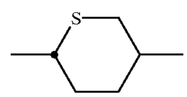

(r-7)

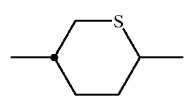

(r-8)

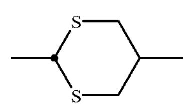

(r-9)

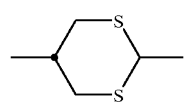

(r-10)

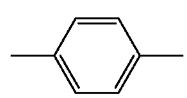

(r-11)

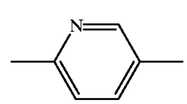

(r-12)

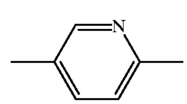

(r-13)

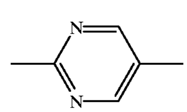

-continued (r-14)

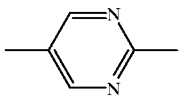

(r-15)

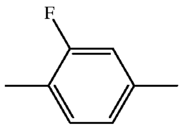

(r-16)

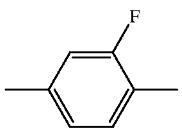

(r-17)

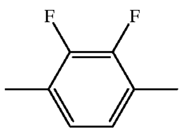

(r-18)

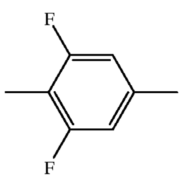

(r-19)

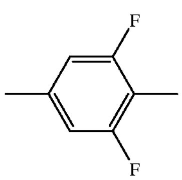

(r-20)

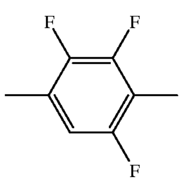

(r-21)

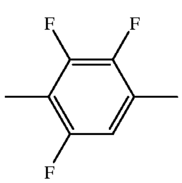

(r-22)

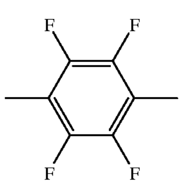

-continued (r-23)

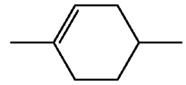

(r-24)

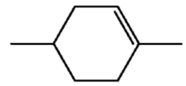

The liquid crystal composition of the present invention may comprise only the first component comprising at least one liquid crystalline compound represented by Formula (1), and preferably, it may further comprises as a second component at least one compound (hereinafter referred to as second component A) selected from the group consisting of the compounds represented by Formulas (2), (3) and (4) described above and/or at least one compound (hereinafter referred to as second component B) selected from the group consisting of the compounds represented by Formulas (5) and (6). Further, the composition can comprise at least one compound selected from the group consisting of the compounds represented by Formulas (7), (8) and (9) as a third component for the purpose of controlling a threshold voltage, a liquid crystal temperature range, a refractive anisotropy, a dielectric anisotropy, a viscosity, etc. The respective components of the liquid crystal composition used for the present invention make little difference in physical properties, and therefore, they may be analogues comprising isotopes of the respective elements.

Among the compounds represented by Formulas (2), (3) and (4) as the second component A described above, preferable examples are the following compounds of Formulas (2-1) to (2-9), (3-1) to (3-97) and (4-1) to (4-33), respectively.

(2-1)

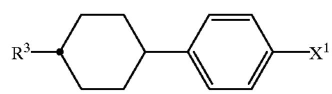

(2-2)

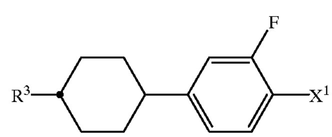

(2-3)

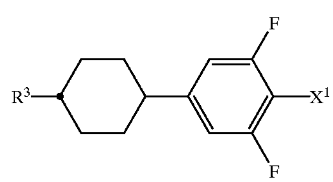

(2-4)

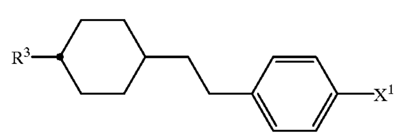

-continued
(2-5)
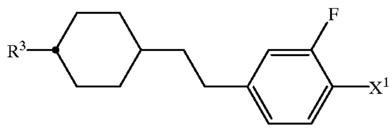
(2-6)
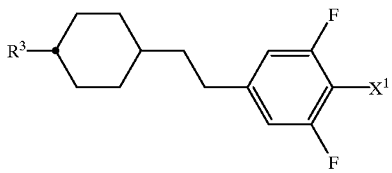
(2-7)
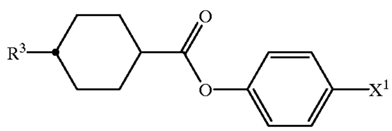
(2-8)
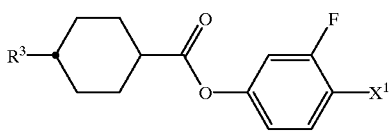
(2-9)
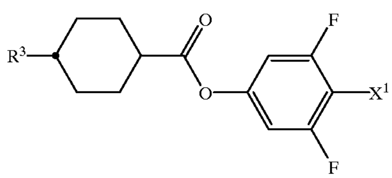
(3-1)
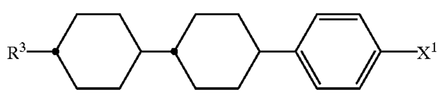
(3-2)
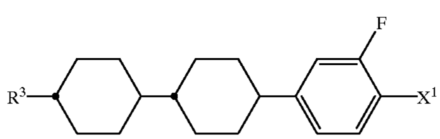
(3-3)
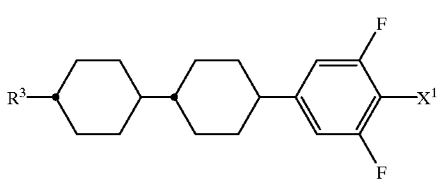
(3-4)
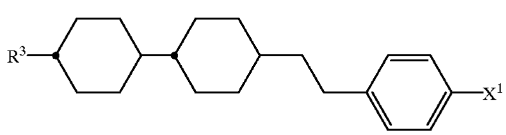
(3-5)
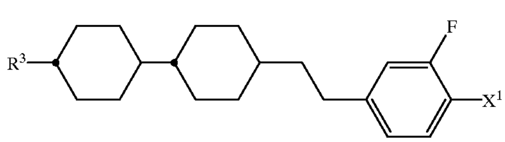
-continued
(3-6)
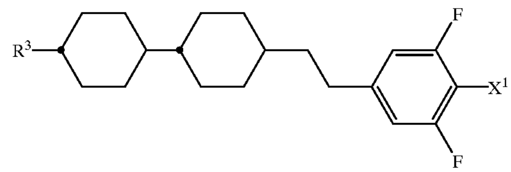
(3-7)
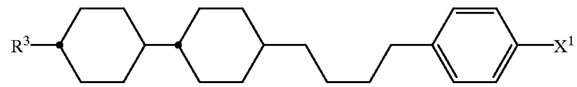
(3-8)
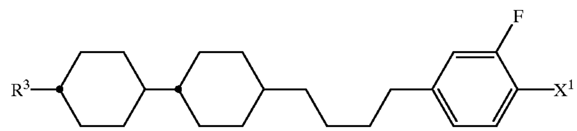
(3-9)
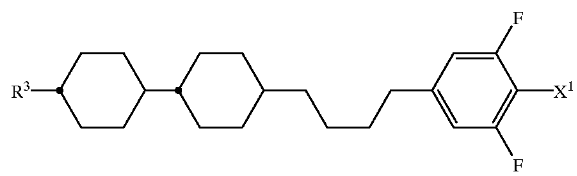
(3-10)
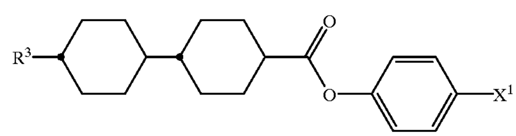
(3-11)
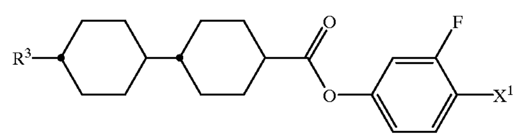
(3-12)
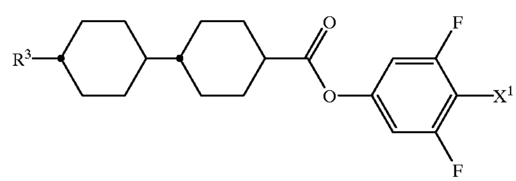
(3-13)
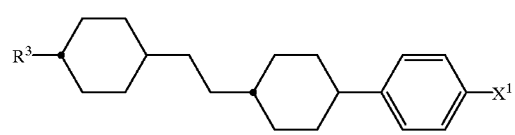
(3-14)
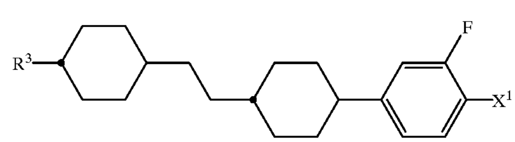

-continued
(3-15)
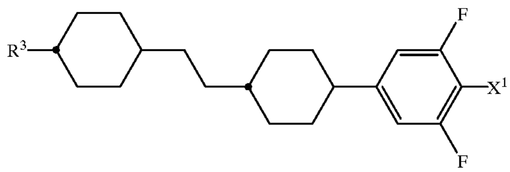
(3-16)
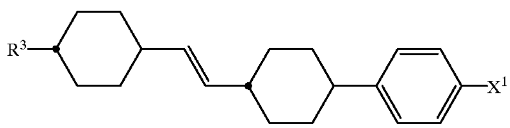
(3-17)
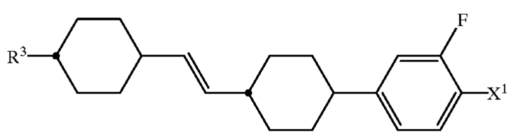
(3-18)
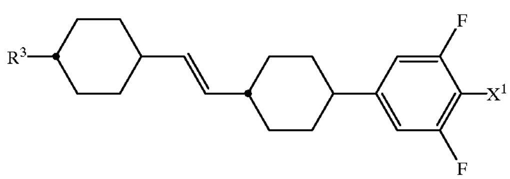
(3-19)
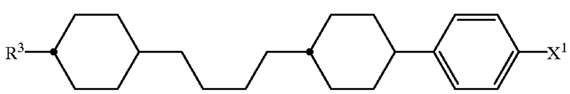
(3-20)
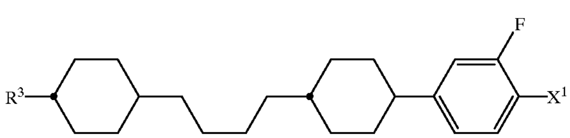
(3-21)
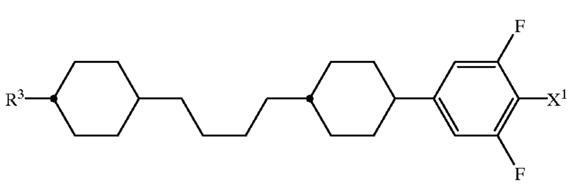
(3-22)
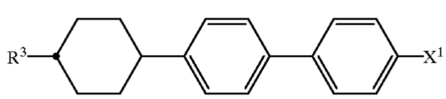
(3-23)
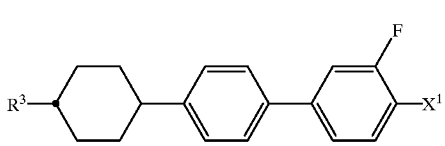
-continued
(3-24)
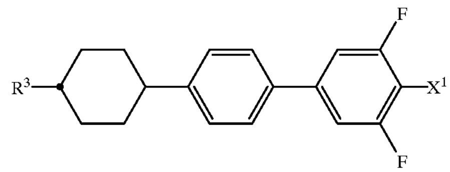
(3-25)
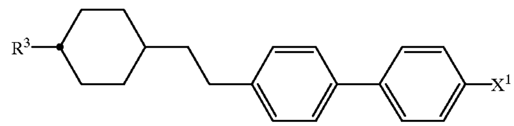
(3-26)
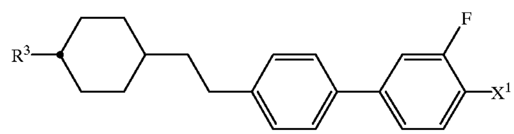
(3-27)
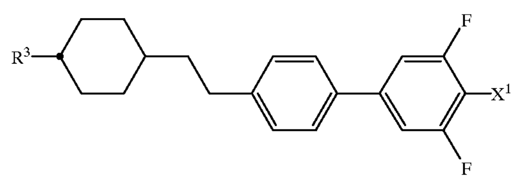
(3-28)
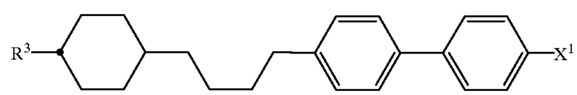
(3-29)
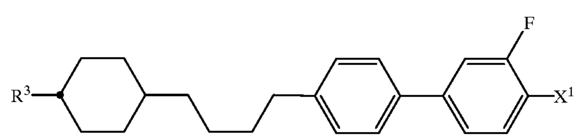
(3-30)
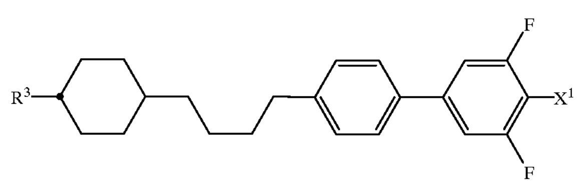
(3-31)
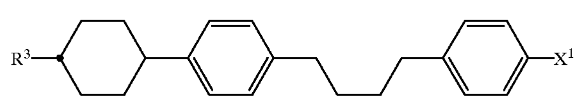
(3-32)
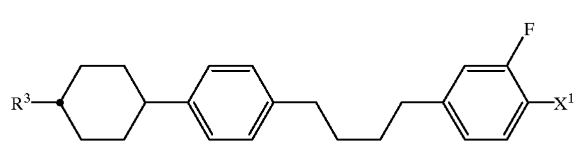

-continued
(3-33)
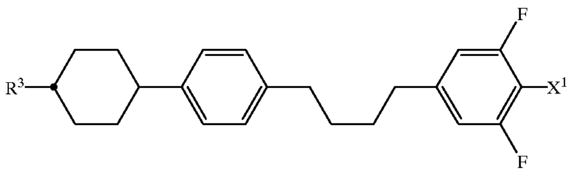
(3-34)
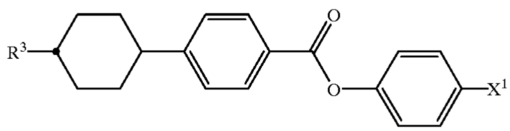
(3-35)
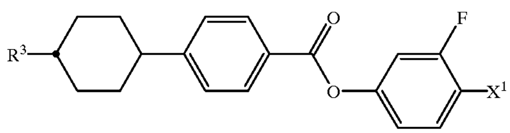
(3-36)
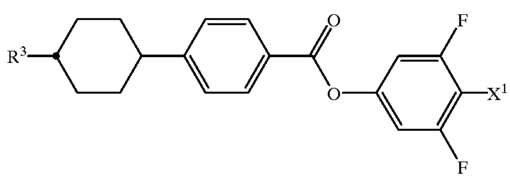
(3-37)
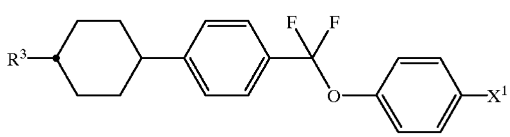
(3-38)
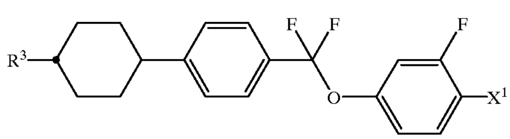
(3-39)
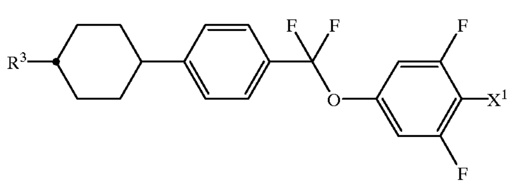
(3-40)
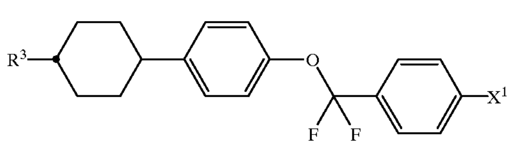
-continued
(3-41)
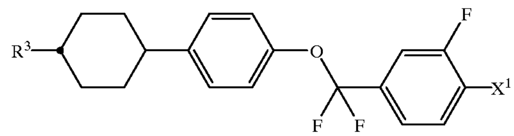
(3-42)
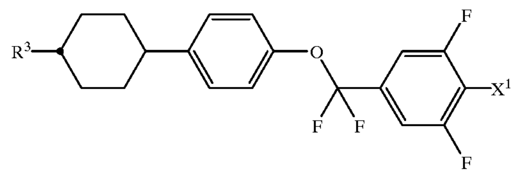
(3-43)
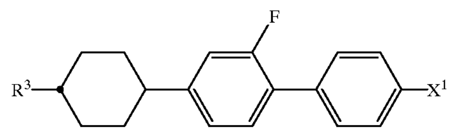
(3-44)
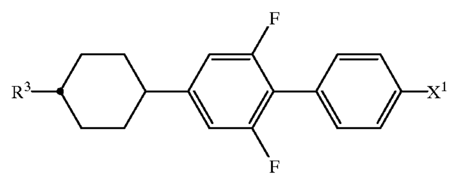
(3-45)
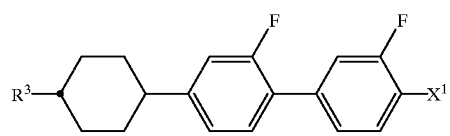
(3-46)
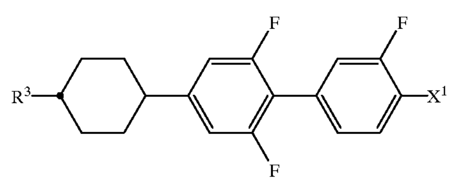
(3-47)
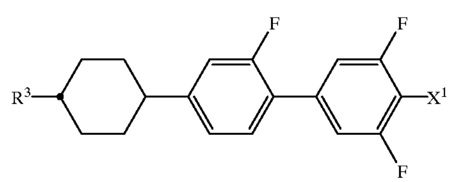
(3-48)
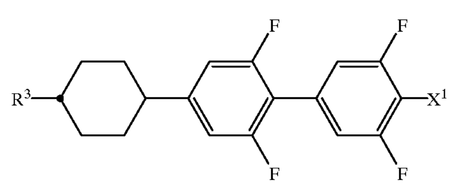
(3-49)
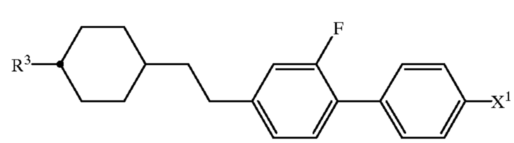

-continued
(3-50)
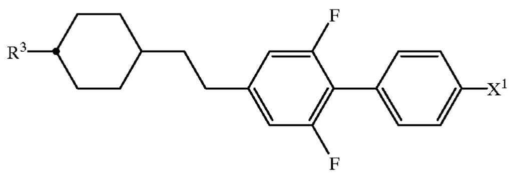
(3-51)
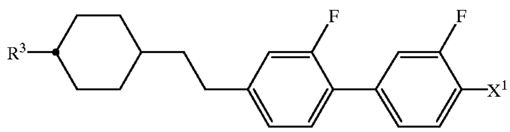
(3-52)
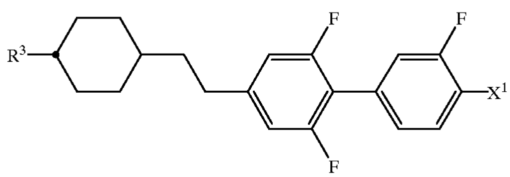
(3-53)
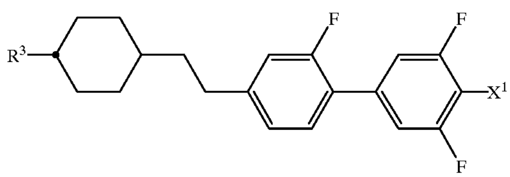
(3-54)
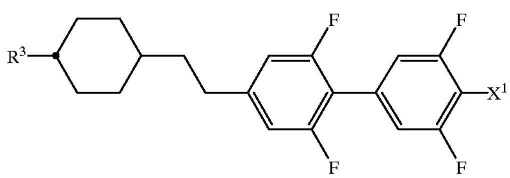
(3-55)
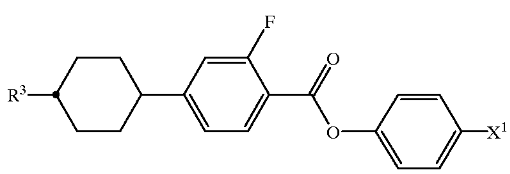
(3-56)
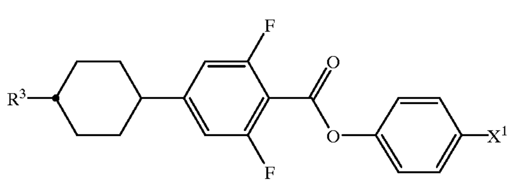
(3-57)
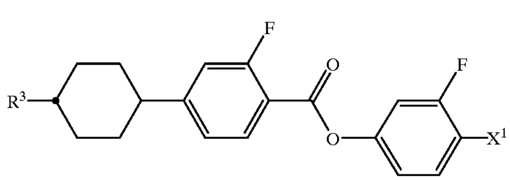
-continued
(3-58)
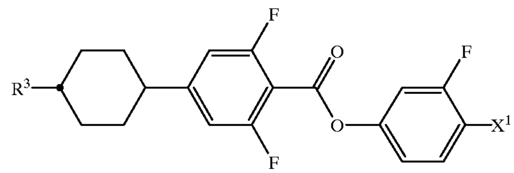
(3-59)
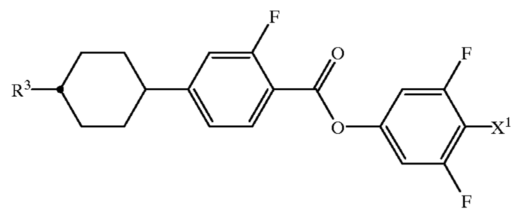
(3-60)
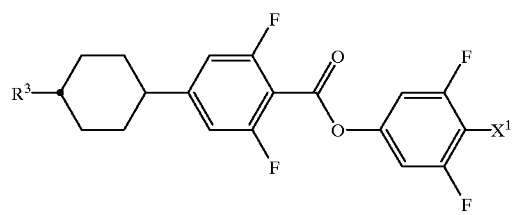
(3-61)
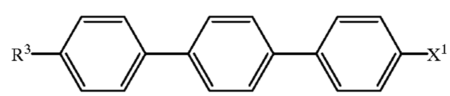
(3-62)
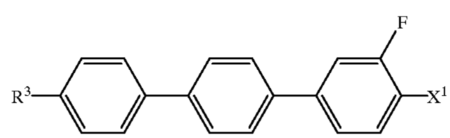
(3-63)
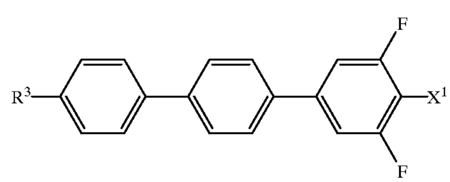
(3-64)
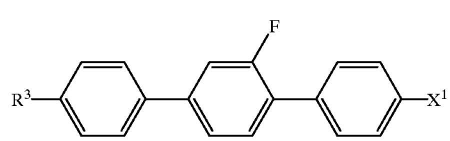
(3-65)
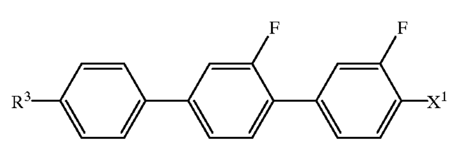

-continued
(3-66)
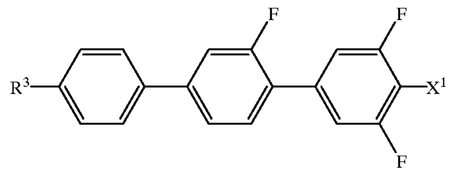
(3-67)
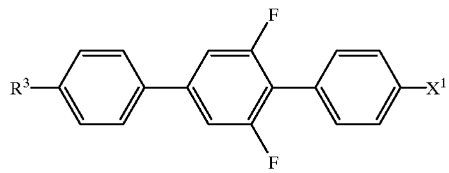
(3-68)
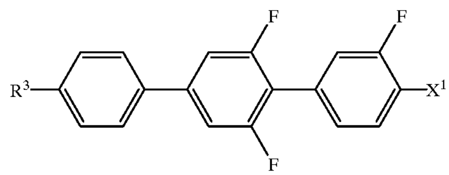
(3-68)
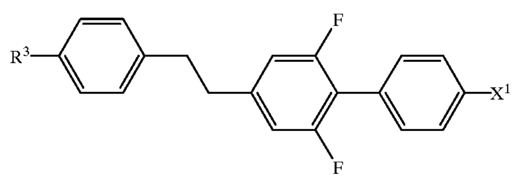
(3-70)
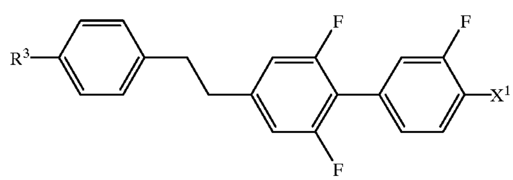
(3-71)
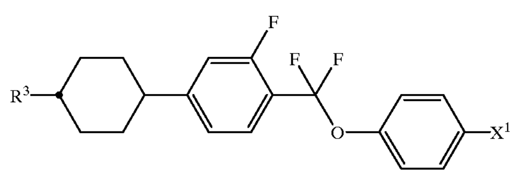
(3-72)
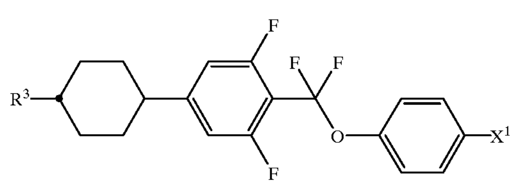
(3-73)
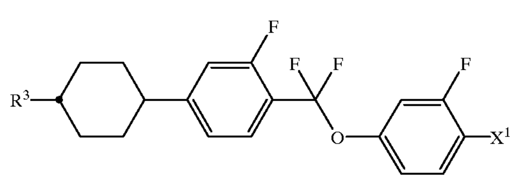
-continued
(3-74)
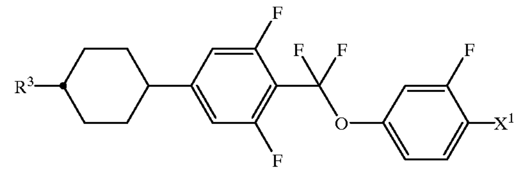
(3-75)
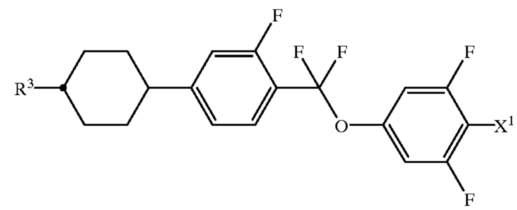
(3-76)
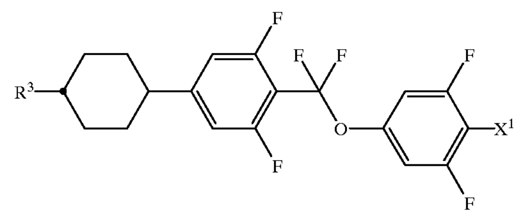
(3-77)
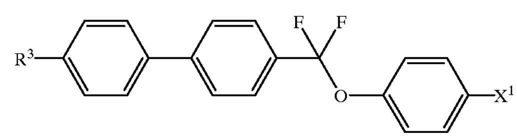
(3-78)
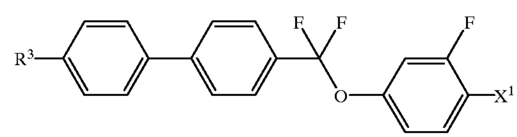
(3-79)
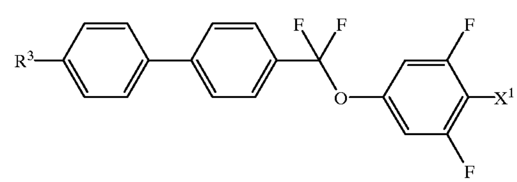
(3-80)
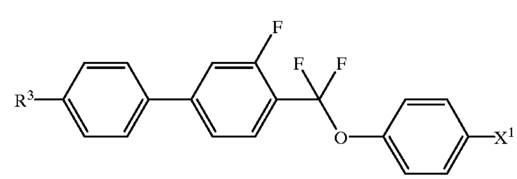

-continued
(3-81)
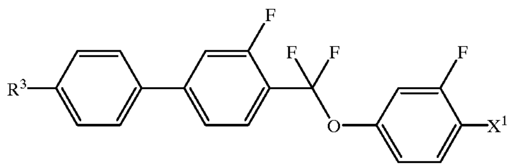
(3-82)
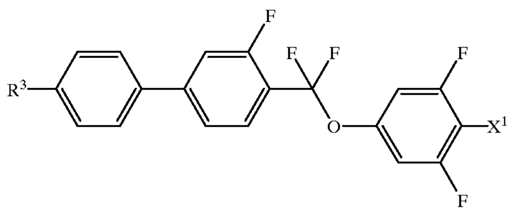
(3-83)
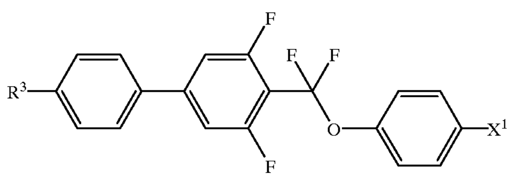
(3-84)
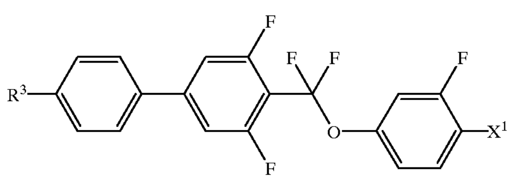
(3-85)
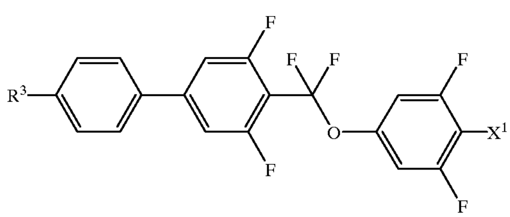
(3-86)
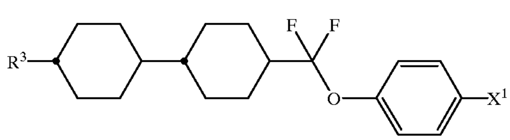
(3-87)
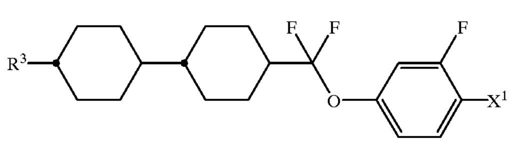
-continued
(3-88)
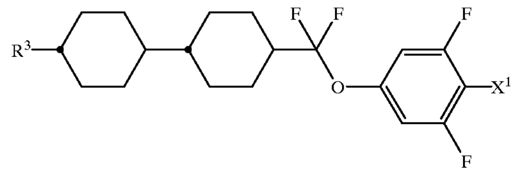
(3-89)
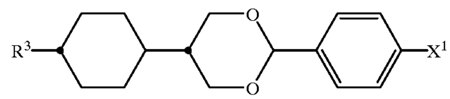
(3-90)
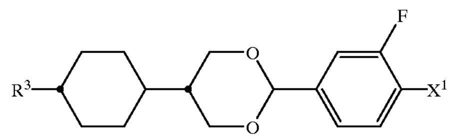
(3-91)
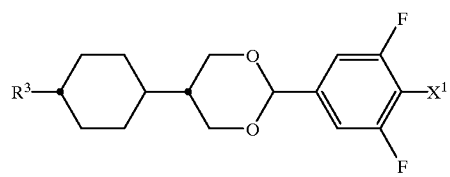
(3-92)
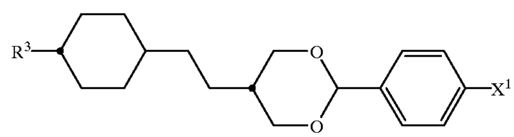
(3-93)
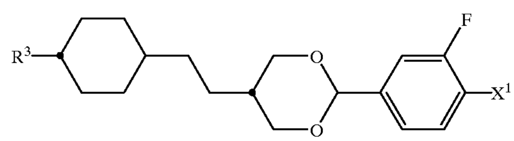
(3-94)
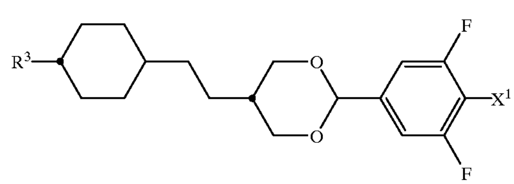
(3-95)
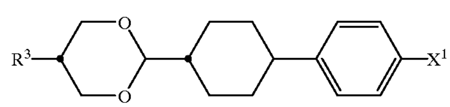
(3-96)
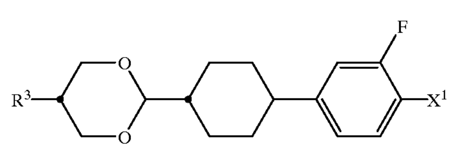

-continued
(3-97)
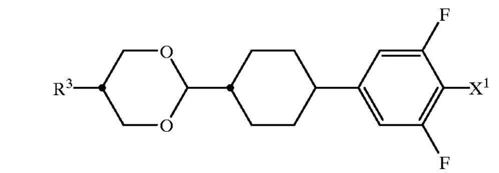
(4-1)
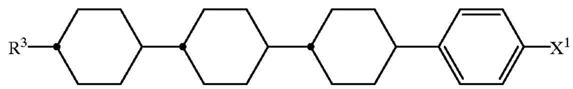
(4-2)
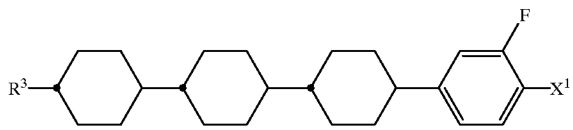
(4-3)
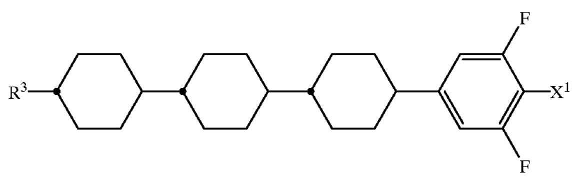
(4-4)
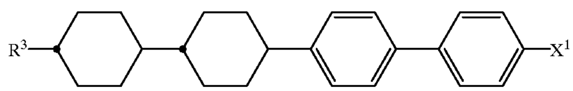
(4-5)
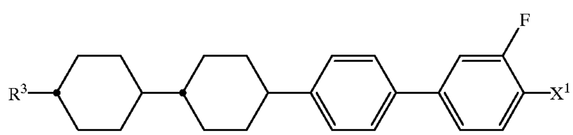
(4-6)
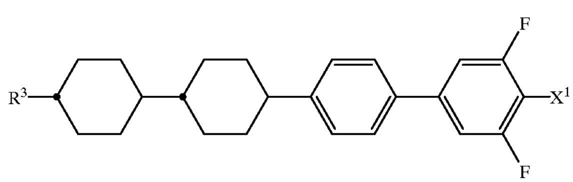
(4-7)
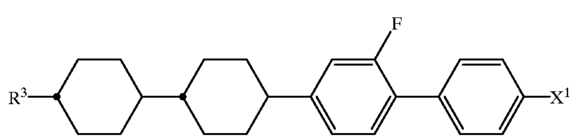
(4-8)
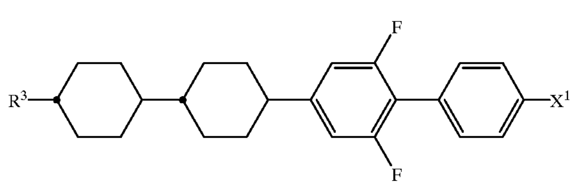
-continued
(4-9)
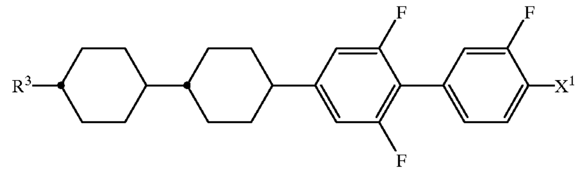
(4-10)
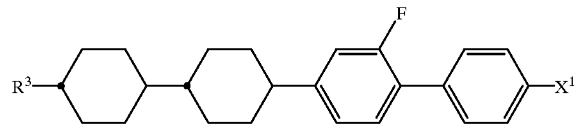
(4-11)
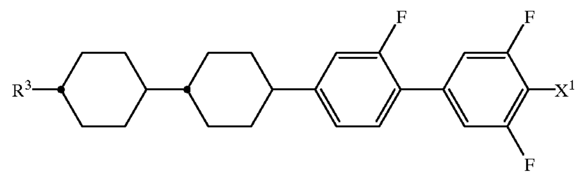
(4-12)
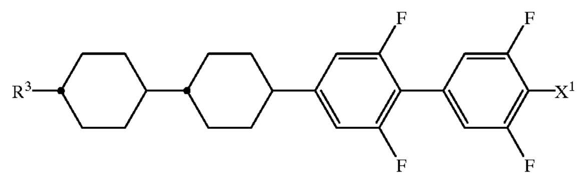
(4-13)
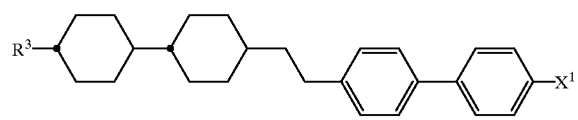
(4-14)
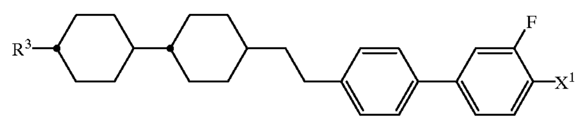
(4-15)
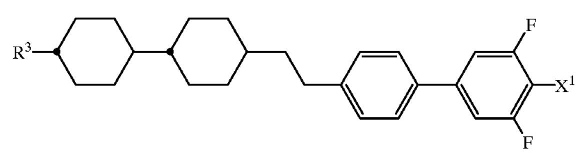
(4-16)
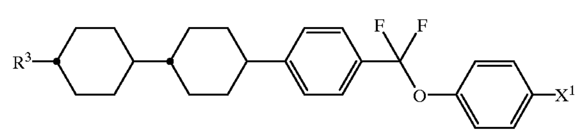
(4-17)
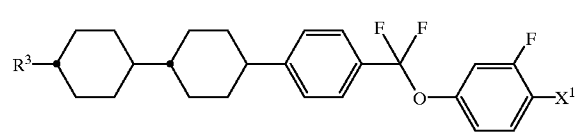

-continued
(4-18)
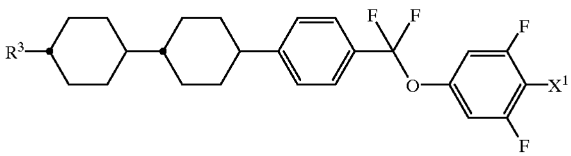
(4-19)
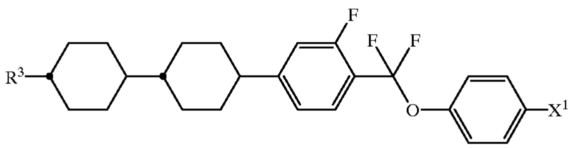
(4-20)
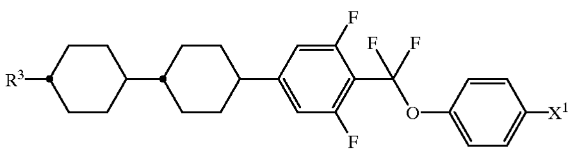
(4-21)
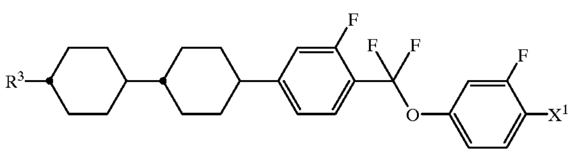
(4-22)
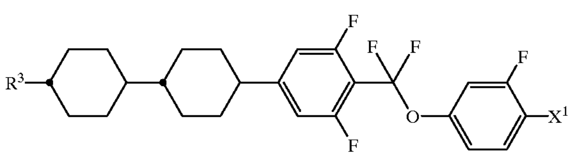
(4-23)
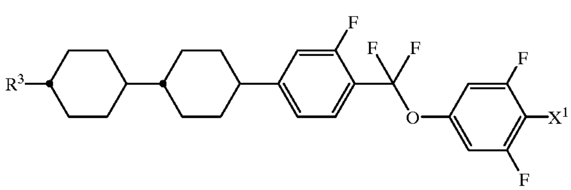
(4-24)
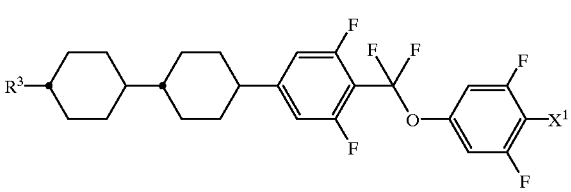
(4-25)
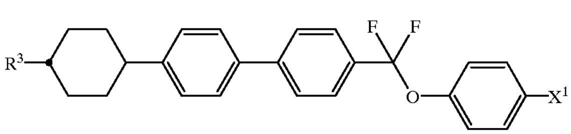
-continued
(4-26)
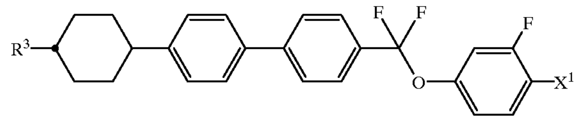
(4-27)
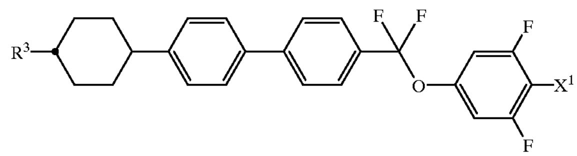
(4-28)
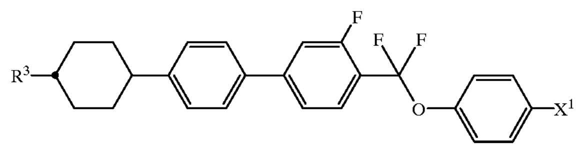
(4-29)
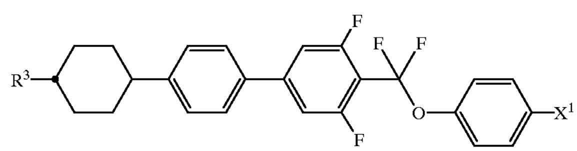
(4-30)
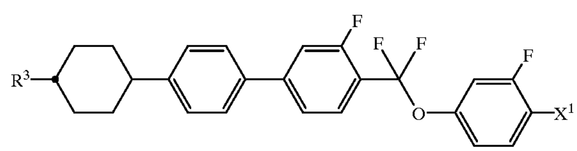
(4-31)
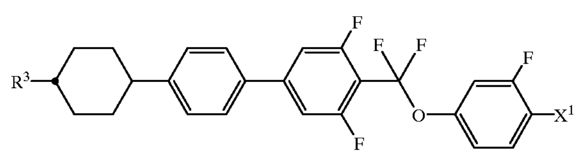
(4-32)
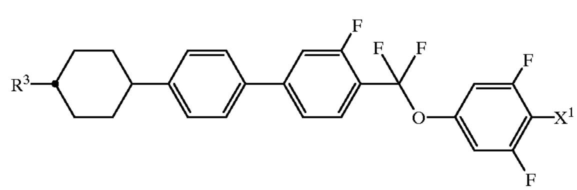
(4-33)
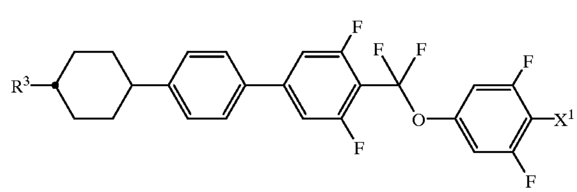

In Formulas, $R^3$ and $X^1$ have the same meanings as described above.

These compounds represented by Formulas (2) to (4) show a positive dielectric anisotropy and are very excellent in heat stability and chemical stability, so that they are used primarily for liquid crystal compositions for TFT. When preparing a liquid crystal composition for TFT, an amount of the above compounds may preferably be in the range of 1 to 99% by weight, more preferably 10 to 97% by weight and further preferably 40 to 95% by weight based on the total amount of the liquid crystal composition. The compounds represented by Formulas (10) to (12) may further be added for the purpose of controlling the viscosity.

Among the compounds represented by Formulas (5) and (6) as the second component B described above, preferable examples are the following compounds of Formulas (5-1) to (5-58) and (6-1) to (6-3), respectively.

(5-1)

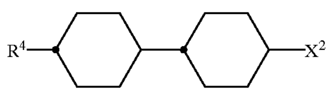

(5-2)

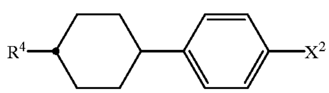

(5-3)

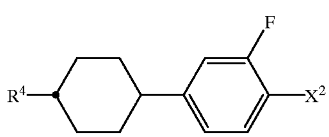

(5-4)

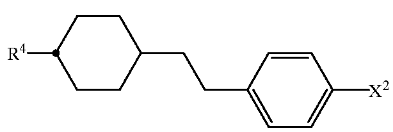

(5-5)

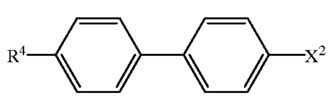

(5-6)

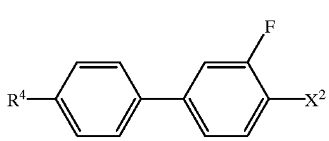

(5-7)

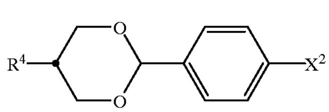

-continued (5-8)

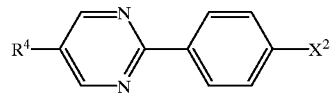

(5-9)

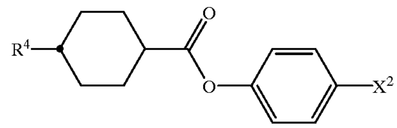

(5-10)

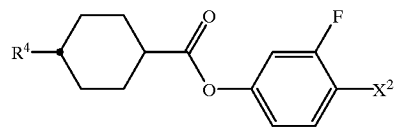

(5-11)

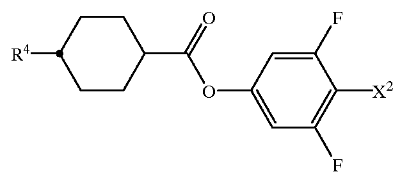

(5-12)

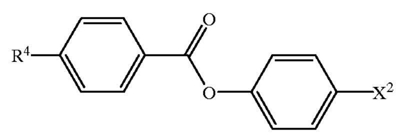

(5-13)

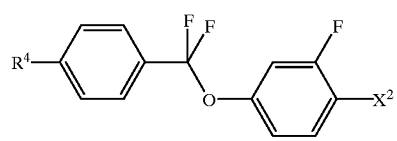

(5-14)

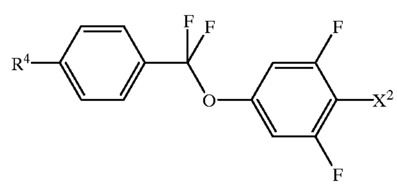

(5-15)

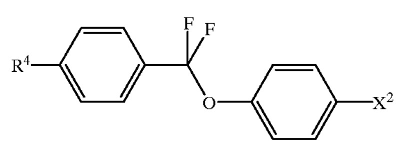

(5-16)

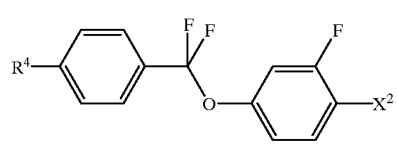

(5-17)

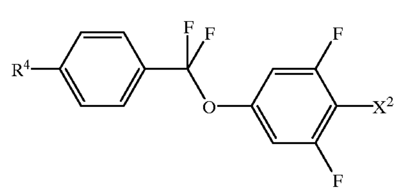

-continued
(5-18)
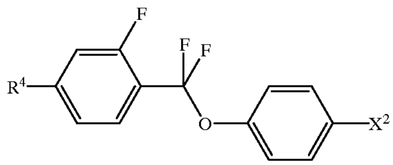
(5-19)
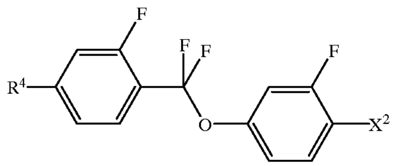
(5-20)
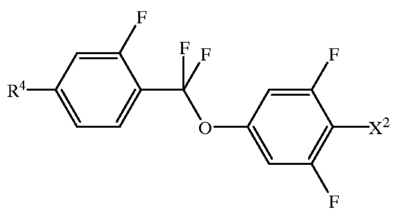
(5-21)
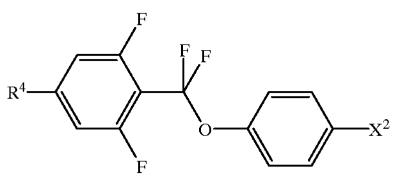
(5-22)
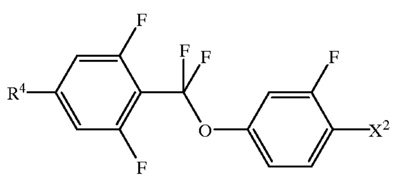
(5-23)
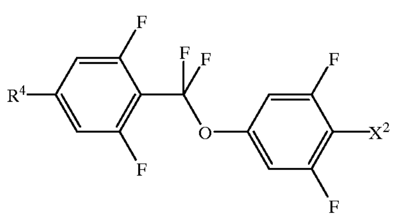
(5-24)
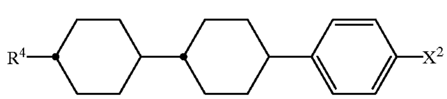
(5-25)
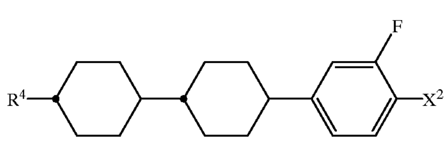
-continued
(5-26)
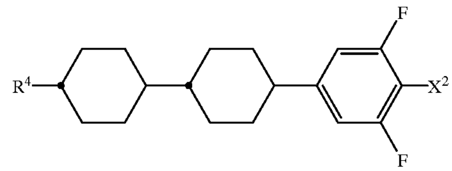
(5-27)
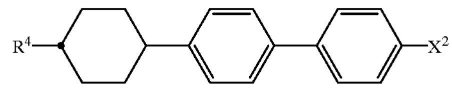
(5-28)
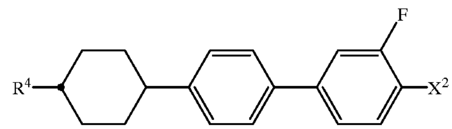
(5-29)
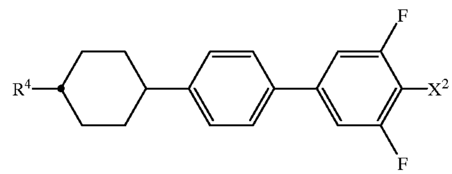
(5-30)
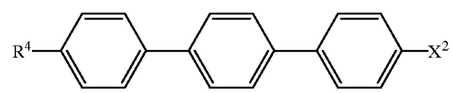
(5-31)
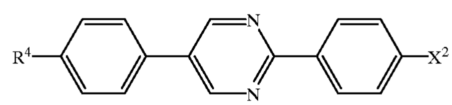
(5-32)
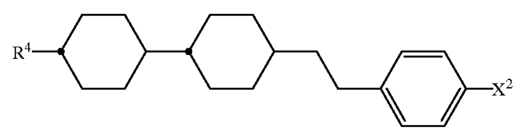
(5-33)
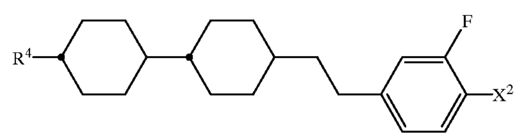
(5-34)
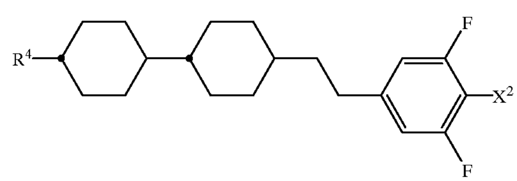
(5-35)
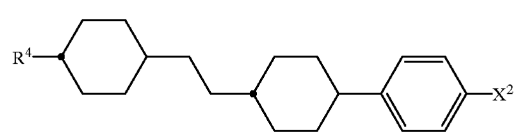

-continued
(5-36)
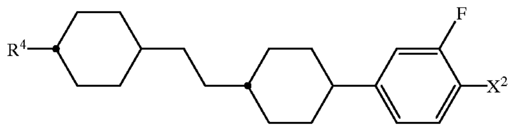
(5-37)
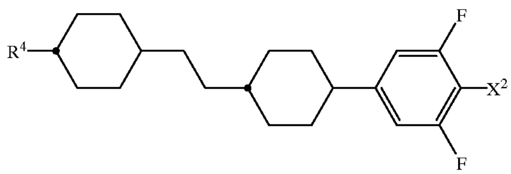
(5-38)
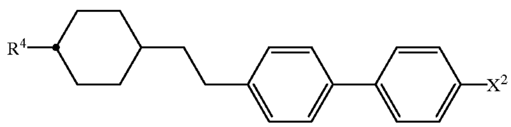
(5-39)
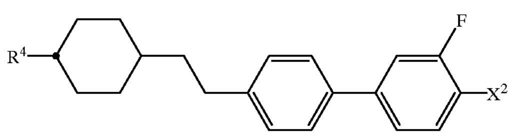
(5-40)
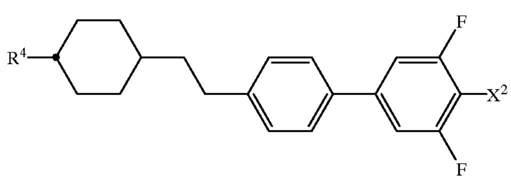
(5-41)
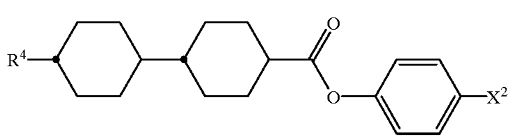
(5-42)
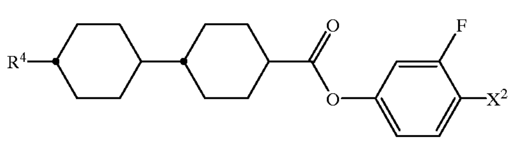
(5-43)
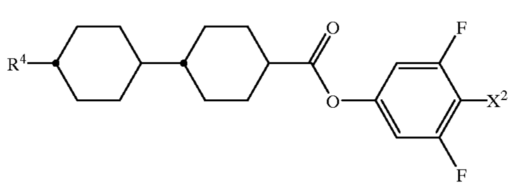
-continued
(5-44)
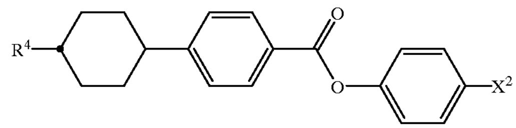
(5-45)
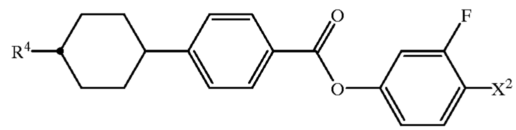
(5-46)
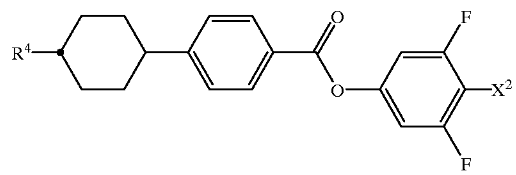
(5-47)
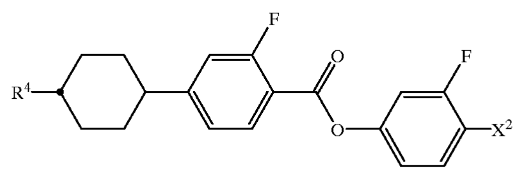
(5-48)
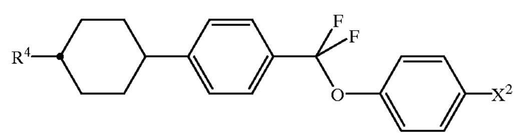
(5-49)
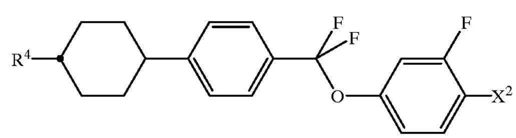
(5-50)
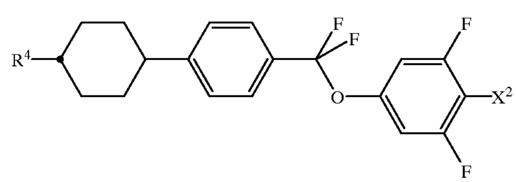
(5-51)
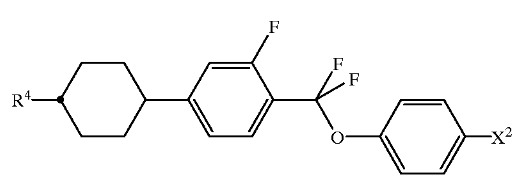

-continued (5-52)

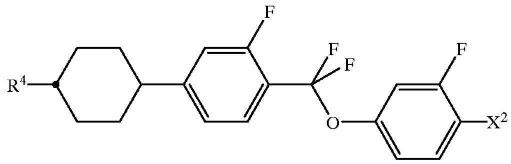

(5-53)

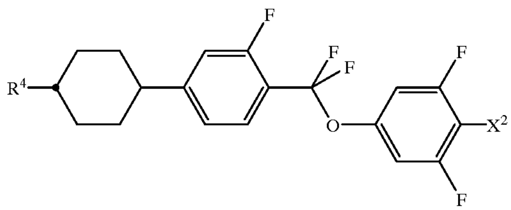

(5-54)

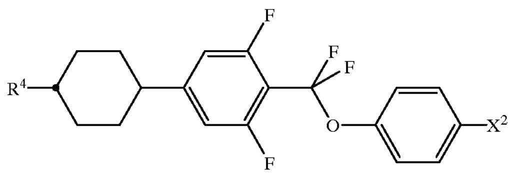

(5-55)

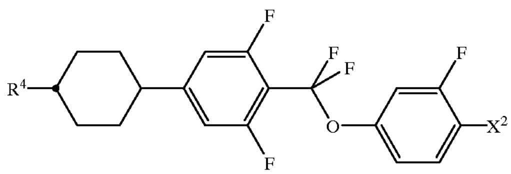

(5-56)

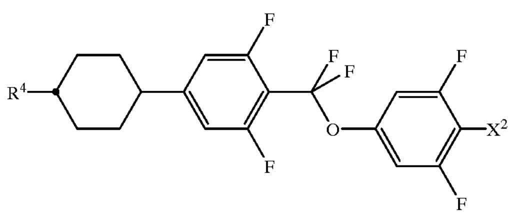

(5-57)

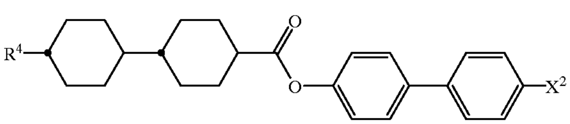

(5-58)

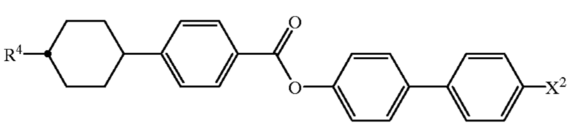

(6-1)

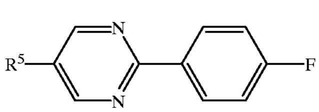

-continued (6-2)

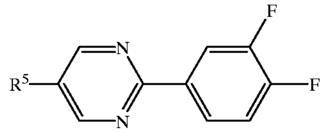

(6-3)

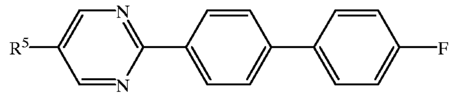

In Formulas, $R^4$, $R^5$ and $X^2$ have the same meanings as described above.

These compounds represented by Formulas (5) and (6) have a positive dielectric anisotropy, and a value thereof is very large, so that they are used mainly for liquid crystal compositions for STN and TN. These compounds are used as a component of the composition particularly for the purpose of reducing a threshold voltage. Further, they are used for the purposes of controlling the viscosity and the refractive anisotropy, expanding the liquid crystal phase temperature range, and also improving the steepness. When preparing a liquid crystal composition for STN or TN, an amount of the compounds of the Formulas (5) and (6) may preferably be in the range of 0.1 to 99.9% by weight, more preferably 10 to 97% by weight and further preferably 40 to 95% by weight. A third component described later can be mixed for the purpose of controlling the threshold voltage, the liquid crystal phase temperature range, the refractive anisotropy, the dielectric anisotropy, the viscosity, etc.

When preparing a liquid crystal composition for a vertical alignment mode (VA mode), etc. having a negative dielectric anisotropy, preferable is the composition comprising at least one compound (hereinafter referred to as second component C) selected from the group consisting of the compounds represented by Formulas (7) to (9). Preferable examples of the compounds represented by Formulas (7) to (9) among the second component C are the following compounds of Formulas (7-1) to (7-3), (8-1) to (8-5) and (9-1) to (9-3), respectively.

(7-1)

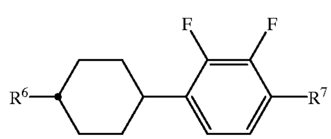

(7-2)

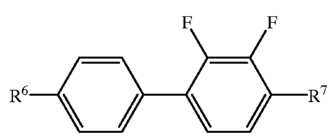

(7-3)

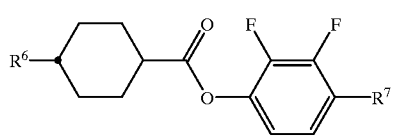

-continued (8-1)

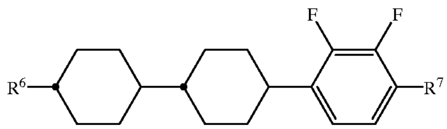

(8-2)

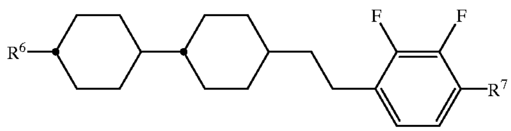

(8-3)

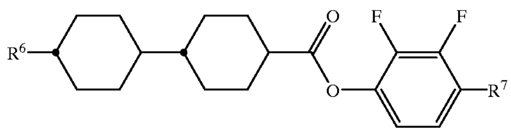

(8-4)

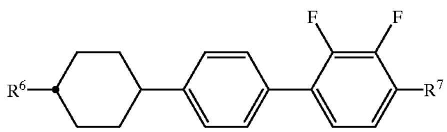

(8-5)

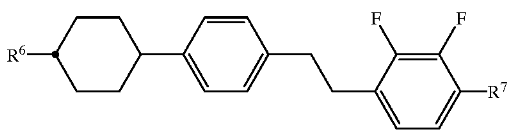

(9-1)

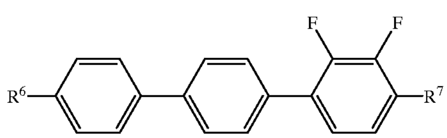

(9-2)

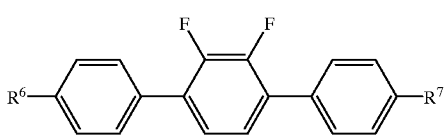

(9-3)

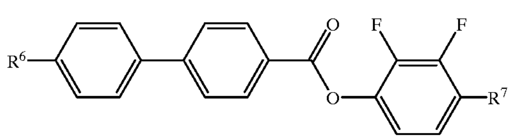

In Formulas, $R^6$ and $R^7$ have the same meanings as described above.

The compounds represented by Formulas (7) to (9) have a negative dielectric anisotropy. The compound of Formula (7) is a compound of two-ring system and therefore used mainly for the purpose of controlling the threshold voltage, the viscosity or the refractive anisotropy. The compound of Formula (8) is used for the purpose of not only expanding the nematic range but also reducing the threshold voltage and increasing the refractive anisotropy.

The compounds represented by Formulas (7) to (9) are used mainly for a liquid crystal composition for a VA mode having a negative dielectric anisotropy. If an amount thereof is increased, the composition has a reduced threshold voltage but it may also have an increased viscosity. Therefore, an amount thereof is preferably reduced as long as a required value of the threshold voltage is satisfied. However, an absolute value of the dielectric anisotropy is 5 or less, and if an amount of the compounds represented by Formulas (7) to (9) are less than 40% by weight, the liquid crystal composition may not be driven. Accordingly, an amount of the compounds represented by Formulas (7) to (9) is preferably 40% by weight or more when preparing the composition for a VA mode. It is more preferably in the range of 50 to 95% by weight.

Further, the compounds represented by Formulas (7) to (9) may be added to the liquid crystal composition having a positive dielectric anisotropy for the purpose of controlling the elastic constant and a voltage transmission curve of the composition. In this case, an amount of the compounds represented by Formulas (7) to (9) is preferably 30% by weight or less.

Among the compounds represented by Formulas (10) to (12) as the third component for the liquid crystal composition of the present invention, preferable examples are the following compounds of Formulas (10-1) to (10-11), (11-1) to (11-12) and (12-1) to (12-6), respectively.

(10-1)

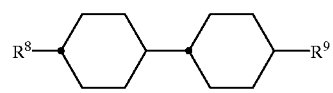

(10-2)

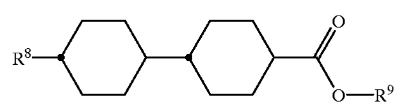

(10-3)

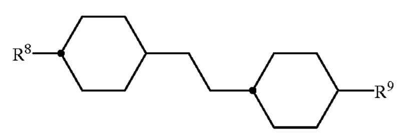

(10-4)

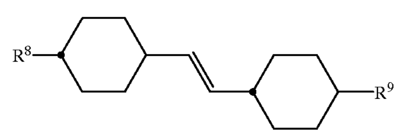

(10-5)

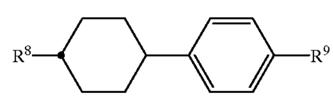

(10-6)

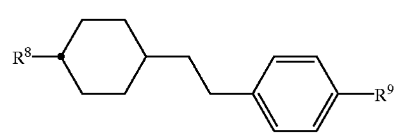

(10-7)

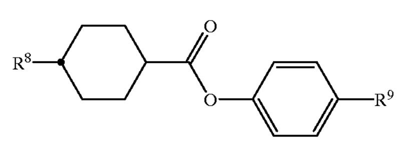

-continued
(10-8)
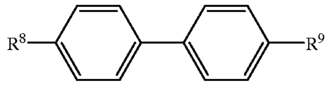
(10-9)
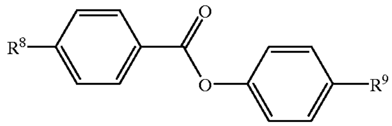
(10-10)
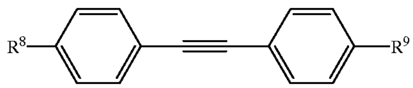
(10-11)
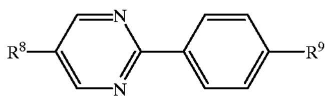
(11-1)
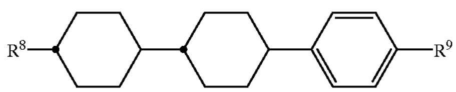
(11-2)
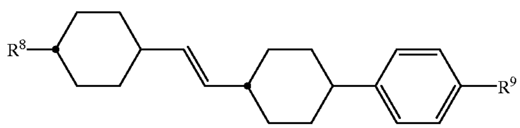
(11-3)
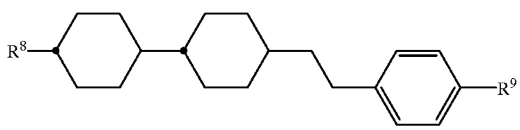
(11-4)
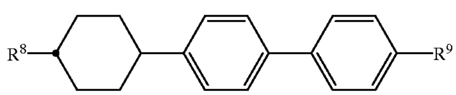
(11-5)
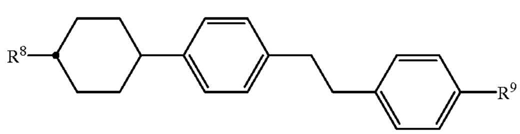
(11-6)
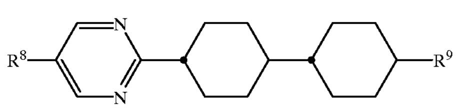
(11-7)
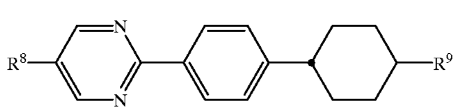
-continued
(11-8)
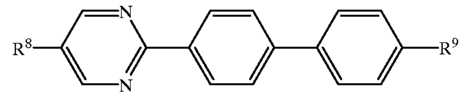
(11-9)
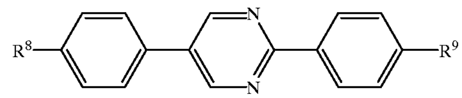
(11-10)
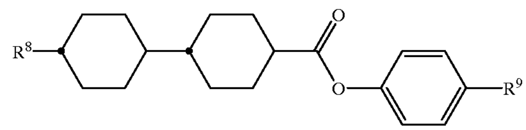
(11-11)
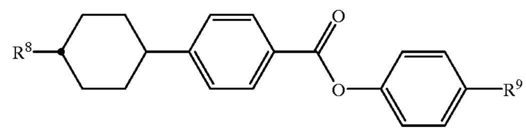
(11-12)
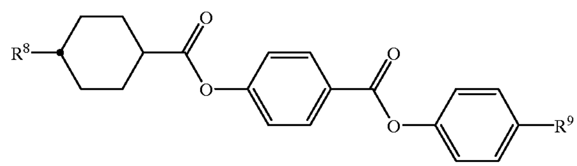
(12-1)
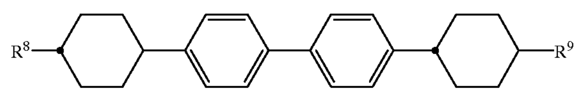
(12-2)
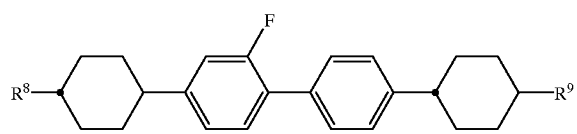
(12-3)
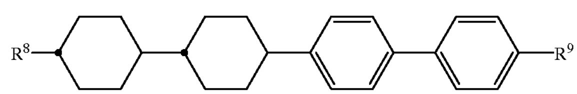
(12-4)
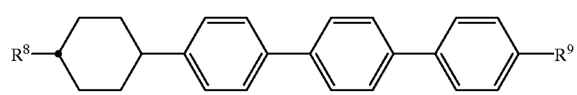
(12-5)
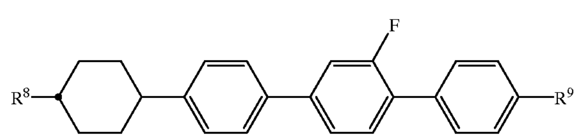

-continued (12-6)

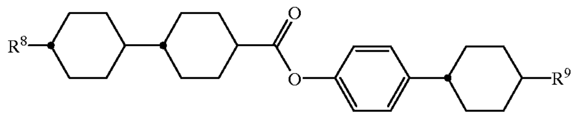

In Formulas, $R^8$ and $R^9$ have the same meanings as described above.

The compounds represented by Formulas (10) to (12) have a small absolute value of a dielectric anisotropy and are almost neutral. The compound of Formula (10) is used mainly for the purpose of controlling the viscosity or the refractive anisotropy. The compounds of Formulas (11) and (12) are used for the purpose of expanding the nematic range by elevating the clearing point, or controlling the refractive anisotropy.

If an amount of the compounds represented by Formulas (10) to (12) is increased, the liquid crystal composition has an elevated threshold voltage and a reduced viscosity. Therefore, the compounds represented by the Formulas (10) to (12) are preferably used in a large amount in order to make low voltage driving possible as long as a required value of the threshold voltage of the liquid crystal composition is satisfied. When preparing the liquid crystal composition for TFT, an amount of the compounds represented by Formulas (10) to (12) is preferably 40% by weight or less, more preferably 35% by weight or less. When preparing the liquid crystal composition for STN or TN, an amount of the compounds represented by Formulas (10) to (12) is preferably 70% by weight or less, more preferably 60% by weight or less.

The liquid crystal composition of the present invention preferably comprises at least one of the liquid crystalline compounds represented by Formula (1) in the proportion of 0.1 to 99% by weight in order to make low voltage driving possible.

The above liquid crystal composition is usually prepared by a publicly known method, for example, a method of dissolving various components at high temperature. Further, a chiral dopant is added if necessary, whereby the liquid crystal composition can be improved for each purpose and optimized. Any chiral dopant may be used as long as it can induce a helical structure of liquid crystals to adjust a required twist angle and prevent reverse twist. For example, the following optically active compounds can be given as the chiral dopant.

(C15)

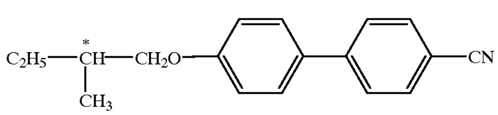

(CB15)

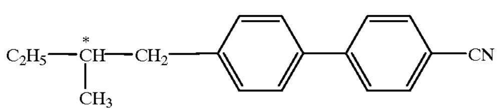

-continued (CM21)

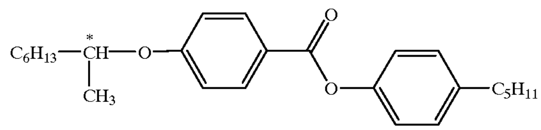

(CM33)

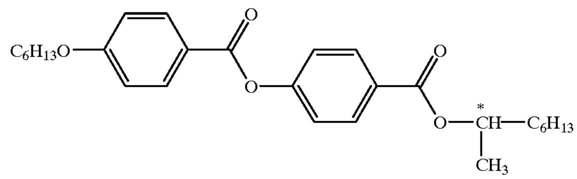

(CM43L)

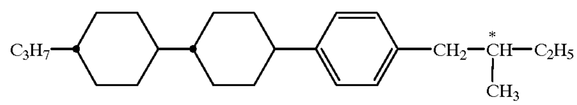

(CM45)

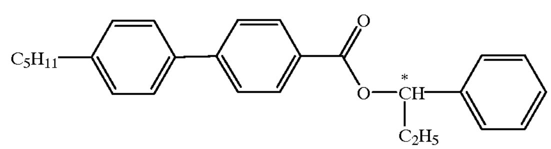

(CM47)

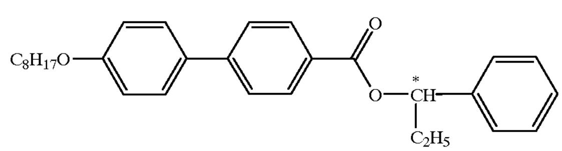

(CN)

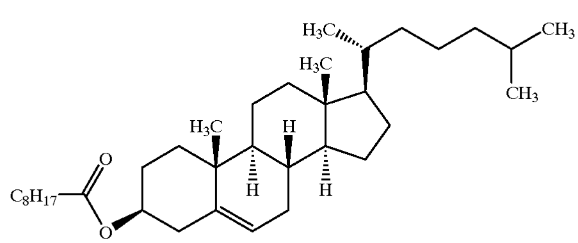

In the liquid crystal composition of the present invention, these optically active compounds are usually added to adjust a pitch of twist. The pitch of twist is preferably adjusted in the range of 40 to 200 μm in the case of the liquid crystal compositions for TFT and TN. In the case of the liquid crystal composition for STN, it is preferably adjusted in the range of 6 to 20 μm. Further, in the case of the liquid crystal composition for a bistable TN mode, it is preferably adjusted in the range of 1.5 to 4 μm. Two or more optically active compounds may be added for the purpose of controlling a temperature dependency of the pitch.

The liquid crystal composition of the present invention can also be used as a liquid crystal composition for a G-H mode by adding a dichroic dye such as merocyanine, styryl, azo, azomethine, azoxy, quinophthalone, anthraquinone and tetrazine. The composition according to the present invention can also be used as a liquid crystal composition for NCAP prepared by the micro-encapsulation of nematic liquid crystals, for a polymer dispersed liquid crystal display element (PDLCD) such as a polymer network liquid crystal display element (PNLCD) in which a three-dimensional polymer is formed in liquid crystals, and for an electrically controlled birefringence mode (ECB) or DS mode liquid crystal displays.

The compounds represented by Formula (1) according to the present invention can be produced by suitably selecting and combining methods described in publications or publicly known literatures on organic synthesis such as Jikken Kagaku Koza (Experimental Chemistry Course) 4th Edition (Maruzen), Organic Synthesis (John Wiley & Sons, Inc.) or Organic Reactions (John Wiley & Sons, Inc.).

The compound represented by Formula (1) can be prepared by the following method, for example. First, a propionic acid ester derivative (16) obtained by a method described in JP-A 59-76027, JP-A 60-197637 or JP-A 60-204743 is converted to a thioester derivative (17) with a Lawesson's reagent (Fieser 13, 38) according to a method disclosed in JP-A 10-204016. Further, the derivative (17) it) is reacted with HF-pyridine in the presence of an oxidizing agent such as N-bromosuccinimide (hereinafter abbreviated as NBS) according to a method disclosed in JP-A 5-255165.

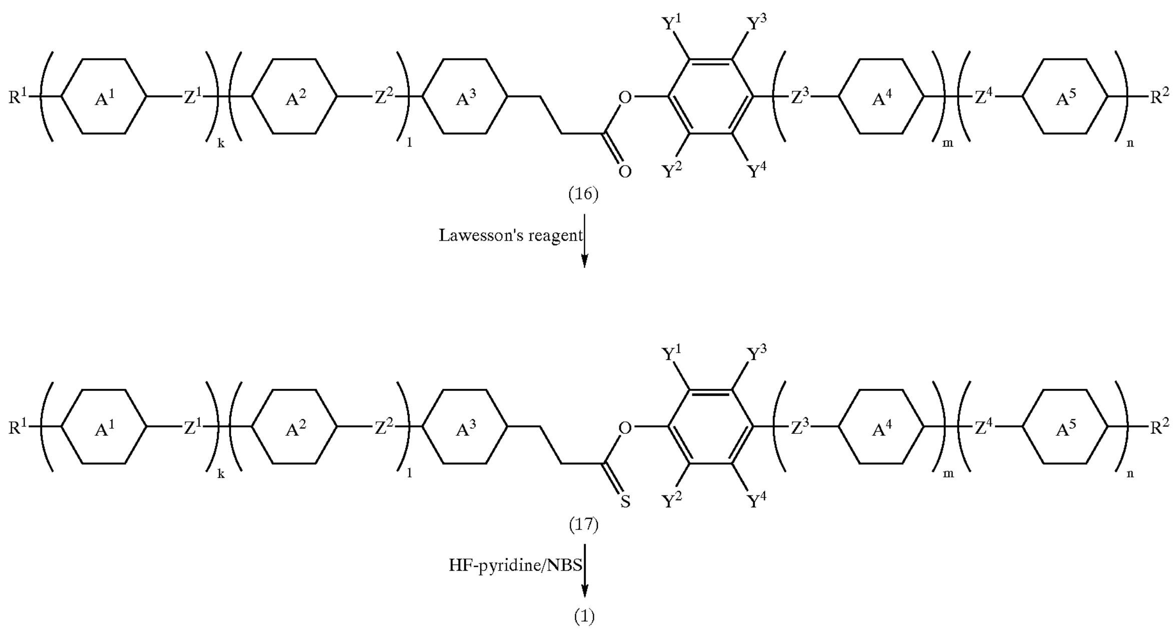

In Formulas, $R^1$, $R^2$, rings $A^1$ to $A^5$, $Z^1$ to $Z^4$, $Y^1$ to $Y^4$, k, l, m and n have the same meanings as described above.

The compound represented by Formula (1) can suitably be prepared by the following method as well. According to a method described in JP-A 10-17544, a Grignard reagent is prepared from a halobenzene derivative (18) and then reacted with carbon disulfide to obtain a dithiocarboxylic acid derivative (19). The derivative (19) is then reacted with sodium hydride in the presence of a phenol derivative (20) and further oxidized with iodine to obtain the thioester derivative (17). The derivative (17) thus obtained is reacted with HF-pyridine in the presence of an oxidizing agent such as NBS to give the desired compound (1).

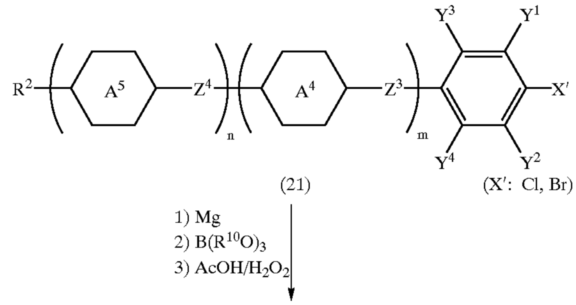

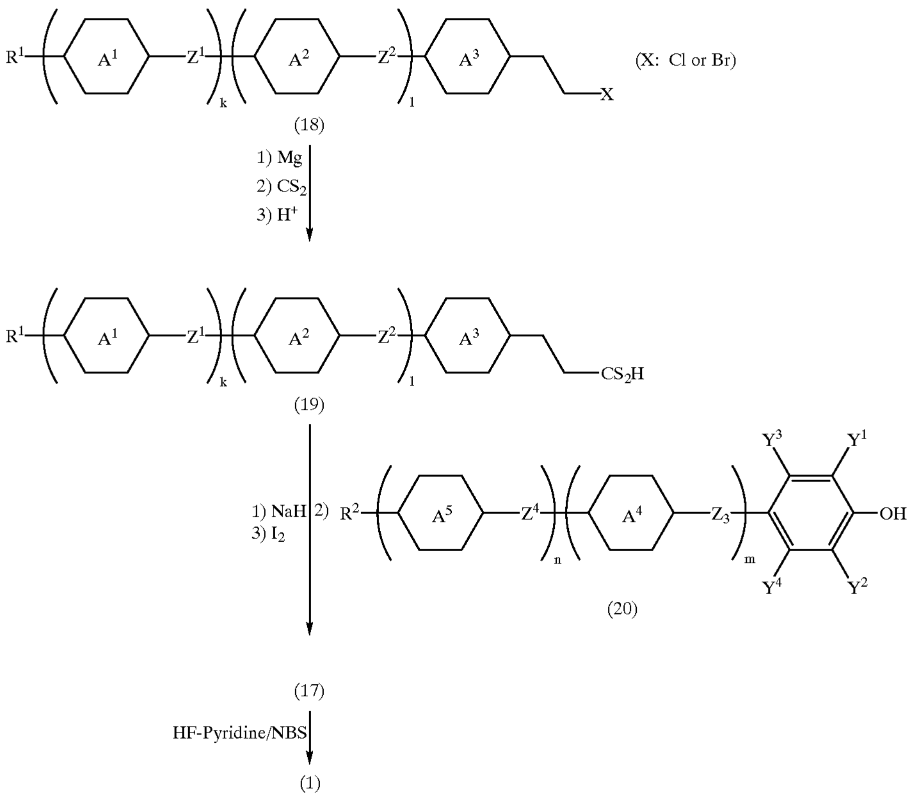

In Formulas, $R^1$, $R^2$, rings $A^1$ to $A^5$, $Z^1$ to $Z^4$, $Y^1$ to $Y^4$, k, l, m and n have the same meanings as described above, hydrogen on a benzene ring may be substituted with fluorine, and X represents chlorine or bromine.

The phenol derivative (20) used above can be prepared according to a method of R. L. Kidwell, et al. (Org. Synth., V, 918 (1973)), for example, by reacting trialkyl borate with a Grignard reagent prepared from a benzene derivative (21) to give a boric acid ester derivative and then oxidizing this derivative with a peroxide such as hydrogen peroxide and peracetic acid.

-continued

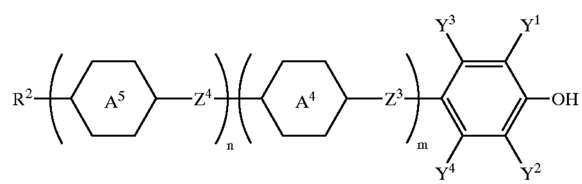

(20)

In Formulas, $R^2$, rings $A^4$ and $A^5$, $Z^3$, $Z^4$, $Y^1$ to $Y^4$, m and n have the same meanings as described above, $R^{10}$ represents an alkyl group, and $X^1$ represents a chlorine atom or a bromine atom.

The compound represented by Formula (1) can preferably be prepared by the following method as well. Specifically, carboxylic acid derivative (22) is reacted with propanedithiol and a strong acid such as trifluoroacetic acid in a suitable solvent such as toluene to obtain a dithianium salt (23). The reaction is carried out at room temperature to the boiling point of the solvent, and preferably at 100° C. or higher with removing produced water to isolate the salt in a stable form. The salt (23) can be tetrafluoroborate or perchlorate in addition to dithianium trifluoromethanesulfonate. Subsequently, the salt (23) is reacted with a base such as triethylamine in a suitable solvent such as methylene chloride in the presence of a phenol derivative (20) to obtain dithioortho ester derivative (24). The derivative (24) is then oxidatively fluorinated to obtain the compound (1) by reacting with a fluorinating agent such as triethylamine-3HF, and further, with an oxidizing agent such as NBS and bromine. The reaction is carried out at lower temperature, preferably at −100° C. to −50° C. for practical reasons.

In the respective examples, Cr represents crystal, N represents a nematic phase, and Iso represents an isotropic liquid phase.

EXAMPLE 1

Preparation of 1-(3-(trans-4-(trans-4-pentylcyclohexyl)-cyclohexyl)-1,1-difluoropropyleneoxy)-3,4,5-trifluorobenzene (the compound of Formula (1), wherein 1=1 and k=m=n=0; $R^1$ is n-pentyl; both ring $A^2$ and ring $A^3$ are trans-1,4-cyclohexylene groups; $Z^2$ is a single bond; both $Y^1$ and $Y^2$ are hydrogen atoms; and all of $Y^3$, $Y^4$ and $R^2$ are fluorine atoms (Compound No. 40))

First step

In a 1-L three-neck flask equipped with a stirrer, a thermometer and a dropping funnel, 27.6 g (122.9 mmol) of ethyl diethylphosphinoacetate was dissolved in 350 ml of IRAQ tetrahydrofuran (hereinafter abbreviated as THF) under nitrogen atmosphere and the solution was cooled down to −5° C. while stirring. 15.2 g (135.2 mmol) of potassium t-butoxide was added thereto, and the solution

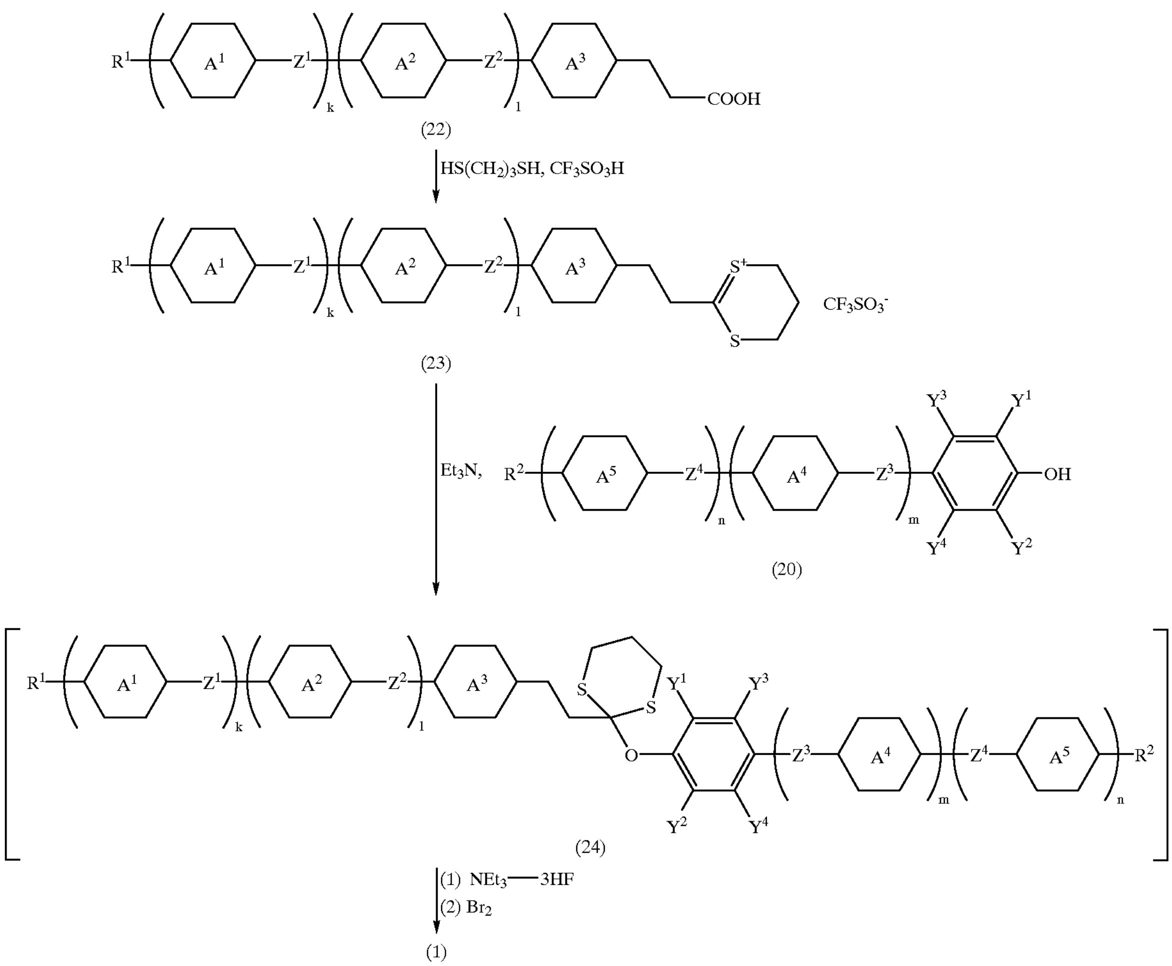

In Formulas, $R^1$, $R^2$, rings $A^1$ to $A^5$, $Z^1$ to $Z^4$, $Y^1$ to $Y^4$, k, l, m and n have the same meanings as described above, and hydrogen on a benzene ring may be substituted with fluorine.

The present invention shall further be explained below in details with reference to examples.

was stirred at room temperature for 2 hours. The solution was cooled down again to 0° C., and a solution of 25.0 g (94.5 mmol) of trans-4-(trans-4-pentylcyclohexyl) cyclohexanecarbaldehyde dissolved in 100 ml of THF was added dropwise. Further, the solution was stirred at room temperature for 14 hours, and then 200 ml of water and 400 ml of toluene were added to the reaction mixture and stirred. The separated toluene layer was washed twice with 200 ml of water and dried over anhydrous magnesium sulfate, and then toluene was distilled off under reduced pressure. The residue was purified by means of a silica gel column chromatography with toluene used as a developing solvent to obtain 12.8 g of ethyl 3-(trans-4-(trans-4-pentylcyclohexyl)cyclohexyl)propenoate (yellow oily substance).

Second step

In 100-ml flask, 12.8 g (38.3 mmol) of ethyl 3-(trans-4-(trans-4-pentylcyclohexyl)cyclohexyl)propenoate obtained above was dissolved in a mixed solvent of toluene/ethanol (50 ml/30 ml). 2.0 g of a 5% palladium-carbon catalyst was added thereto, and the mixture was stirred at room temperature under a hydrogen pressure of 0.1 MPa for 8 hours. The catalyst was separated by filtration, and then the filtrate was concentrated to obtain 13.5 g of a yellow oily substance. Then, this oily substance was dissolved in 150 ml of ethanol, and 50 ml (100 mmol) of a 2M aqueous sodium hydroxide solution was added thereto, followed by heating the solution under reflux for 3 hours. 300 ml of water was added thereto, and insoluble materials deposited were filtered and recrystallized from toluene to obtain 4.9 g of 3-(trans-4-(trans-4-pentylcyclohexyl)-cyclohexyl)propionic acid as pale yellow crystals.

Third step

In a 100-ml three-neck flask equipped with a stirrer, a thermometer and a condenser, 4.9 g (16.0 mmol) of 3-(trans-4-(trans-4-pentylcyclohexyl)cyclohexyl)propionic acid obtained above, 2.9 g (19.2 mmol) of 3,4,5-trifluorophenol, 4.9 g (19.2 mmol) of 2-chloro-1-methylpyridinium iodide (Kazuhiko Saigo, Teruaki Mukaiyama et al., Bull. Chem. Soc. Jpn., 50 (7), 1863 (1977)) and 3.9 g (38.4 mmol) of triethylamine were dissolved in 50 ml of toluene under nitrogen atmosphere, and the solution was heated under reflux for 3 hours while stirring. 50 ml of 6M hydrochloric acid and 100 ml of toluene were added to the reaction mixture, and the solution was stirred. The toluene layer was washed with water (150 ml×3) and dried over anhydrous magnesium sulfate, and then toluene was distilled off under reduced pressure. The residue was purified by means of a silica gel column chromatography with a mixed solvent of heptane/toluene (75/25) as a developing solvent to obtain 6.4 g of 3,4,5-trifluorophenyl 3-(trans-4-(trans-4-pentylcyclohexyl)cyclohexyl)propionate as colorless crystals.

Fourth step

In a 300-ml three-neck flask equipped with a stirrer, a thermometer and a condenser, 6.4 g (14.5 mmol) of 3,4,5-trifluorophenyl 3-(trans-4-(trans-4-pentylcyclohexyl)cyclohexyl)propionate obtained above, 11.7 g (29.0 mmol) of Lawesson's reagent and 85 ml of mesitylene were heated under reflux for 8 hours under nitrogen atmosphere while stirring. The solution was cooled down to room temperature, insoluble materials were removed, and the filtrate was extracted with toluene. The toluene layer was washed twice in turn with 200 ml of water, 150 ml of a saturated aqueous sodium carbonate solution and 200 ml of water and dried over anhydrous magnesium sulfate, and then toluene was distilled off under reduced pressure. The residue was purified by means of a silica gel column chromatography with heptane as a developing solvent to obtain 0.9 g of 3,4,5-trifluorophenyl 3-(trans-4-(trans-4-pentylcyclohexyl)cyclohexyl)thione-O-propionate.

Fifth step

In a 200-ml three-neck Teflon flask equipped with a stirrer, a thermometer and a dropping funnel, 1.1 g (5.8 mmol) of NBS was dissolved in 15 ml of dichloromethane, and 1 ml of 70% HF-pyridine was added at −60° C. or lower while stirring, followed by further stirring for 30 minutes. Then, 0.9 g (2.0 mmol) of 3,4,5-trifluorophenyl 3-(trans-4-(trans-4-pentylcyclohexyl)cyclohexyl)thione-O-propionate obtained in the above step was dissolved in 20 ml of dichloromethane to prepare a solution, which was added dropwise to the reaction mixture. After dropwise adding, the solution was stirred at −10° to 0° C. for 2 hours. The reaction mixture was poured into 100 ml of a saturated aqueous sodium carbonate solution, and the dichloromethane layer was separated. It was washed three times with 150 ml of water and dried over anhydrous magnesium sulfate, and then the solvent was distilled off under reduced pressure. The residue was purified by means of a silica gel column chromatography with heptane as a developing solvent and recrystallized from a mixed solvent of equal amount of heptane/ethanol to obtain 0.7 g of the desired 1-(3-(trans-4-(trans-4-pentylcyclohexyl)cyclohexyl)-1,1-difluoropropyleneoxy)-3,4,5-trifluorobenzene (colorless crystals). This has a liquid crystal phase, and a transition point thereof is shown below.

Cr 65.5 (Sm 50.76); N 116.9 Iso

The measurements of the various spectral data strongly supported the structure thereof.

$^{1}$H-NMR (δ ppm, $CDCl_3$): 0.8–2.2 (m, 35H), 6.85–6.88 (m, 2H)

$^{19}$F-NMR (δ ppm): −79.26 (t, 2F, —$CF_2O$—), −133.53 to −133.65 (m, 2F), −165.00 to −165.06 (m, 1F)

GC-MS(EI): 460($M^+$, 12.5%), 148(92.4), 97(93.6), 83(100), 81(55.0), 69(54.9), 55(76.4), 41(30.7)

EXAMPLE 2

Preparation of 1-(3-(2,6-difluoro-4-(4-pentylphenyl)phenyl)-1,1-difluoropropyleneoxy)-3-fluoro-4-trifluoromethoxybenzene (the compound of Formula (1), wherein 1=1 and k=m=n=0; $R^1$ is n-pentyl; ring $A^2$ is a 1,4-phenylene group; ring $A^3$ is a 3,5-difluoro-1,4-phenylene group; $Z^2$ is a single bond; all of $Y^1$, $Y^2$ and $Y^4$ are hydrogen atoms; $Y^3$ is a fluorine atom; and $R^2$ is trifluoromethoxy (Compound No. 66))

First step

In a 500-ml three-neck flask equipped with a stirrer, a thermometer and a dropping funnel, 15.0 g (57.6 mmol) of 2,6-difluoro-4-(4-pentylphenyl)benzene was dissolved in 100 ml of THF under nitrogen atmosphere, and 43 ml (69.1 mmol) of n-BuLi (1.6M cyclohexane solution) was added dropwise at −65° C. or lower while stirring, followed by further stirring for one hour. Then, 7.2 g (63.4 mmol) of formylpiperidine was added dropwise thereto at −65° C. or lower, and the solution was further stirred for 2 hours. 200 ml of water was added to the reaction mixture, which was extracted with 400 ml of toluene, and the toluene layer was washed twice with 200 ml of water and then dried over anhydrous magnesium sulfate. Toluene was distilled off under reduced pressure, and the residue was purified by means of a silica gel column chromatography with toluene as a developing solvent to obtain 13.1 g of 2,6-difluoro-4-(4-pentylphenyl)benzaldehyde.

Second step

In a 500-ml three-neck flask equipped with a stirrer, a thermometer and a dropping funnel, 21.1 g (54.6 mmol) of methoxymethyltriphenylphosphonium chloride was suspended in 80 ml of THF under nitrogen atmosphere, and 6.4 g (57.3 mmol) of potassium t-butoxide was added at −30° C. or lower while stirring, followed by stirring at 0° C. for 2 hours. This mixture was cooled down again to −30° C. or lower, and 100 ml of a THF solution of 13.1 g (45.5 mmol) of 2,6-difluoro-4-(4-pentylphenyl)benzaldehyde obtained in the above step was added dropwise, followed by stirring at room temperature for 6 hours. 150 ml of water and 200 ml of heptane were added to the reaction mixture and insoluble materials were removed. Then, the separated heptane layer was washed twice with 150 ml of water and dried over anhydrous magnesium sulfate, and heptane was distilled off under reduced pressure to obtain a concentrated residue. The residue thus obtained was dissolved in a mixed solution of 150 ml of THF and 30 ml of 6M hydrochloric acid, and the solution was stirred at room temperature for 8 hours under nitrogen atmosphere. THF was distilled off under reduced pressure to obtain a concentrate, and 200 ml of toluene and 150 ml of water were added thereto. The separated toluene layer was washed twice with 150 ml of water and dried over anhydrous magnesium sulfate, and then the solvent was distilled off under reduced pressure. The residue was purified by means of a silica gel column chromatography with toluene as a developing solvent to obtain 9.5 g of 2-(2,6-difluoro-4-(4-pentylphenyl)phenyl)acetaldehyde.

Third step

In a 100-ml three-neck flask equipped with a stirrer, a thermometer and a condenser, 9.5 g (31.4 mmol) of 2-(2,6-difluoro-4-(4-pentylphenyl)phenyl)acetaldehyde obtained in the above step was dissolved in 150 ml of methanol under nitrogen atmosphere, and 1.8 g (47.1 mmol) of sodium borohydride was added thereto at 5° C. while stirring, followed by further stirring for 2 hours. 50 ml of 6M hydrochloric acid and 150 ml of toluene were added to the reaction mixture, and the separated toluene layer was washed three times with 150 ml of water and dried over anhydrous magnesium sulfate. Toluene was distilled off under reduced pressure to obtain 9.5 g of 2-(2,6-difluoro-4-(4-pentylphenyl)phenyl)ethanol.

Fourth step

In a 300-ml three-neck flask equipped with a stirrer, a condenser and a Dean-Stark dehydrator, 9.5 g (31.2 mmol) of 2-(2,6-difluoro-4-(4-pentylphenyl)-phenyl)ethanol obtained in the above step was dissolved in 100 ml of toluene, and 13.4 g (78.0 mmol) of 47% hydrobromic acid was added, followed by heating under reflux for 4 hours. The solution was cooled down to a room temperature, and then 100 ml of water and 100 ml of toluene were added. The separated toluene layer was washed in order with 100 ml of a saturated aqueous sodium carbonate solution and 150 ml of water and then dried over anhydrous magnesium sulfate. Toluene was distilled off under reduced pressure, and the residue was purified by means of a silica gel column chromatography with heptane as a developing solvent to obtain 6.5 g of 2-(2,6-difluoro-4-(4-pentylphenyl)phenyl)-bromoethane.

Fifth step

In a 200-ml three-neck flask equipped with a stirrer, a thermometer and a dropping funnel, 0.5 g (19.6 mmol) of magnesium shavings were suspended in 10 ml of THF under nitrogen atmosphere, and 6.5 g (17.8 mmol) of 2-(2,6-difluoro-4-(4-pentylphenyl)phenyl)bromoethane obtained in the above step was added dropwise thereto at 60° C. or lower while stirring to prepare a Grignard reagent. Then, this Grignard reagent was cooled down to 5° C., and 3.4 g (44.5 mmol) of carbon disulfide was added dropwise, followed by stirring at room temperature for 2 hours. 50 ml of 6M hydrochloric acid and 150 ml of diethyl ether were added to the reaction mixture, and the separated ether layer was washed twice with 100 ml of water and then dried over anhydrous magnesium sulfate. The solvent was distilled off under reduced pressure, and the residue was recrystallized from heptane to obtain 4.8 g of 3-(2,6-difluoro-4-(4-pentylphenyl)phenyl)dithiopropionic acid.

Sixth step

In a 300-ml three-neck flask equipped with a stirrer, a thermometer and a dropping funnel, 0.7 g (27.7 mmol) of sodium hydride (60% oil based) was suspended in 10 ml of THF under nitrogen atmosphere, and 10 ml of a THF solution of 2.6 g-(13.2 mmol) of 3-fluoro-4-tifluoromethoxyphenol was added dropwise thereto while stirring, followed by stirring at room temperature for 30 minutes. 20 ml of a THF solution of 4.8 g (13.2 mmol) of 3-(2,6-difluoro-4-(4-pentylphenyl)phenyl)dithiopropionic acid obtained in the above step was added dropwise thereto, and the solution was stirred at 60° C. for one hour. Then, 25 ml of a THF solution of 4.0 g (15.8 mmol) of iodine was added dropwise thereto at 60° C., and the solution was further stirred for 2 hours. 100 ml of water and 150 ml of toluene were added to the reaction mixture, and the separated toluene layer was washed twice in order with 50 ml of a 10% aqueous sodium hydrogensulfite solution and 100 ml of water and then dried over anhydrous magnesium sulfate. Toluene was distilled off under reduced pressure, and the residue was purified by means of a silica gel column chromatography with a mixed solvent of heptane/toluene (95/5) as a developing solvent to obtain 4.4 g of 3-fluoro-4-trifluoromethoxyphenyl 3-(2,6-difluoro-4-(4-pentyiphenyl)phenyl)thione-O-propionate.

Seventh step

In a 200-ml three-neck Teflon flask equipped with a stirrer, a thermometer and a dropping funnel, 4.6 g (25.3 mmol) of NBS was dissolved in 50 ml of dichloromethane and 5 ml of 70% HF-pyridine was added at −60° C. or lower while stirring, followed by further stirring for 30 minutes. Then, 40 ml of a dichloromethane solution of 4.4 g (8.4 mmol) of 3-fluoro-4-trifluoromethoxyphenyl 3-(2,6-difluoro-4-(4-pentylphenyl)phenyl)thione-O-propionate obtained in the above step was added dropwise thereto, and then the solution was stirred at −10° to 0° C. for 2 hours. The reaction mixture was poured into 200 ml of a saturated aqueous sodium carbonate solution, and then the separated dichloromethane layer was washed three times with 150 ml of water and dried over anhydrous magnesium sulfate. The solvent was distilled off under reduced pressure, and the residue was purified by means of a silica gel column chromatography with a mixed solvent of heptane/toluene (95/5) as a developing solvent and recrystallized from a mixed solution of equal amount of heptane/ethanol to obtain 2.1 g of desired 1-(3-(2,6-difluoro-4-(4-pentylphenyl)phenyl)-1,1-difluoropropyleneoxy)-3-fluoro-4-trifluoromethoxybenzene.

EXAMPLE 3

Preparation of 1-(3-(trans-4-propylcyclohexyl)cyclohexyl)-1,1-difluoropropyleneoxy)-3,4,5-trifluorobenzene (the compound of Formula (1), wherein 1=1 and k=m=n=0; $R^1$ is n-propyl; both ring $A^2$ and ring $A^3$ are trans-1,4-cyclohexylene groups; $Z^2$ is a single bond; both $Y^1$ and $Y^2$ are hydrogen atoms; and all of $Y^3$, $Y^4$ and $R^2$ are fluorine atoms (Compound No. 39))

First step

In a flask equipped with a stirrer, a thermometer and a dropping funnel, 3.36 g of sodium hydride was dissolved in 50 ml of THF under nitrogen atmosphere and the solution was cooled down to −5° C. with stirring. 30 ml of a THF solution of ethyl diethylphosphinoacetate (18.8 g) was added dropwise thereto, and the solution was further stirred for 2 hours. After observing hydrogen gas generation, 50 ml of a THF solution of trans-4-(trans-4-propylcyclohexyl)-cyclohexanecarbaldehyde (16.5 g) was added dropwise. Further, the solution was warmed to room temperature and stirred for 3 hours. After stirring, water was added to the reaction mixture and extracted with toluene (50 ml×3). The organic layer was washed with water, dried over anhydrous magnesium sulfate, and then concentrated under reduced pressure to obtain 10.0 g of ethyl 3-(trans-4-(trans-4-propylcyclohexyl)cyclohexyl)propenoate.

Second step 10.0 g of ethyl 3-(trans-4-(trans-4-propylcyclohexyl) cyclohexyl)propenoate obtained above was dissolved in a mixed solvent of toluene/ethanol (1/1, 80 ml). 1.8 g of a 5% palladium-carbon catalyst was added thereto, and the mixture was stirred under hydrogen atmosphere for 8 hours. After stirring, the catalyst was separated by filtration, and then the filtrate was concentrated under reduced pressure to obtain a yellow oily substance. Then, this oily substance was dissolved in 80 ml of ethanol, and 30 ml of a 2N aqueous sodium hydroxide solution was added thereto, followed by stirring the solution at room temperature for 8 hours. After stirring, water was added to the solution, which was adjusted to pH 4 with 2N hydrochloric acid, and precipitated crystals were filtered. The resulting crystals were recrystallized from THF/ether (1/8, 50 ml) to obtain 4.0 g of 3-(trans-4-(trans-4-propylcyclohexyl)cyclohexyl)propionic acid as white crystals.

Third step

To the suspension of 5.0 of 3-(trans-4-(trans-4-propylcyclohexyl)cyclohexyl)propionic acid obtained above in toluene was added 2.5 g of 1,3-propanedithiol, and the mixture was heated to 50° C. with stirring. 3.5 g of trifluoromethanesulfonic acid was added dropwise thereto over 30 minutes, and the mixture was then heated under reflux for 4 hours to remove produced water by using a Dean-Stark apparatus. The reaction solution was concentrated under reduced pressure, and diethyl ether was added to precipitate crystals. The crystals were filtered to obtain 4.0 g of 2-(2-(trans-4-(trans-4-propylcyclohexyl)-cyclohexyl)ethyl)-1,3-dithianilium triflate.

Fourth step 1.27 g of 3,4,5-trifluorophenol and 870 mg of triethylamine were dissolved in 10 ml of methylene chloride, and the solution was stirred at −78° C. To the solution was added dropwise 5 ml of a methylene chloride solution of 2-(2-(trans-4-(trans-4-propylcyclohexyl)cyclohexyl)ethyl)-1,3-dithianilium triflate obtained above (3.8 g), and the to solution was further stirred for one hour. 6.24 ml of $Et_3N.3HF$ was then -added, and a methylene chloride solution of bromine (6.24 g) was further added dropwise. After stirring at −70° C. for one hour, the reaction solution was allowed to gradually warm up. It was poured into 100 ml of a cold 3N sodium hydroxide solution at 0° C. and extracted with methylene chloride (30 ml×3). The organic layer was washed with water, dried over anhydrous magnesium sulfate, and then concentrated under reduced pressure. The resulting yellow oily substance was isolated and purified by a silica gel column chromatography with heptane as a developing solvent to obtain 1.0 g of 1-(3-(trans-4-propylcyclohexyl)cyclohexyl)-1,1-difluoropropyleneoxy)-3,4,5-trifluorobenzene as colorless crystals. A transition point thereof is shown below.

Cr 68.6 N 113.16 I (° C.)

The various spectral data strongly supported the structure thereof.

$^1$H-NMR (δ ppm, $CDCl_3$): 0.8–2.2 (31H, m), 6.85–6.88 (2H, m)

$^{19}$F-NMR (δ ppm, $CDCl_3$): −79.26 (2F, t), −133.53 to −133.65 (2F, m), −165.00 to −165.06 (1F, m,)

GC-MS(EI): 432($M^+$, 18.5%), 69(100), 148(80.1), 83(75.5), 81(47.5), 95(42.7), 82(42.8), 55(39.0)

EXAMPLE 4

Preparation of 1-(3-(trans-4-(trans-4-propylcyclohexyl)-cyclohexyl)-1,1-difluoropropyleneoxy)-2,3-difluoro-4-ethoxybenzene (the compound of Formula (1), wherein 1=1 and k=m=n=0; $R^1$ is n-propyl; both ring $A^2$ and ring $A^3$ are trans-1,4-cyclohexylene groups; $Z^2$ is a single bond; both $Y^2$ and $Y^4$ are hydrogen atoms; both $Y^1$ and $Y^3$ are fluorine atoms; and $R^2$ is ethoxy (Compound No. 46))

First step

In a 3-L three-neck flask equipped with a stirrer, a thermometer and a dropping funnel, 32.0 g (114.9 mmol) of 3-(trans-4-(trans-4-propylcyclohexyl)cyclohexyl)propionic acid and 20.0 g (114.9 mmol) of 2,3-difluoro-4-ethoxyphenol were dissolved in 1000 ml of dichloromethane at room temperature under nitrogen atmosphere, and 15.4 g (126.4 mmol) of 4-dimethylaminopyridine was added thereto. The solution was stirred for 30 minutes thereafter, and then 26.1 g (126.4 mmol) of dicyclohexylcarbodiimide was dissolved in 400 ml of dichloromethane to prepare a solution, which was added dropwise to the reaction mixture at room temperature. After dropwise adding, the solution was stirred at room temperature for 14 hours. 500 ml of water was added to the reaction solution, insoluble materials were filtered, and then the filtrate was washed with 300 ml of 3M hydrochloric acid, 300 ml of water, 300 ml of a saturated aqueous sodium hydrogencarbonate solution and 600 ml of water and dried over anhydrous magnesium sulfate. The solvent was distilled off from the reaction solution under reduce pressure to obtain 56.4 g of a concentrated substance, which was then purified by means of a silica gel column chromatography with a mixed solvent of heptane/ethyl acetate (7/3) used as a developing solvent to obtain 51.4 g of 2,3-difluoro-4-ethoxyphenyl 3-(trans-4-(trans-4-propylcyclohexyl)cyclohexyl)propionate as colorless crystals.

Second step

In a 2-L three-neck flask equipped with a stirrer, a thermometer and a dropping funnel, 51.4 g (118.0 mmol) of 2,3-difluoro-4-ethoxyphenyl 3-(trans-4-(trans-4-propylcyclohexyl)cyclohexyl)propionate obtained above, 95.5 g (236.0 mmol) of a Lawesson's reagent and 470 ml of mesitylene were mixed under nitrogen atmosphere and heated under reflux for 4 hours while stirring. The solution was cooled down to room temperature, insoluble materials were filter off, then 500 ml of water was added to the filtrate, and the solution was extracted with 400 ml of toluene. The extracted layer was washed in order with 500 ml of water, 300 ml of a saturated aqueous sodium hydrogencarbonate solution and 1000 ml of water and then dried over anhydrous magnesium sulfate. The solvent was distilled off from the reaction solution under reduce pressure to obtain a concentrated substance, which was then purified by means of a silica gel column chromatography with a mixed solvent of toluene/heptane (1/1) as a developing solvent to obtain 14.2 g of 2,3-difluoro-4-ethoxyphenyl 3-(trans-4-(trans-4-propylcyclohexyl)cyclohexyl)thione-O-propionate as yellow crystals.

Third step

In a 500-ml three-neck Teflon® flask equipped with a stirrer, a thermometer and a dropping funnel, 5.5 g (31.0 mmol) of NBS was dissolved in 130 ml of dichloromethane under nitrogen atmosphere and 14 ml of 70% HF-pyridine was added at −60° C. or lower while stirring, followed by further stirring for 30 minutes. Then, 7.00 g (15.5 mmol) of 2,3-difluoro-4-ethoxyphenyl 3-(trans-4-(trans-4-propylcyclohexyl)cyclohexyl)thione-O-propionate obtained in the above step was dissolved in 65 ml of dichloromethane to prepare a solution, which was added dropwise to the reaction mixture. After dropwise adding, the solution was stirred at −10° C. for 3 hours. The reaction mixture was poured into 500 ml of a saturated aqueous sodium carbonate solution, and then the dichloromethane layer was separated. It was washed three times with 200 ml of water and dried over anhydrous magnesium sulfate. The solvent was distilled off under reduced pressure, and the residue was purified by means of a silica gel column chromatography with a mixed solvent of toluene/heptane (3/7) as a developing solvent and further recrystallized from a mixed solution of equal amount of heptane/ethanol to obtain 2.7 g of the desired 1-(3-(trans-4-(trans-4-propylcyclohexyl) cyclohexyl)-1,1-difluoropropyleneoxy)-2,3-difluoro-4-ethoxybenzene. This has a liquid crystal phase, and a transition point thereof is shown below.

Cr 47.4 Cr 51.9 SA 99.5 N 164.0 Iso

The measurements of the various spectral data strongly supported the structure thereof.

$^{1}$H-NMR (δ ppm, $CDCl_3$): 0.82–1.12 (m, 13H), 1.12–1.34 (m, 5H), 1.45 (t, 3H), 1.50–1.55 (m, 3H), 1.68–1.80 (m, 8H), 2.12–2.20 (m, 2H), 4.10 (q, 2H), 6.63–6.67 (m, 1H), 6.94–6.97 (m, 1H)

$^{19}$F-NMR (δ ppm): −72.0 to −72.1 (t, 2F), −150.8 to −150.9 (m, 1F), −156.5 to −156.6 (m, 1F)

The following Compounds No. 1 to No. 204 can be prepared based on the descriptions in Examples 1 to 4 and Detailed Description of the Invention. The compounds obtained in Examples 1 to 4 are also shown as follows.

| No. | Structure | Data |
|---|---|---|
| 1 | 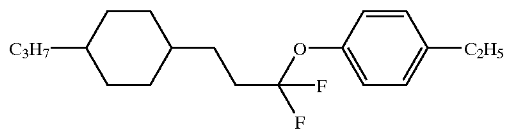 | |
| 2 | 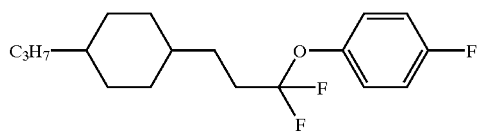 | |
| 3 | 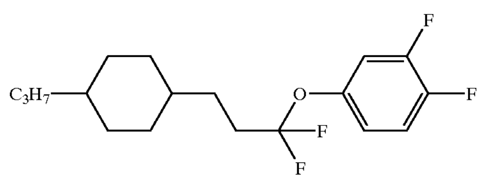 | |
| 4 | 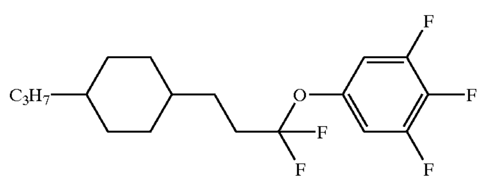 | |
| 5 | 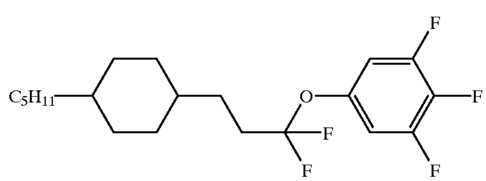 | |
| 6 | 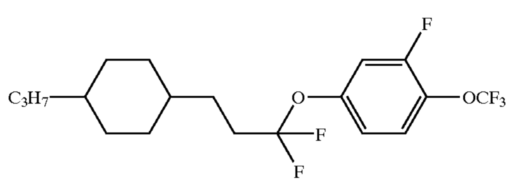 | |

-continued
| No. | Structure | Data |
|---|---|---|
| 7 | 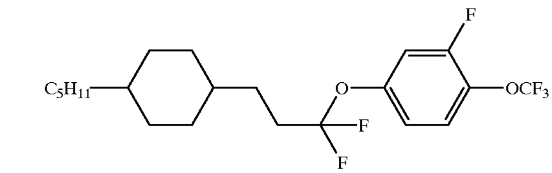 | |
| 8 | 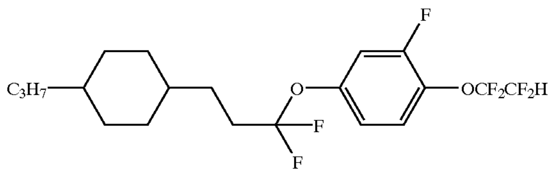 | |
| 9 | 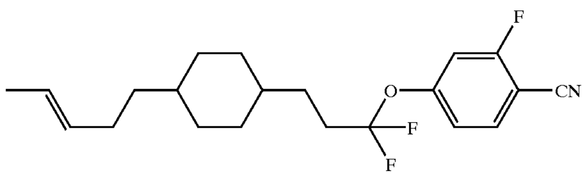 | |
| 10 | 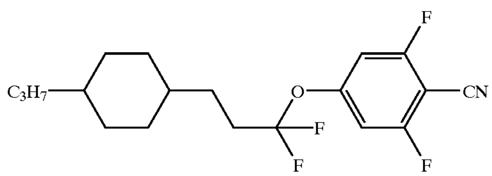 | |
| 11 | 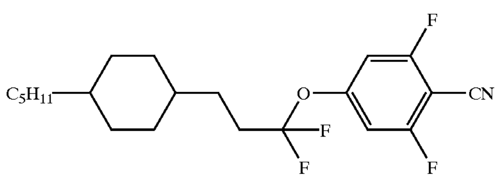 | |
| 12 | 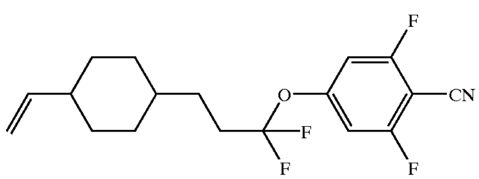 | |
| 13 | 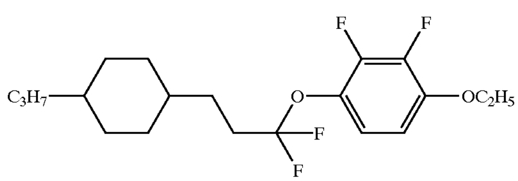 | |
| 14 | 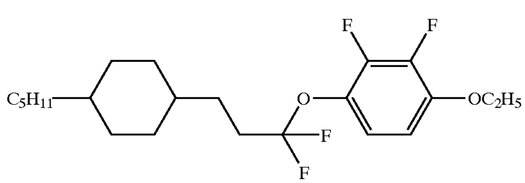 | |

-continued
| No. | Structure | Data |
| --- | --- | --- |
| 15 | 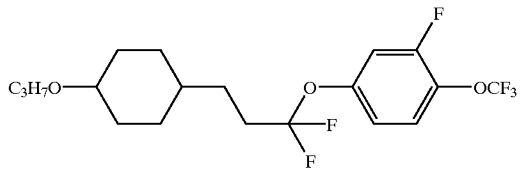 | |
| 16 | 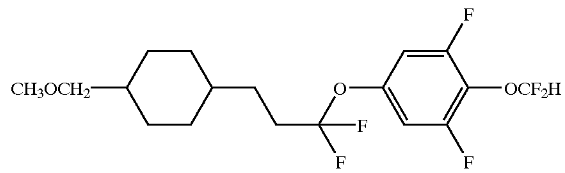 | |
| 17 | 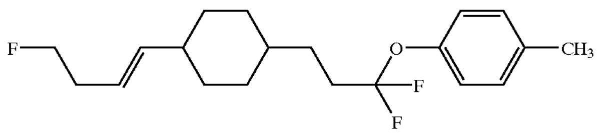 | |
| 18 | 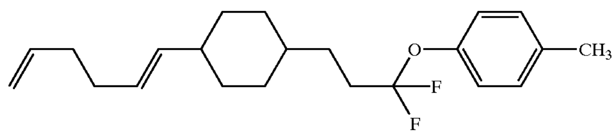 | |
| 19 | 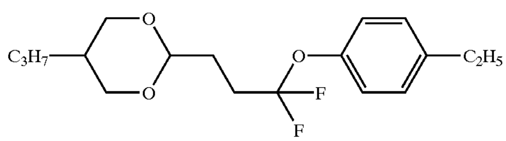 | |
| 20 | 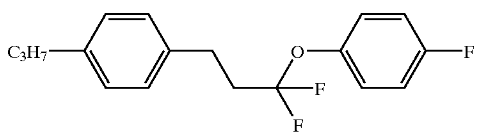 | |
| 21 | 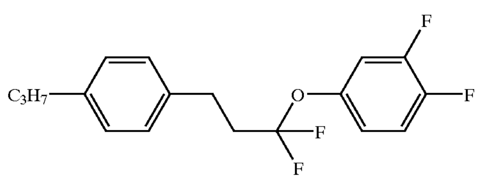 | |
| 22 | 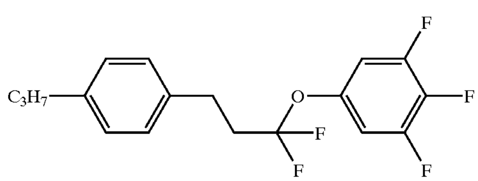 | |
| 23 | 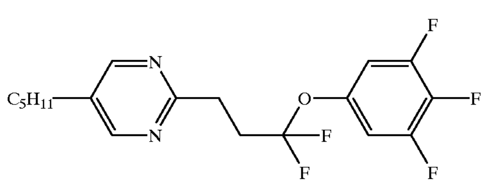 | |

-continued
| No. | Structure | Data |
|---|---|---|
| 24 | 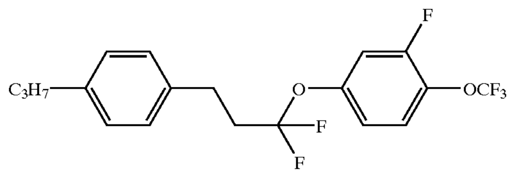 | |
| 25 | 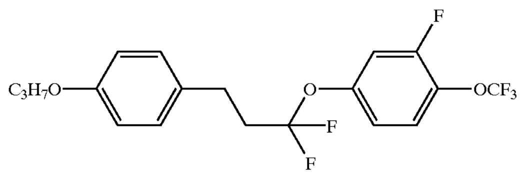 | |
| 26 | 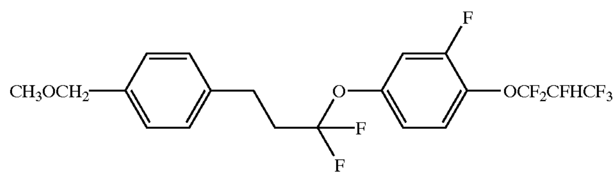 | |
| 27 | 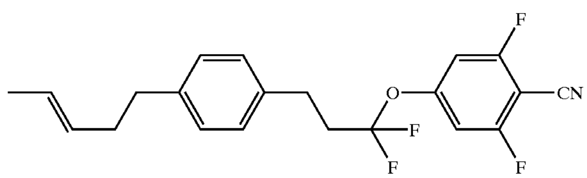 | |
| 28 | 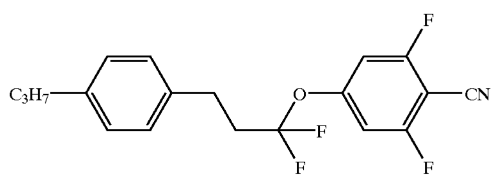 | |
| 29 | 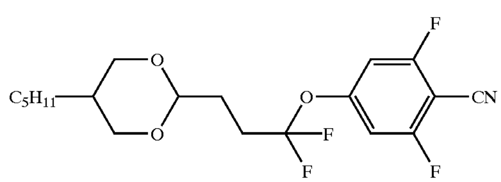 | |
| 30 | 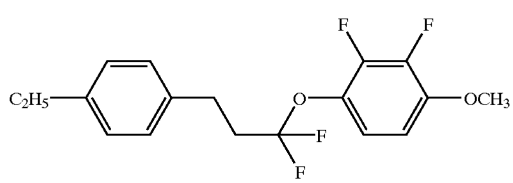 | |
| 31 | 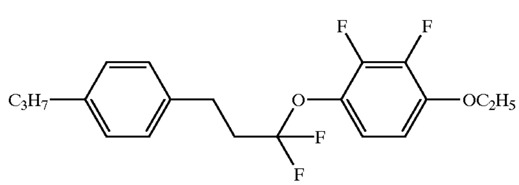 | |

-continued
| No. | Structure | Data |
|---|---|---|
| 32 | 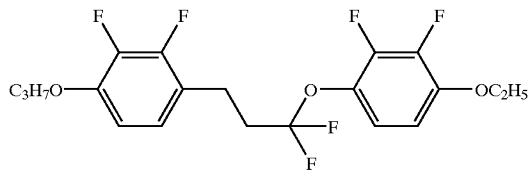 | |
| 33 | 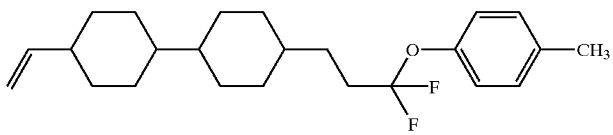 | |
| 34 | 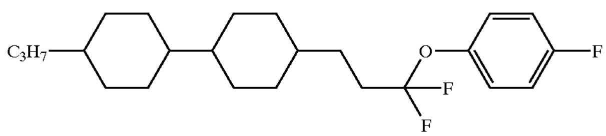 | |
| 35 | 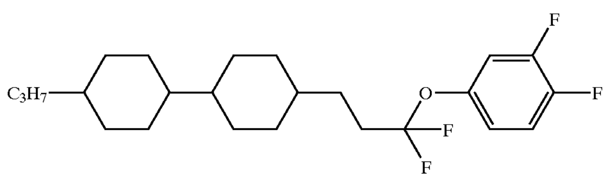 | |
| 36 | 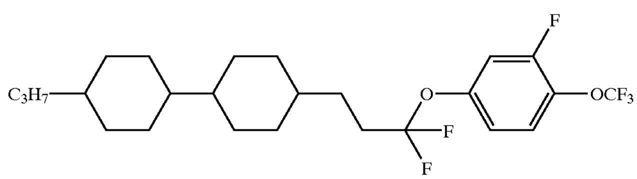 | |
| 37 | 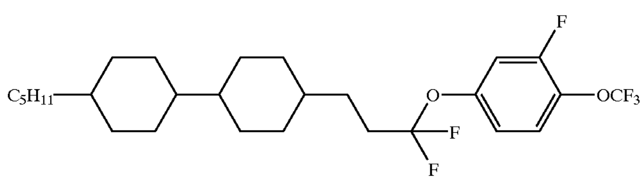 | |
| 38 | 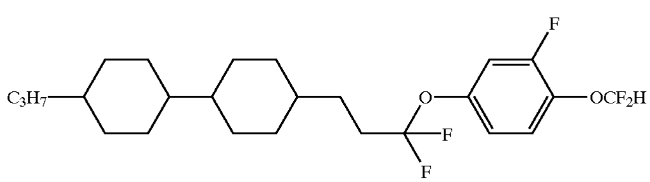 | |
| 39 | 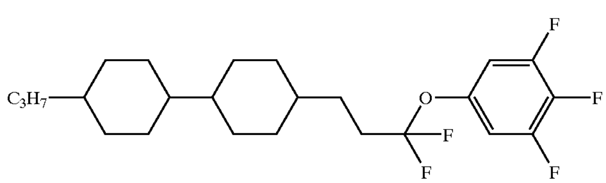 | |
| 40 | 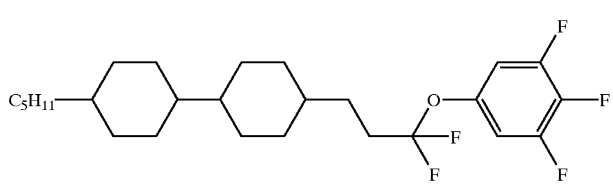 | Δϵ: 13.7<br>Δn: 0.077 |

-continued
| No. | Structure | Data |
|---|---|---|
| 41 | 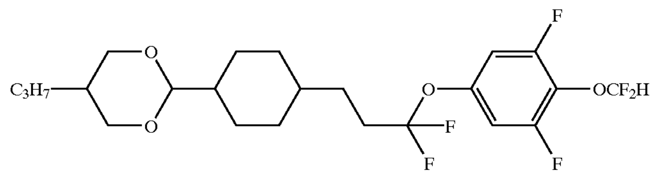 | |
| 42 | 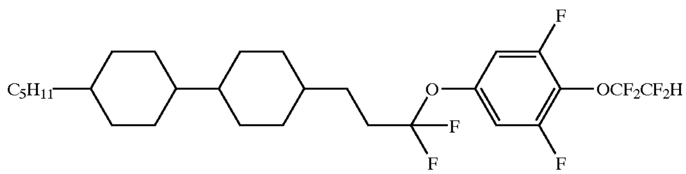 | |
| 43 | 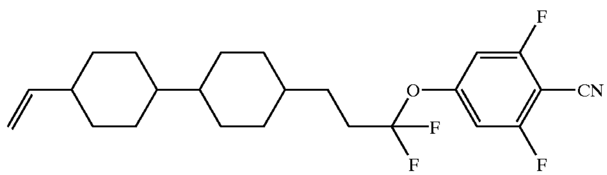 | |
| 44 | 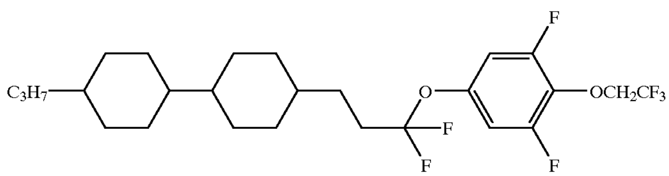 | |
| 45 | 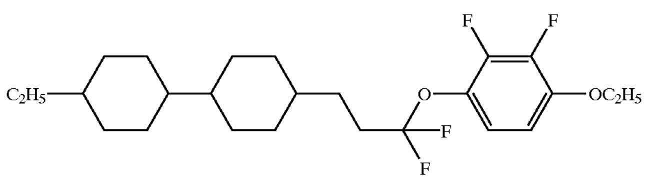 | |
| 46 | 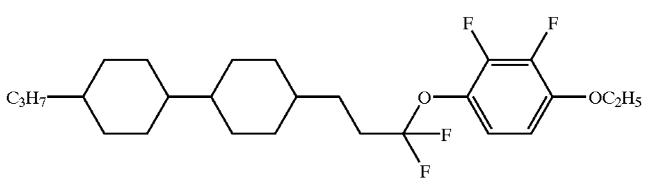 | $T_{NI}$: 143.3<br>$\Delta\epsilon$: −3.70<br>$\Delta n$: 0.100 |
| 47 | 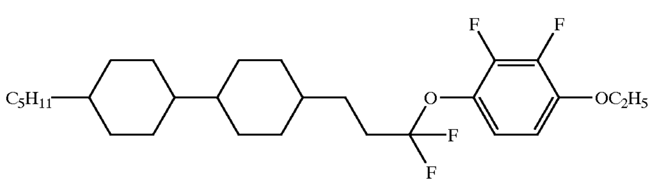 | |
| 48 | 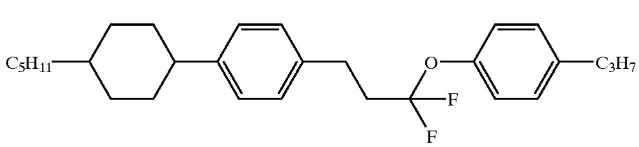 | |

-continued
| No. | Structure | Data |
|---|---|---|
| 49 | 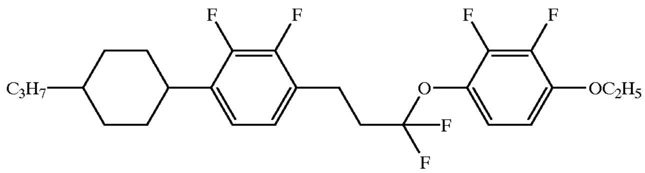 | |
| 50 | 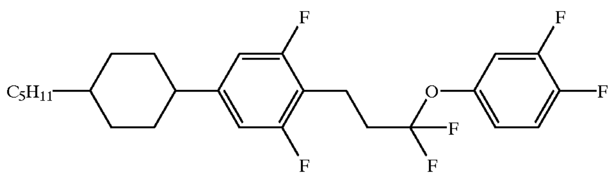 | |
| 51 | 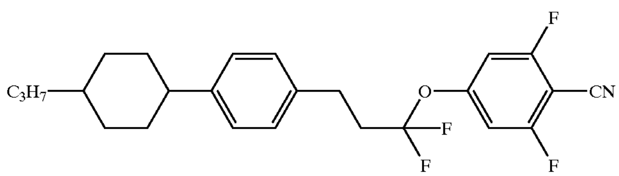 | |
| 52 | 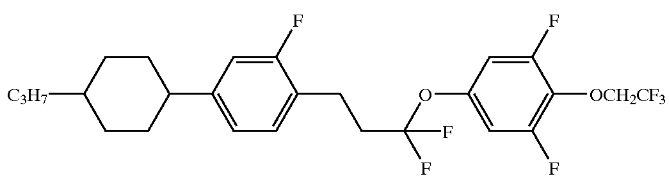 | |
| 53 | 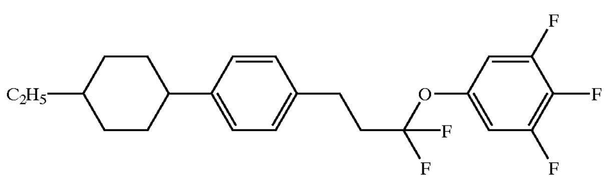 | |
| 54 | 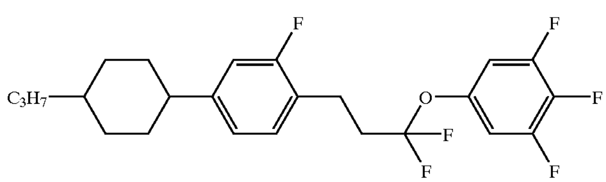 | |
| 55 | 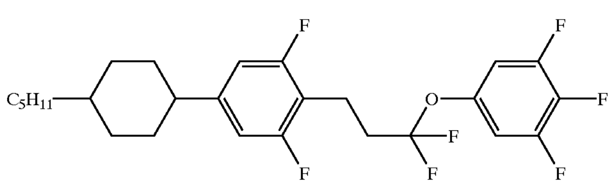 | |
| 56 | 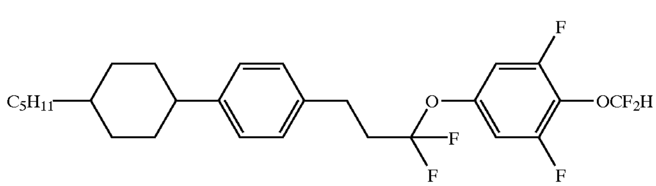 | |

-continued
| No. | Structure | Data |
| --- | --- | --- |
| 57 | 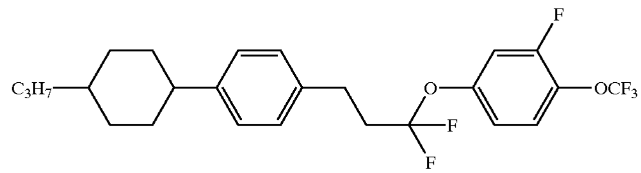 | |
| 58 | 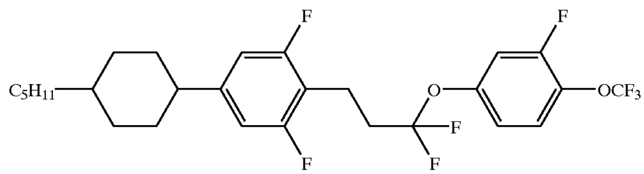 | |
| 59 | 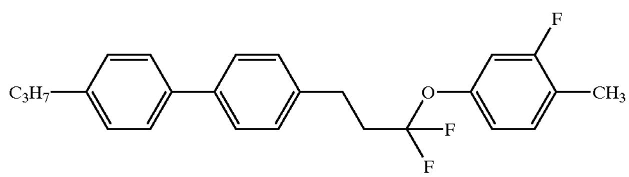 | |
| 60 | 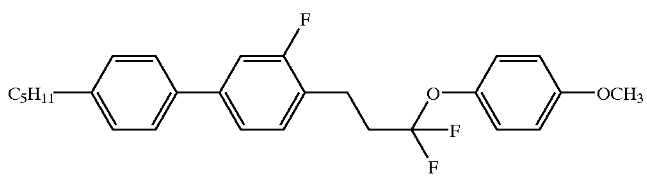 | |
| 61 | 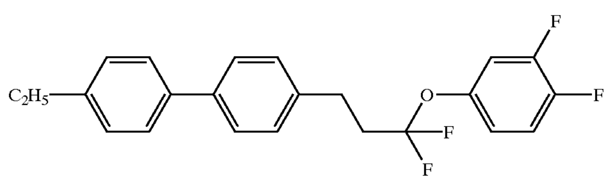 | |
| 62 | 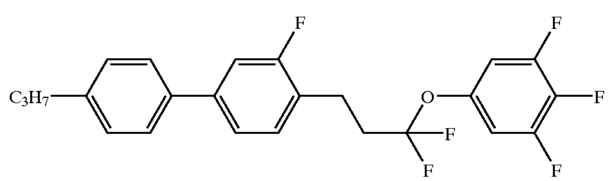 | |
| 63 | 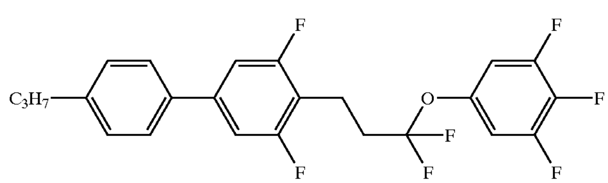 | Cr 42.2 Iso<br>$\Delta\epsilon$: 24.3<br>$\Delta n$: 0.110 |
| 64 | 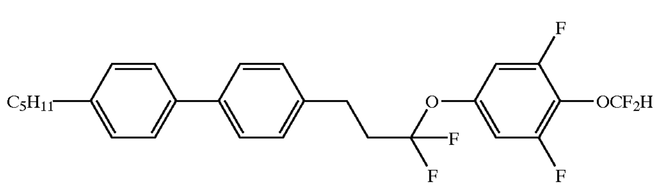 | |

-continued
| No. | Structure | Data |
|---|---|---|
| 65 | 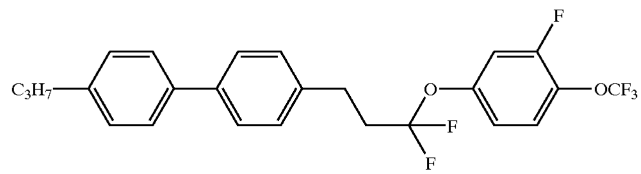 | |
| 66 | 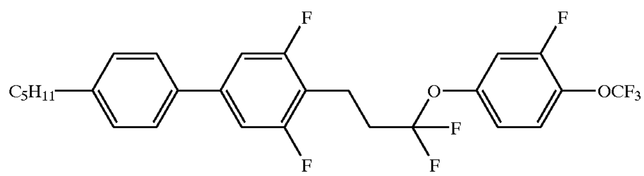 | |
| 67 | 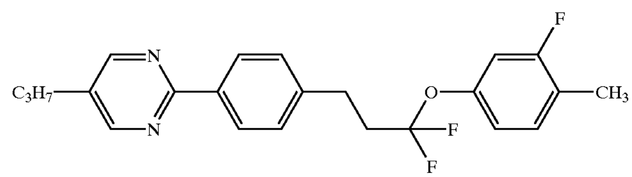 | |
| 68 | 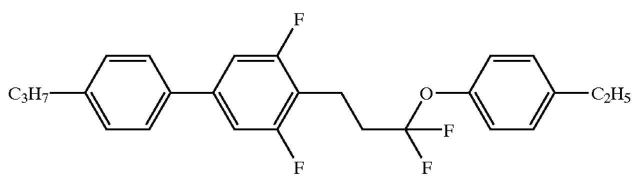 | |
| 69 | 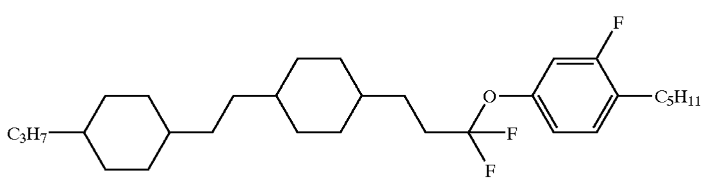 | |
| 70 | 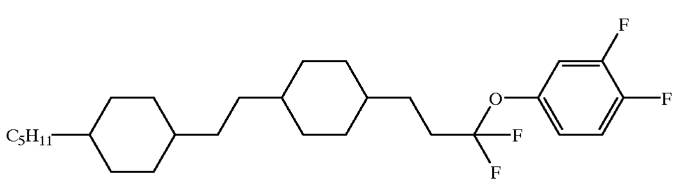 | |
| 71 | 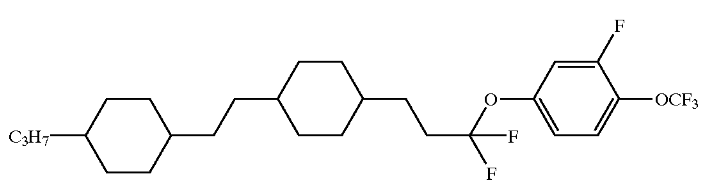 | |
| 72 | 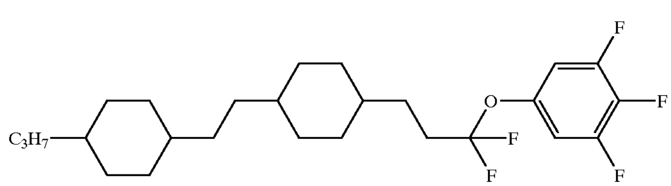 | |

-continued
| No. | Structure | Data |
| --- | --- | --- |
73
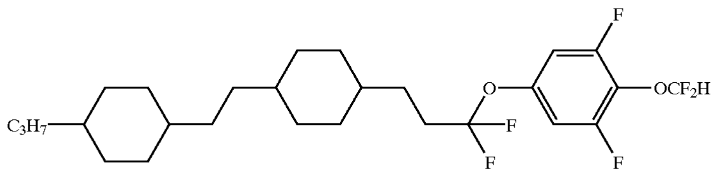
74
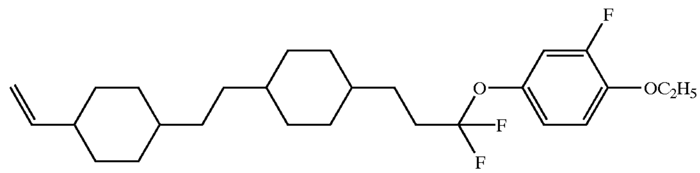
75
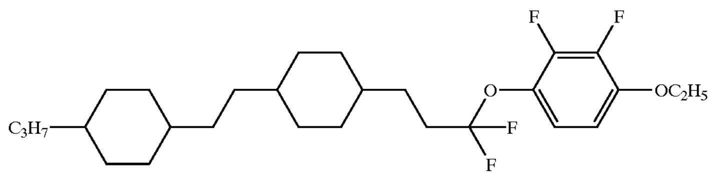
76
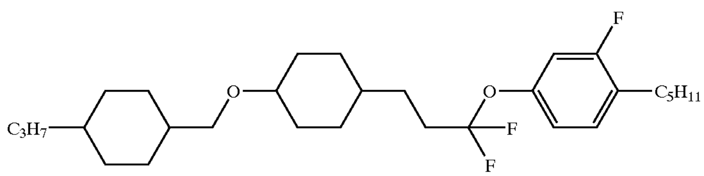
77
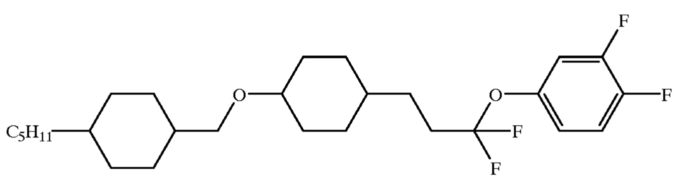
78
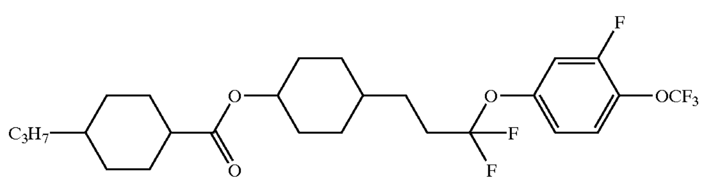
79
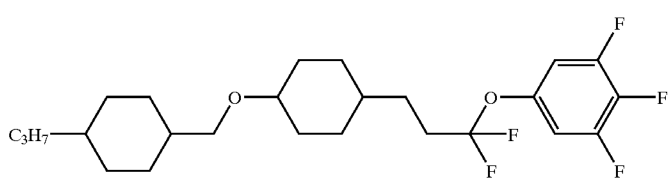
80
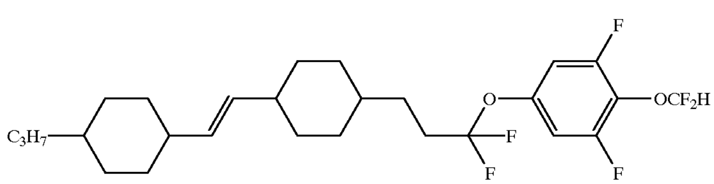

-continued
| No. | Structure | Data |
|---|---|---|
| 81 | 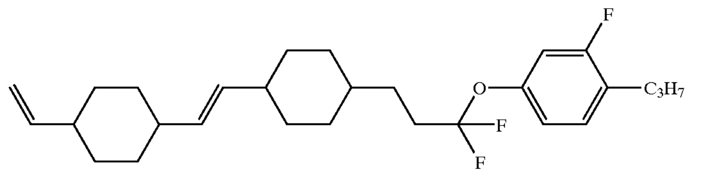 | |
| 82 | 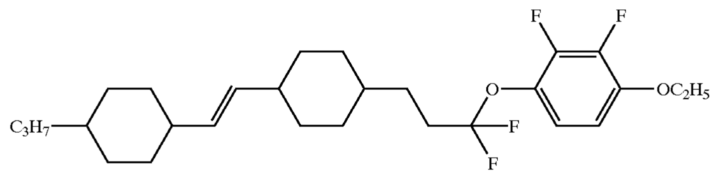 | |
| 83 | 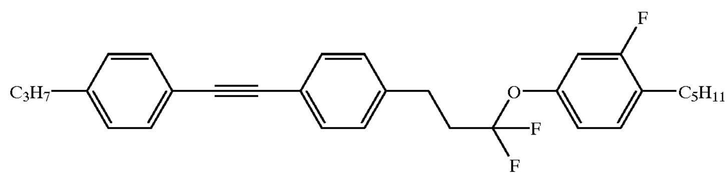 | |
| 84 | 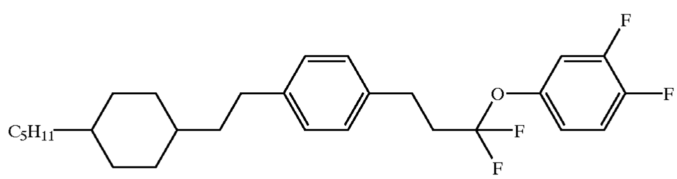 | |
| 85 | 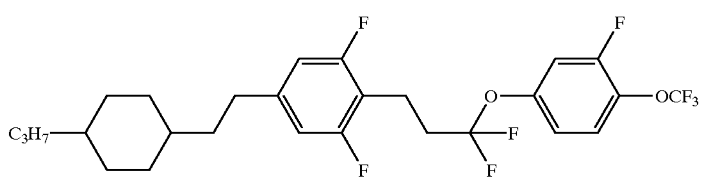 | |
| 86 | 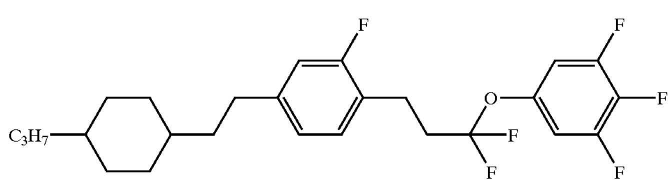 | |
| 87 | 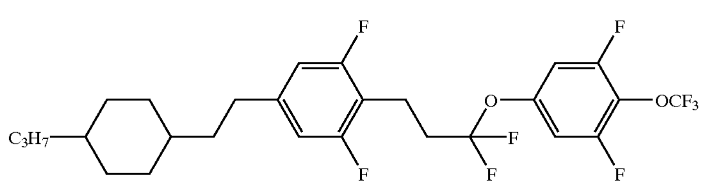 | |
| 88 | 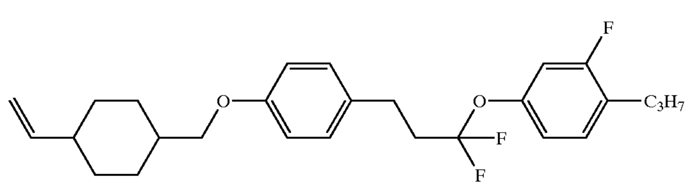 | |

-continued
| No. | Structure | Data |
|---|---|---|
| 89 | 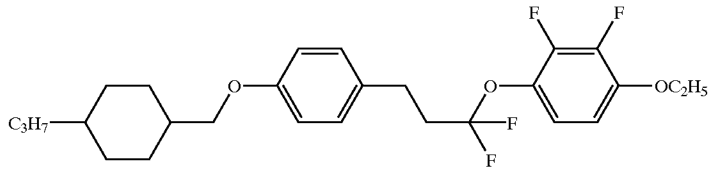 | |
| 90 | 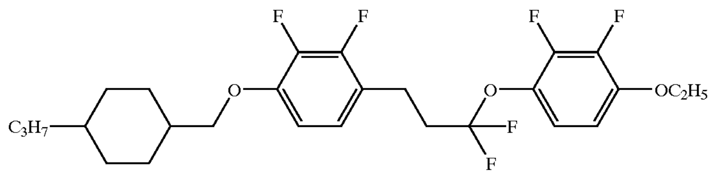 | |
| 91 | 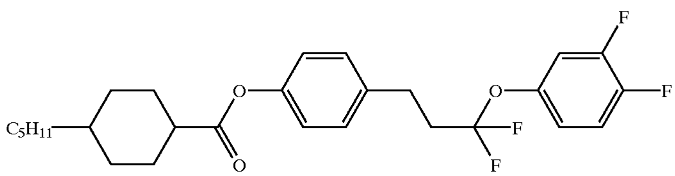 | |
| 92 | 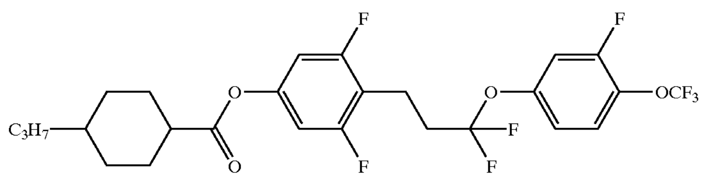 | |
| 93 | 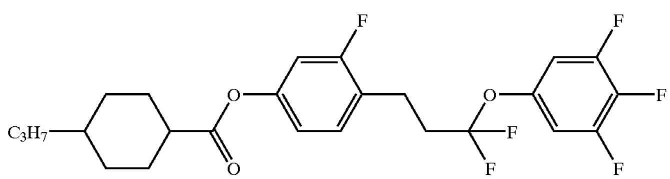 | |
| 94 | 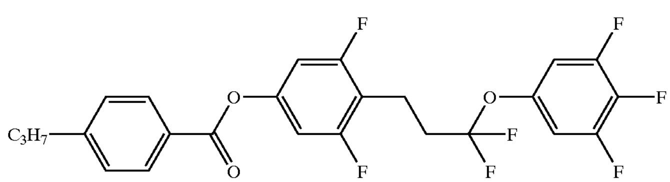 | |
| 95 | 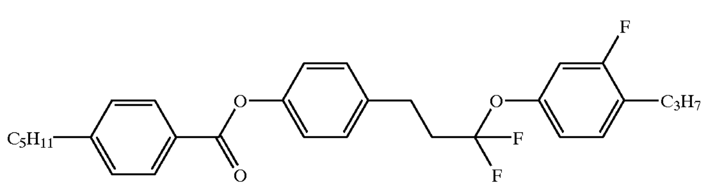 | |
| 96 | 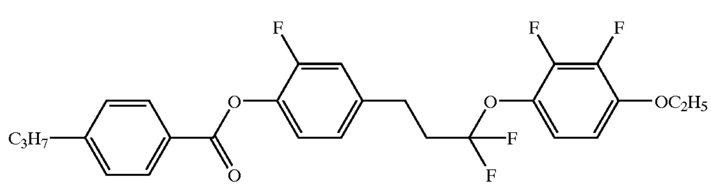 | |

-continued
| No. | Structure | Data |
|---|---|---|
| 97 | 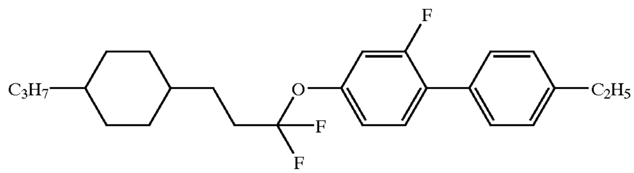 | |
| 98 | 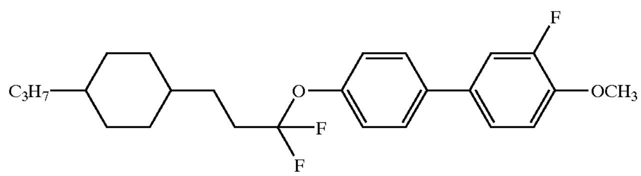 | |
| 99 | 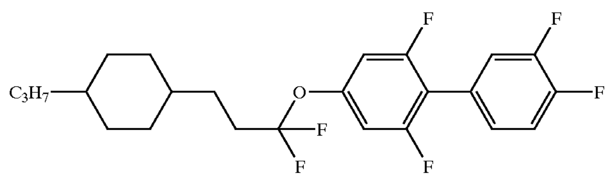 | |
| 100 | 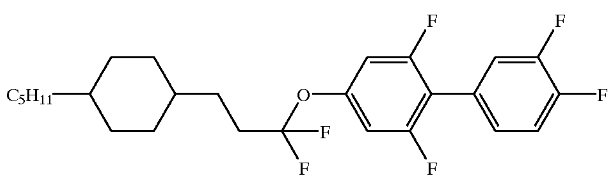 | |
| 101 | 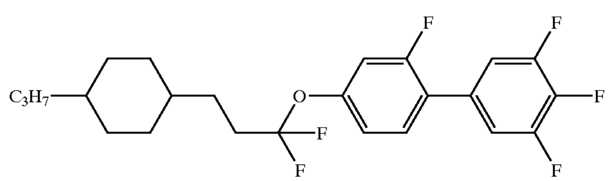 | |
| 102 | 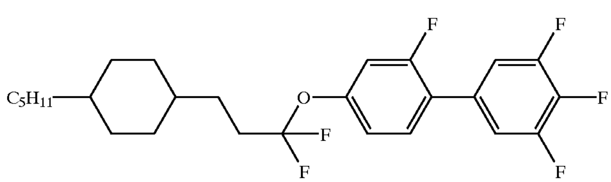 | |
| 103 | 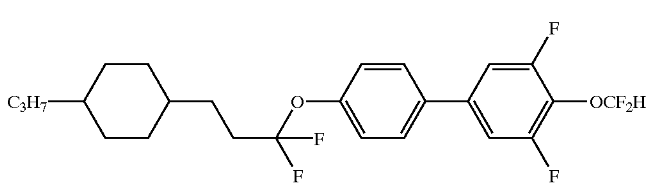 | |
| 104 | 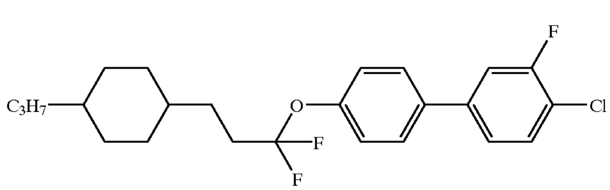 | |

-continued
| No. | Structure | Data |
|---|---|---|
| 105 | 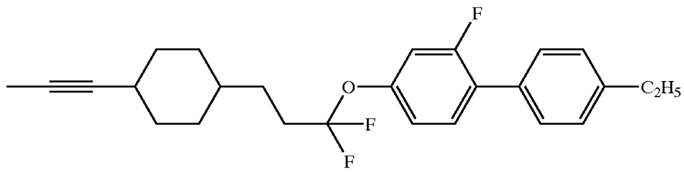 | |
| 106 | 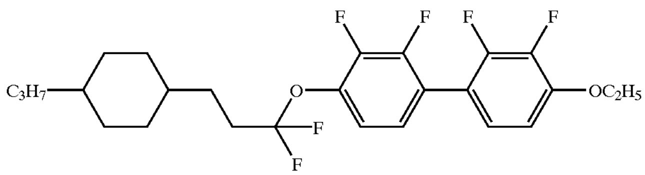 | |
| 107 | 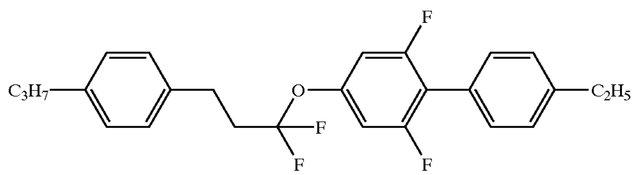 | |
| 108 | 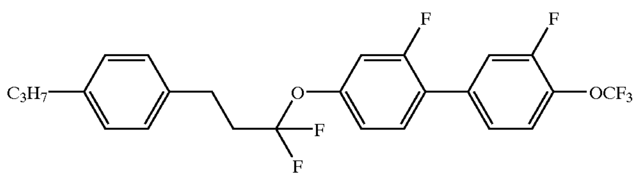 | |
| 109 | 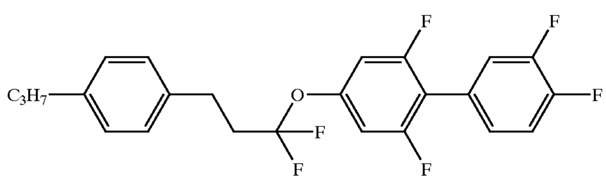 | |
| 110 | 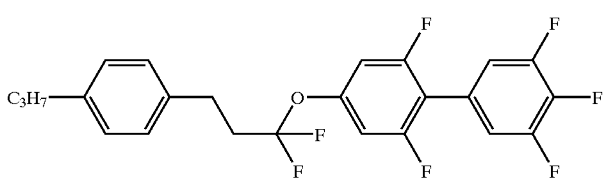 | |
| 111 | 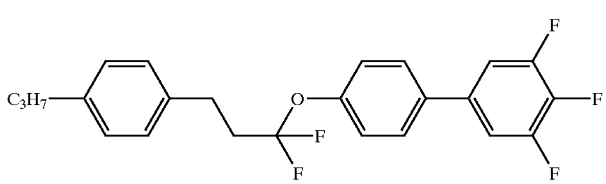 | |
| 112 | 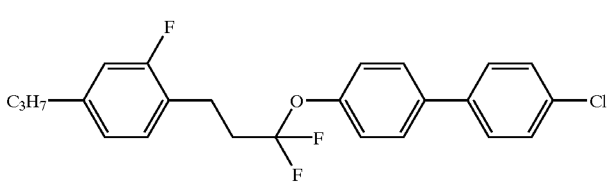 | |

-continued
| No. | Structure | Data |
|---|---|---|
| 113 | 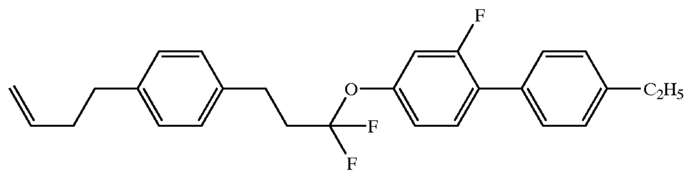 | |
| 114 | 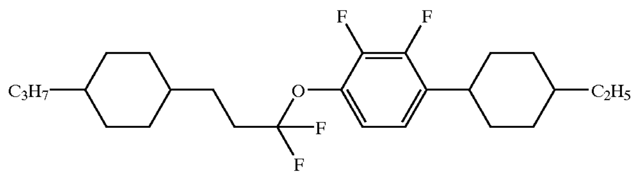 | |
| 115 | 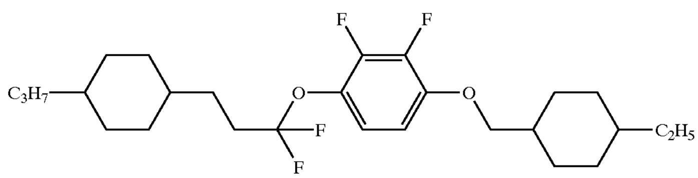 | |
| 116 | 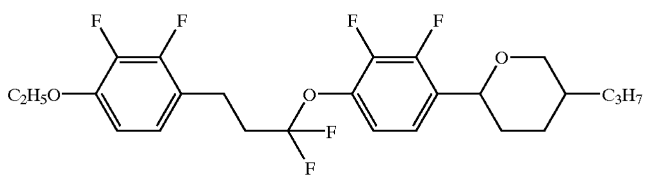 | |
| 117 | 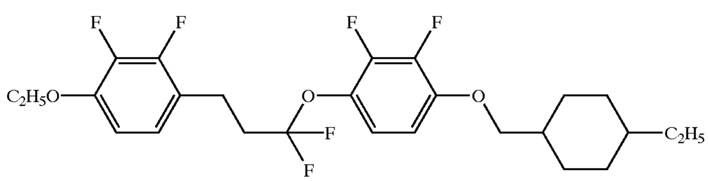 | |
| 118 | 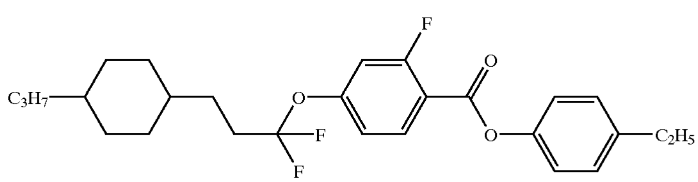 | |
| 119 | 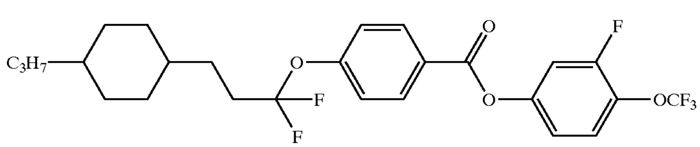 | |
| 120 | 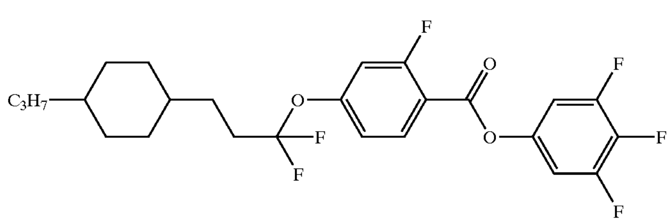 | |

-continued
| No. | Structure | Data |
|---|---|---|
| 121 | 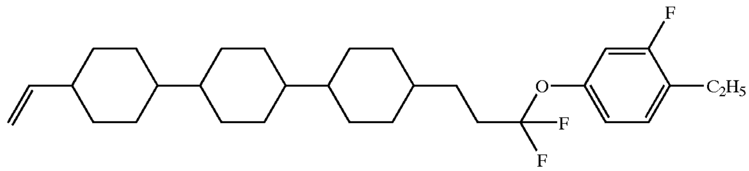 | |
| 122 | 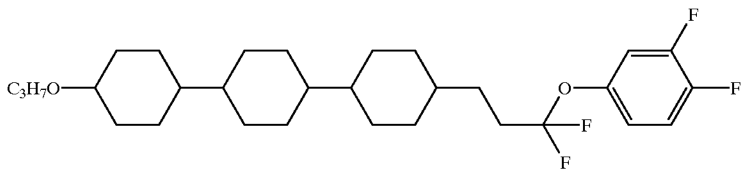 | |
| 123 | 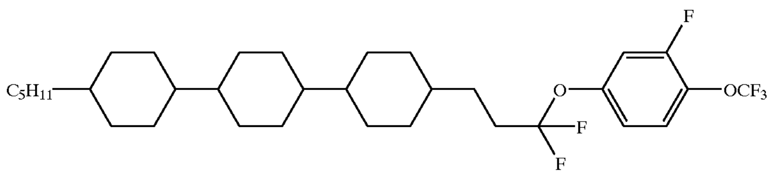 | |
| 124 | 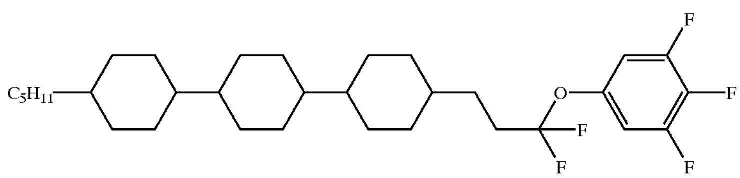 | |
| 125 | 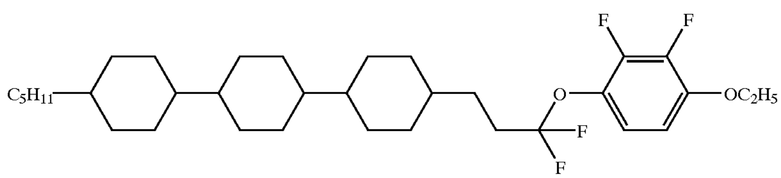 | |
| 126 | 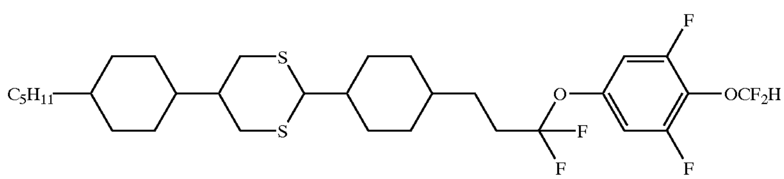 | |
| 127 | 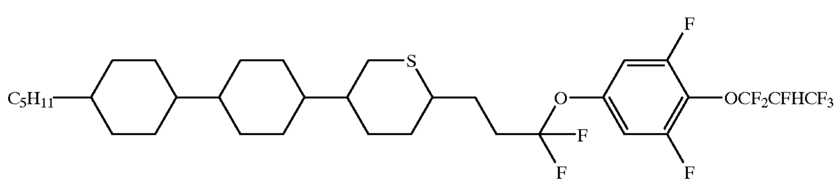 | |
| 128 | 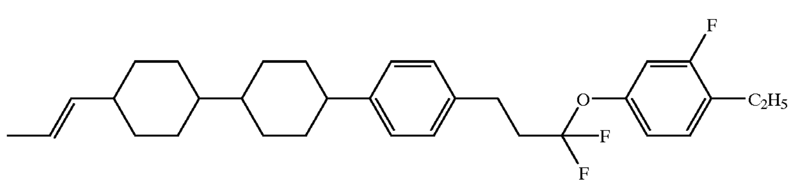 | |

-continued
| No. | Structure | Data |
|---|---|---|
| 129 | 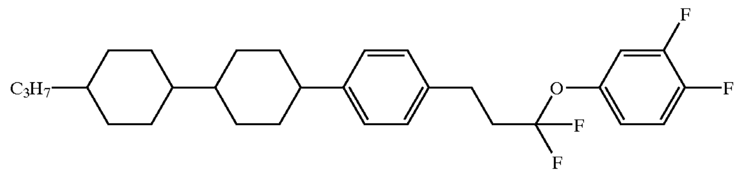 | |
| 130 | 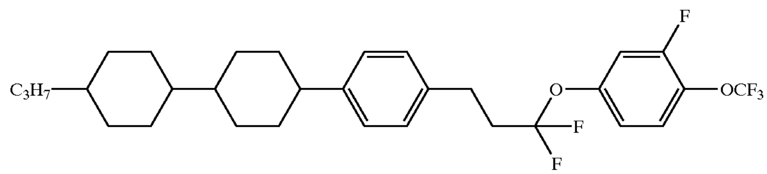 | |
| 131 | 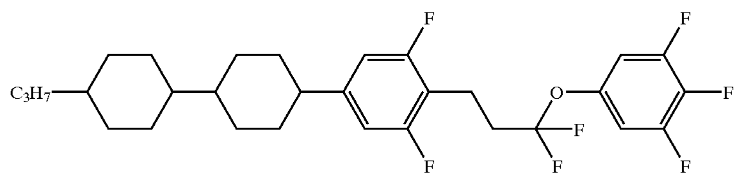 | |
| 132 | 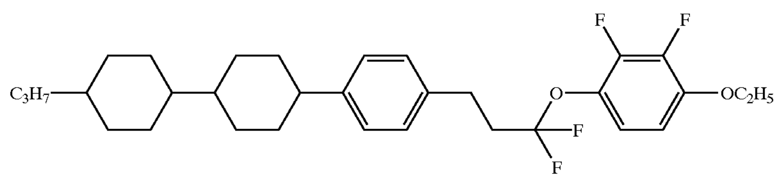 | |
| 133 | 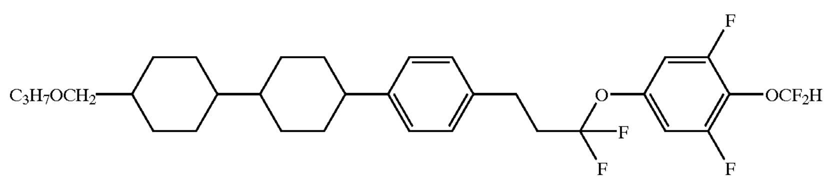 | |
| 134 | 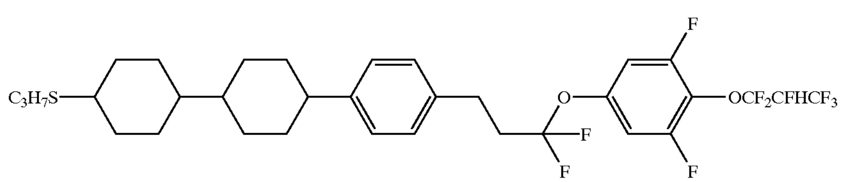 | |
| 135 | 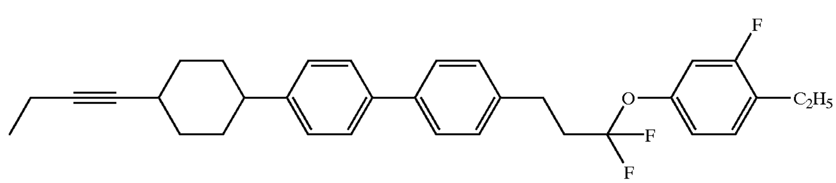 | |
| 136 | 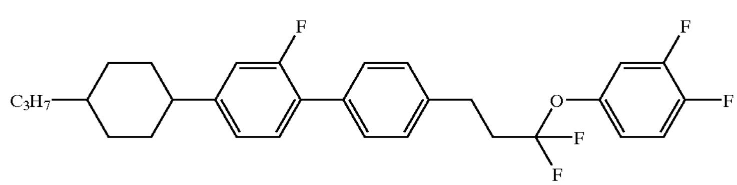 | |

-continued
| No. | Structure | Data |
| --- | --- | --- |
| 137 | 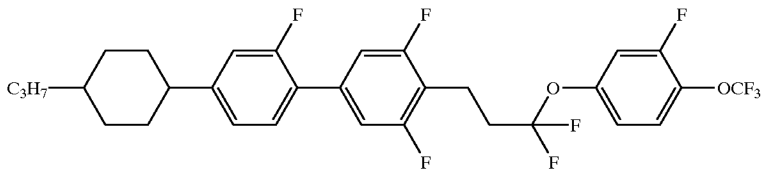 | |
| 138 | 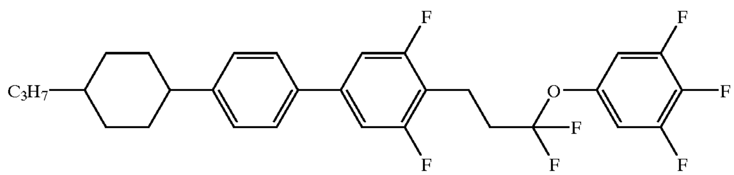 | |
| 139 | 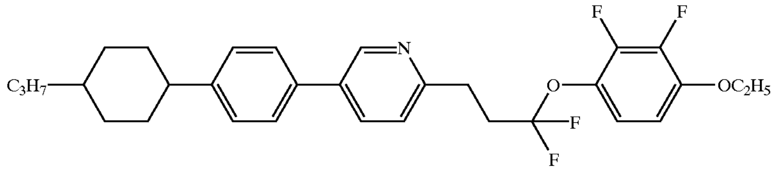 | |
| 140 | 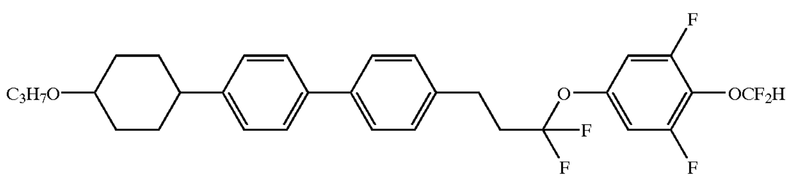 | |
| 141 | 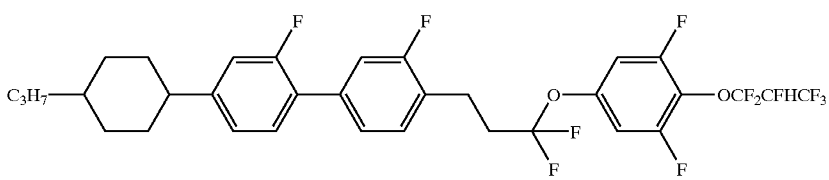 | |
| 142 | 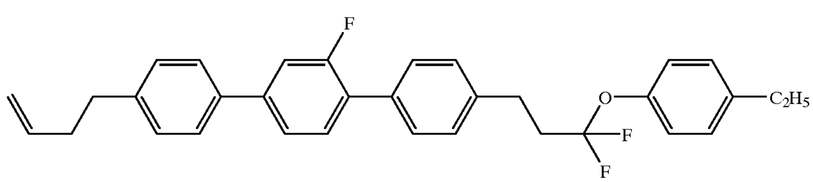 | |
| 143 | 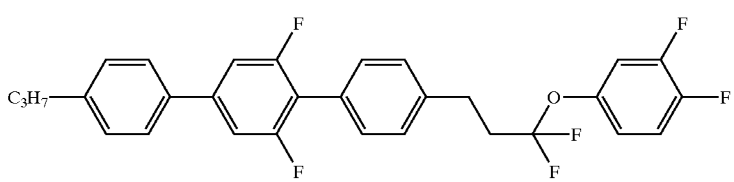 | |
| 144 | 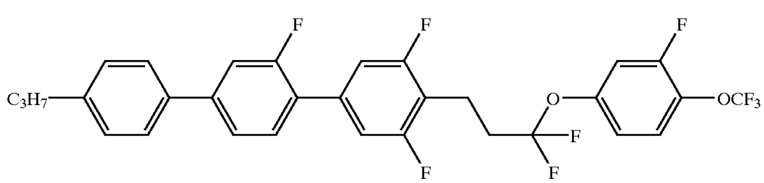 | |

-continued
| No. | Structure | Data |
| --- | --- | --- |
| 145 | 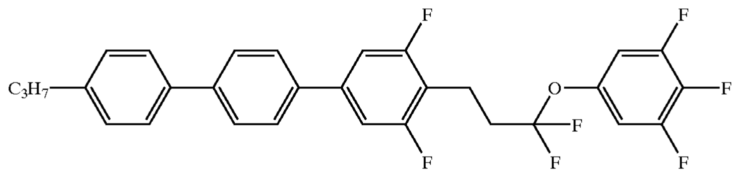 | |
| 146 | 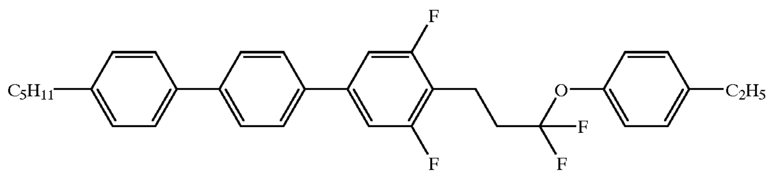 | |
| 147 | 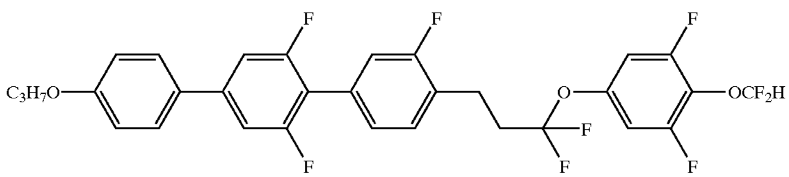 | |
| 148 | 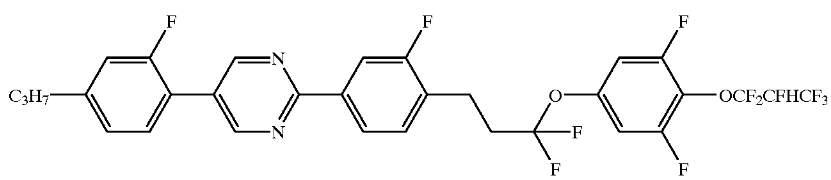 | |
| 149 | 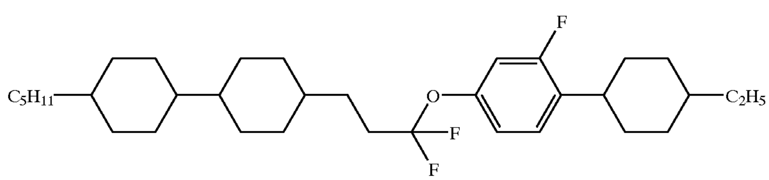 | |
| 150 | 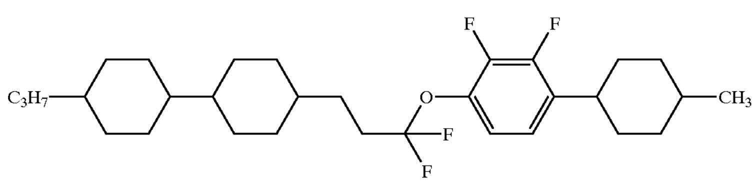 | |
| 151 | 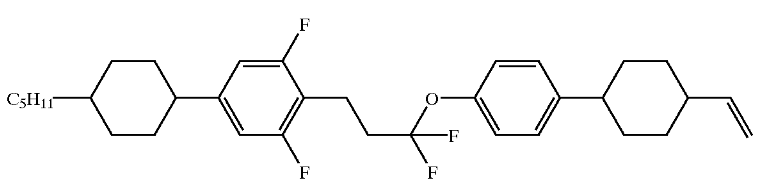 | |
| 152 | 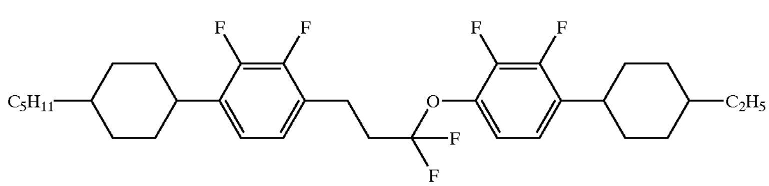 | |

-continued
| No. | Structure | Data |
| --- | --- | --- |
| 153 | 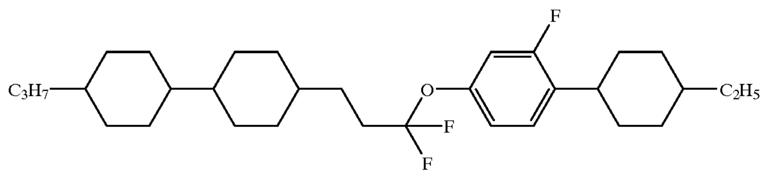 | |
| 154 | 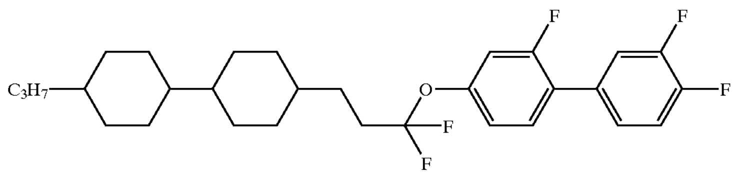 | |
| 155 | 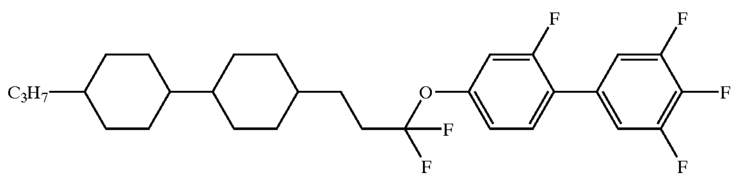 | |
| 156 | 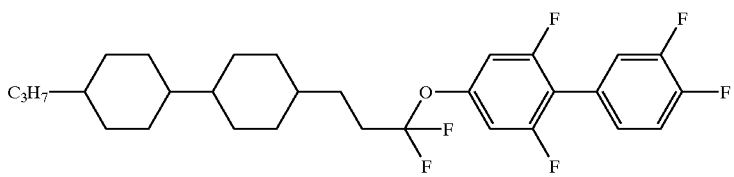 | |
| 157 | 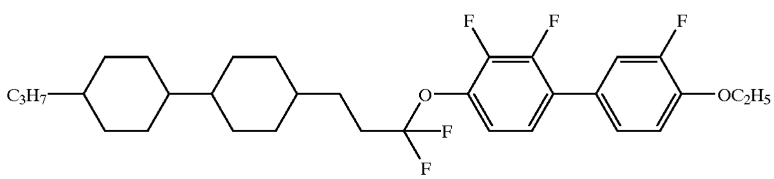 | |
| 158 | 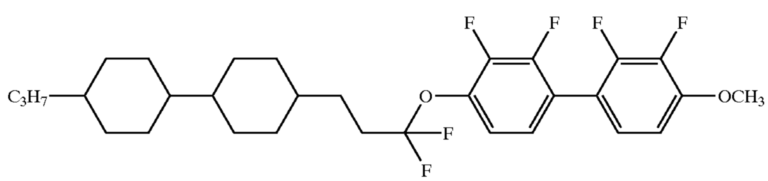 | |
| 159 | 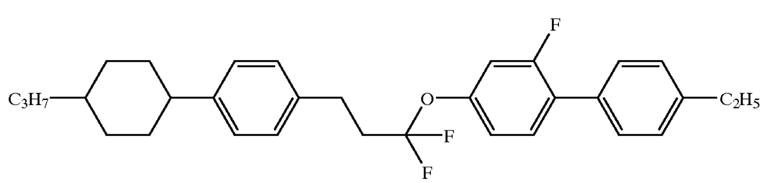 | |
| 160 | 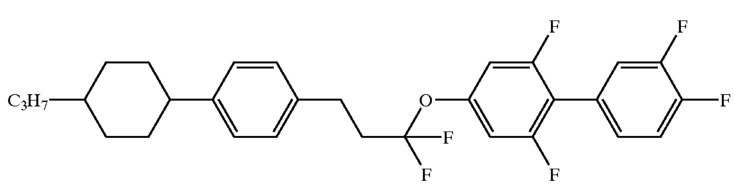 | |

-continued
| No. | Structure | Data |
| --- | --- | --- |
| 161 | 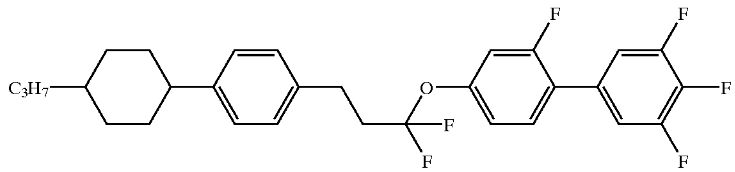 | |
| 162 | 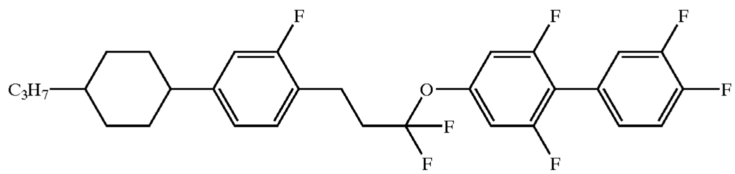 | |
| 163 | 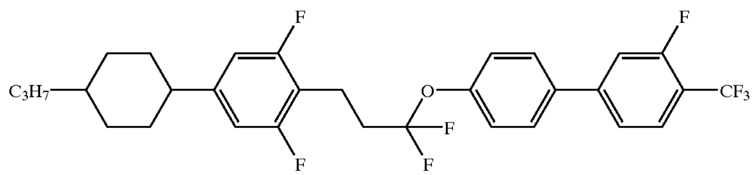 | |
| 164 | 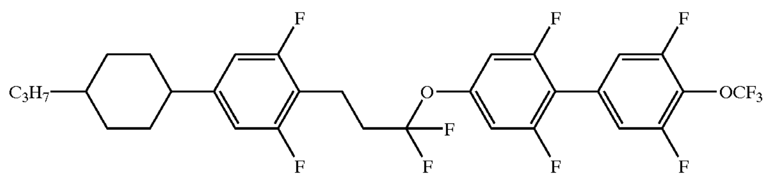 | |
| 165 | 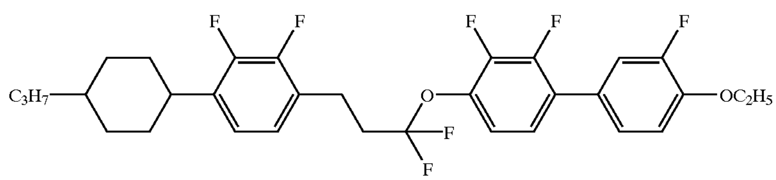 | |
| 166 | 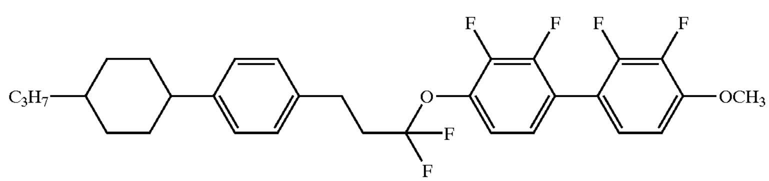 | |
| 167 | 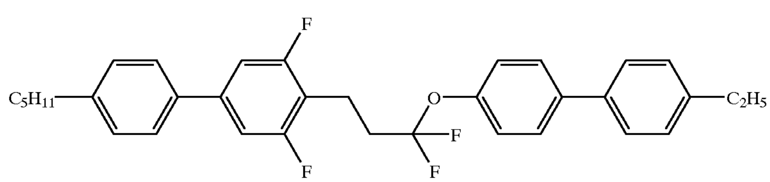 | |
| 168 | 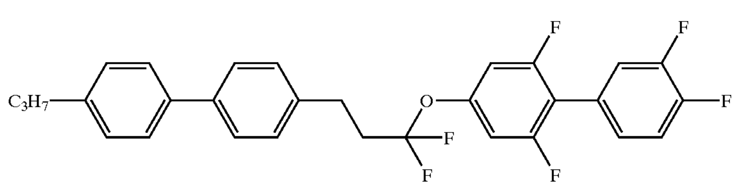 | |

-continued
| No. | Structure | Data |
|---|---|---|
| 169 | 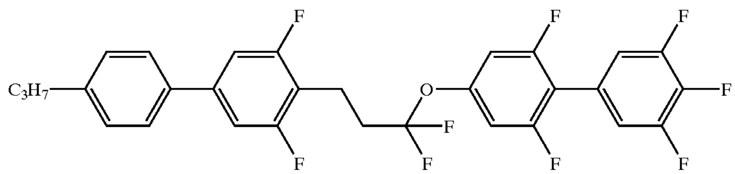 | |
| 170 | 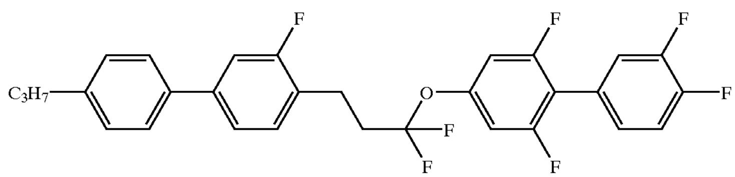 | |
| 171 | 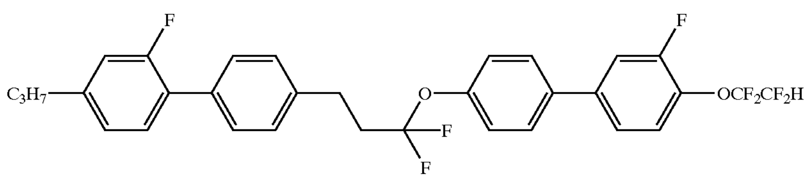 | |
| 172 | 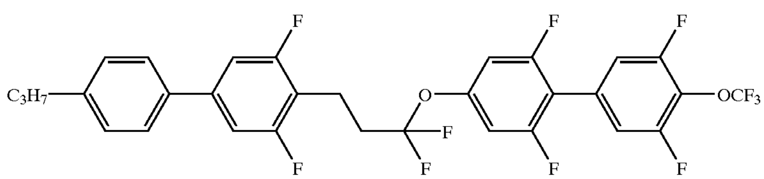 | |
| 173 | 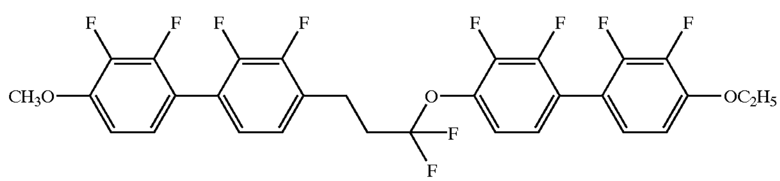 | |
| 174 | 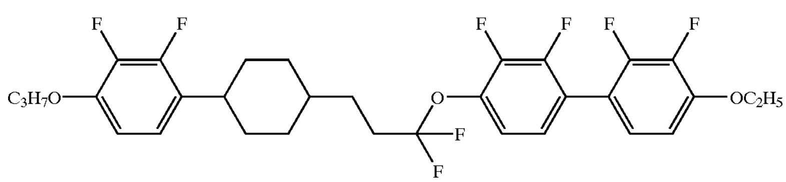 | |
| 175 | 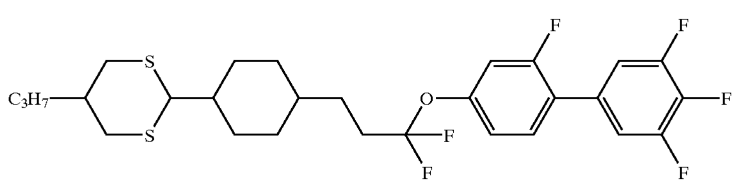 | |
| 176 | 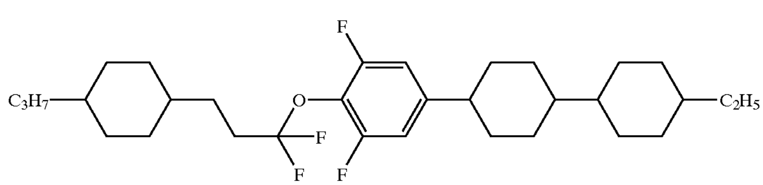 | |

-continued
| No. | Structure | Data |
|---|---|---|
| 177 | 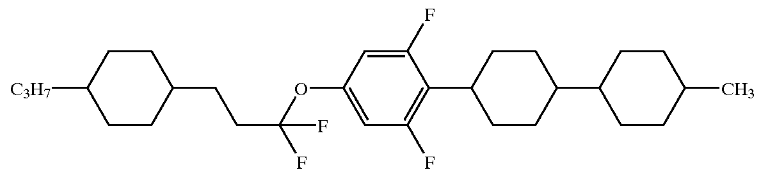 | |
| 178 | 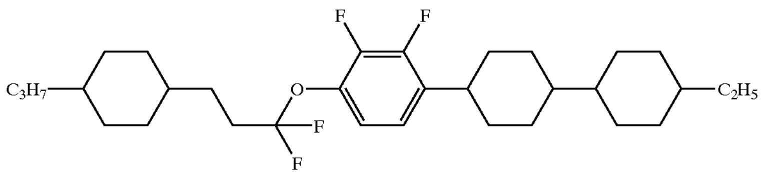 | |
| 179 | 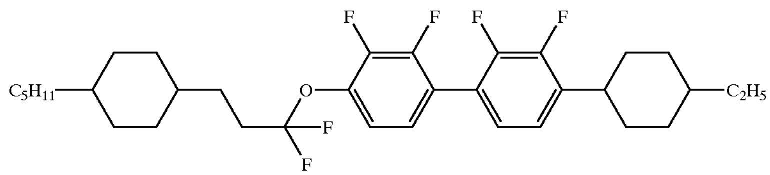 | |
| 180 | 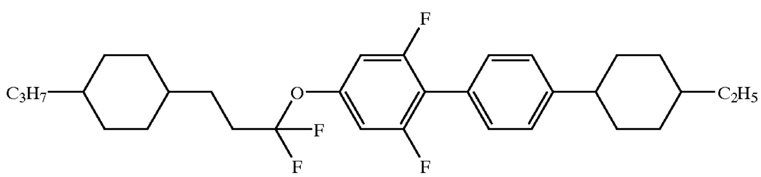 | |
| 181 | 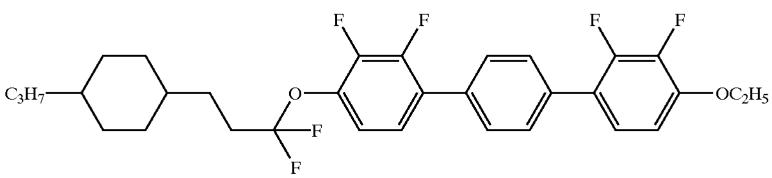 | |
| 182 | 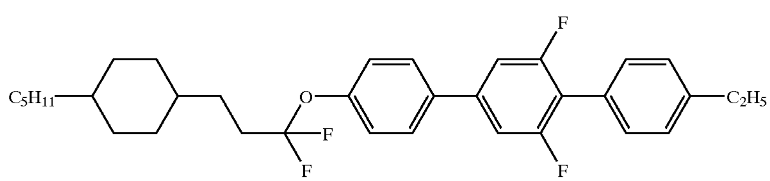 | |
| 183 | 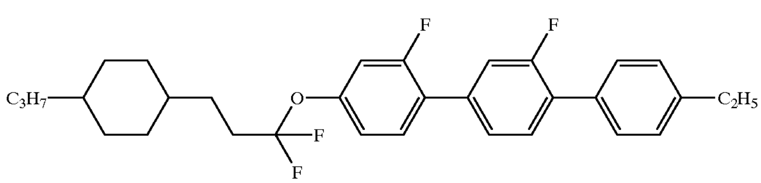 | |
| 184 | 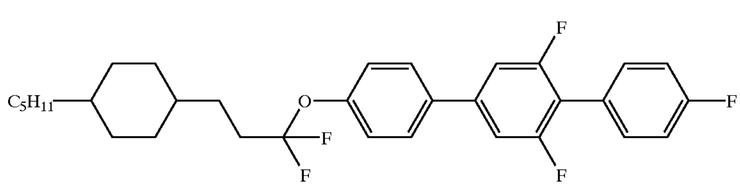 | |

-continued
| No. | Structure | Data |
| --- | --- | --- |
| 185 | 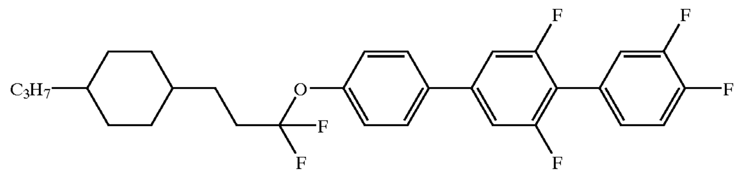 | |
| 186 | 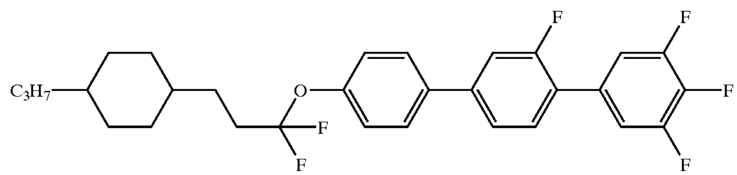 | |
| 187 | 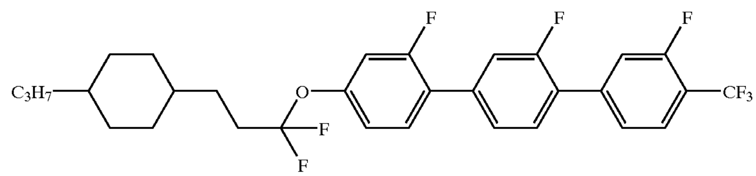 | |
| 188 | 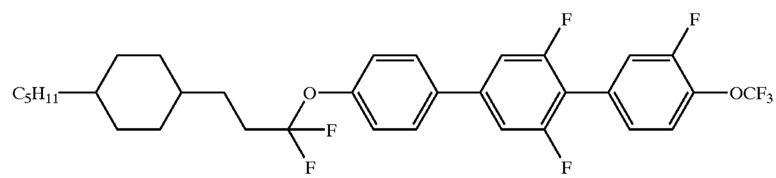 | |
| 189 | 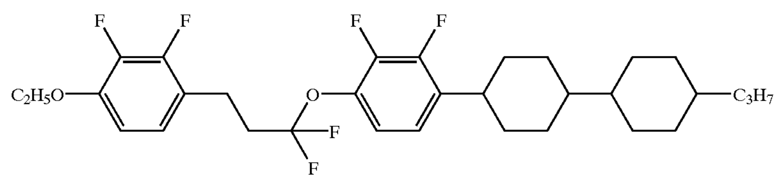 | |
| 190 | 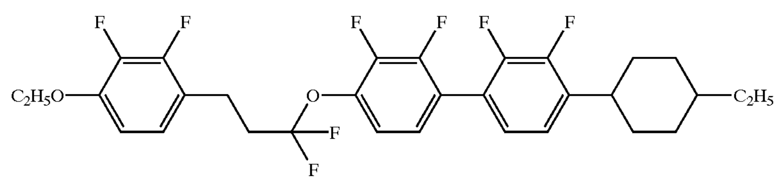 | |
| 191 | 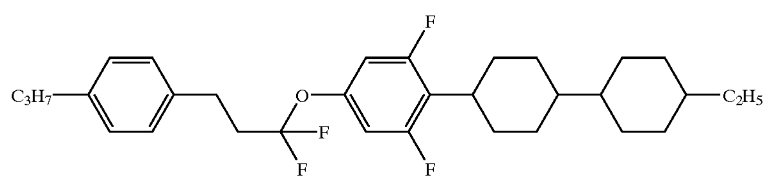 | |
| 192 | 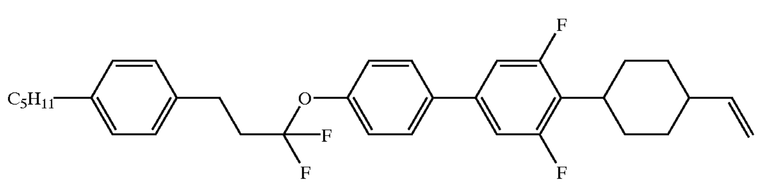 | |

-continued
| No. | Structure | Data |
|---|---|---|
| 193 | 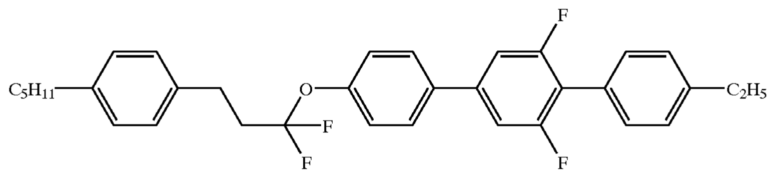 | |
| 194 | 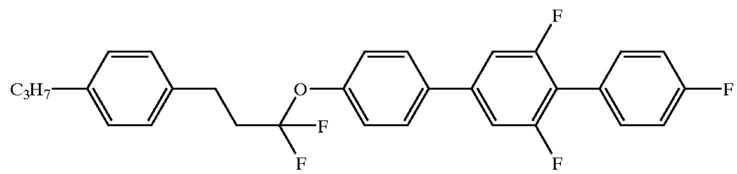 | |
| 195 | 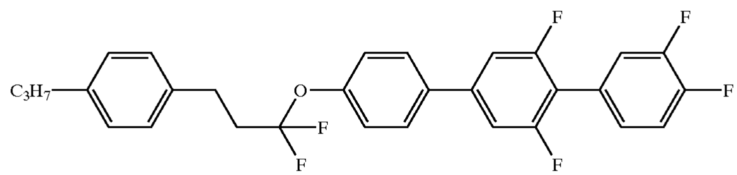 | |
| 196 | 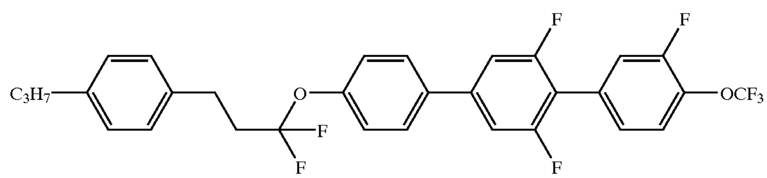 | |
| 197 | 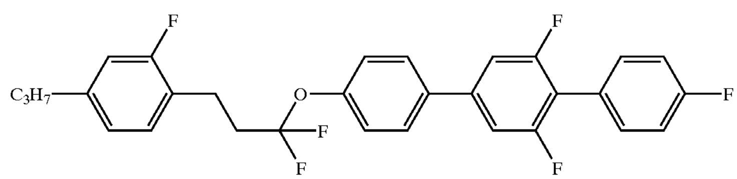 | |
| 198 | 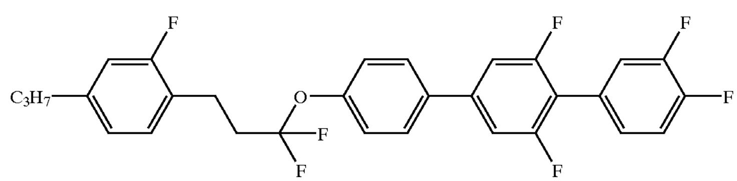 | |
| 199 | 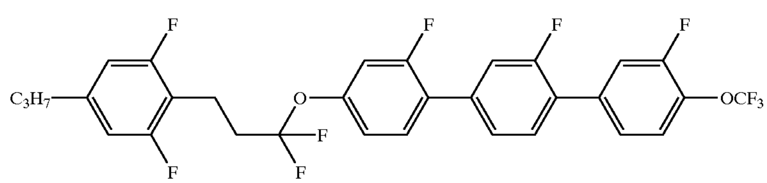 | |
| 200 | 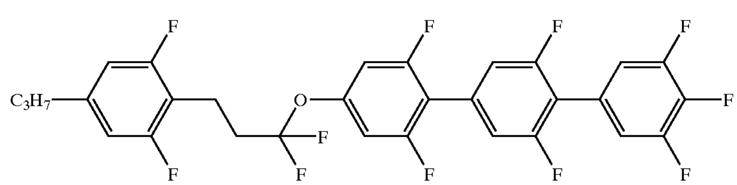 | |

-continued

| No. | Structure | Data |
| --- | --- | --- |
| 201 | 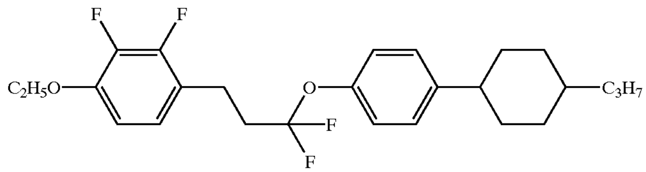 | Cr 51.2 N 98.1 Iso<br>$T_{NI}$: 96.6<br>$\Delta\epsilon$: −4.88<br>$\Delta n$: 0.120 |
| 202 | 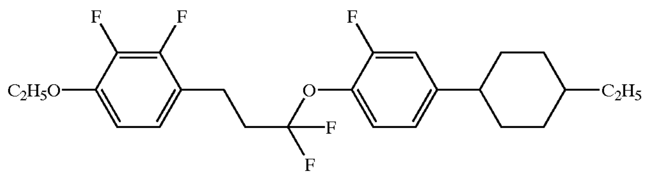 | |
| 203 | 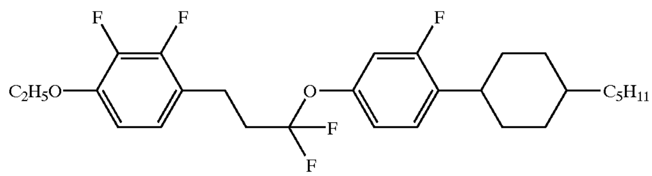 | |
| 204 | 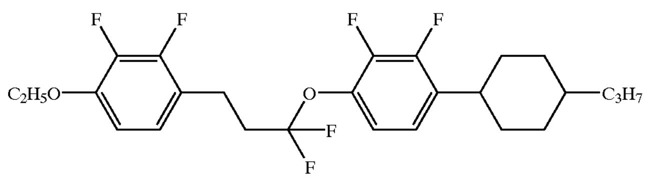 | |

EXAMPLE 5

A nematic liquid crystal composition (hereinafter referred to as a liquid crystal composition A) comprising cyanophenylcyclohexane liquid crystalline compounds:

| | |
| --- | --- |
| 4-(4-propylcyclohexyl)benzonitrile | 24% |
| 4-(4-pentylcyclohexyl)benzonitrile | 36% |
| 4-(4-heptylcyclohexyl)benzonitrile | 25% |
| 4-(4-(4-pentylcyclohexyl)phenyl)benzonitrile | 15% |

has the following properties.

Clearing point ($T_{NI}$) : 71.7° C; threshold voltage (Vth) in a cell thickness of8.8 $\mu$m: 1.78 V; $\Delta\epsilon$: 11.0; $\Delta n$: 0.137; viscosity ($\eta$) at 20° C: 26.3 mPa.s.

A liquid crystal composition comprising 85% by weight of this liquid crystal composition A and 15% by weight of 1-(3-(trans-4-(trans-4-pentylcyclohexyl)-cyclohexyl)-1,1-difluoropropyleneoxy)-3,4,5-trifluorobenzene (Compound No. 40) obtained in Example 1 was prepared. It had the following properties:

Clearing point ($T_{NI}$): 75.8° C.; threshold voltage (Vth) in a cell thickness of 8.9 $\mu$m: 1.70 V; $\Delta\epsilon$: 11.4; $\Delta n$: 0.128; viscosity ($\eta$) at 20° C.: 28.4 mPa.s.

Compound No. 40 had the following physical properties, which were calculated from those of the liquid crystal composition and the mixing ratio of the compounds according to an extrapolation:

Clearing point ($T_{NI}$): 99.0° C.; $\Delta\epsilon$: 13.7; $\Delta n$: 0.077; viscosity ($\eta$) at 20° C.: 31.8 mpas.

EXAMPLE 6

A liquid crystal composition comprising 85% by weight of the liquid crystal composition A shown in Example 5 and 15% by weight of 1-(3-(4'-propyl-3,5-difluorobiphenyl-4-yl)-1,1-difluoropropyleneoxy)-3,4,5-trifluorobenzene (Compound No. 63) was prepared. It had the following properties:

Clearing point ($T_{NI}$): 61.4° C.; threshold voltage (Vth) in a cell thickness of 8.9 $\mu$m: 1.50 V; $\Delta\epsilon$: 13.5; $\Delta n$: 0.133; viscosity ($\eta$) at 20° C.: 30.0 mpas.

The compound had the following physical properties, which were calculated from those of the liquid crystal composition and the mixing ratio of the compounds according to an extrapolation:

Clearing point ($T_{NI}$): 4.4° C.; $\Delta\epsilon$: 24.3; $\Delta n$: 0.110; viscosity ($\eta$) at 20° C.: 45.3 mpas.

EXAMPLE 7

A nematic liquid crystal composition (hereinafter referred to as a liquid crystal composition B):

| | |
| --- | --- |
| 4-ethoxyphenyl 4-propylcyclohexanecarboxylate | 17.2% |
| 4-butoxyphenyl 4-propylcyclohexanecarboxylate | 27.6% |
| 4-ethoxyphenyl 4-butylcyclohexanecarboxylate | 20.7% |
| 4-methoxyphenyl 4-pentylcyclohexanecarboxylate | 20.7% |
| 4-ethoxyphenyl 4-pentylcyclohexanecarboxylate | 13.8% |

has the following properties.

Clearing point ($T_{NI}$) : 74.0° C.; $\Delta\epsilon$: −1.3; $\Delta n$: 0.087; viscosity ($\eta$) at 20° C.: 18.9 mPa.s.

A liquid crystal composition comprising 85% by weight of this liquid crystal composition B and 15% by weight of 1-(3-(trans-4-(trans-4-propylcyclohexyl)cyclohexyl)-1,1-difluoropropyleneoxy)-2,3-difluoro-4-ethoxybenzene (Compound No. 46) obtained in Example 4 was prepared. It had the following properties:

Clearing point ($T_{NI}$): 84.9° C.; Δε: −1.72; Δn: 0.089; viscosity (η) at 20° C.: 24.3 mpas.

Compound No. 46 had the following physical properties, which were calculated from those of the liquid crystal composition and the mixing ratio of the compounds according to an extrapolation:

Clearing point ($T_{NI}$): 143.3° C.; Δε: −3.70; Δn: 0.100; viscosity (η) at 20° C.: 48.1 mpas.

EXAMPLE 8

A liquid crystal composition comprising 85% by weight of the liquid crystal composition B and 15% by weight of 1-(3-(2,3-difluoro-4-ethoxyphenyl)-1,1-difluoropropyleneoxy)-4-(trans-4-propylcyclohexyl) benzene (Compound No. 201) was prepared according to Example 7. It had the following properties:

Clearing point ($T_{NI}$): 77.9° C.; Δε: −1.88; Δn: 0.092; viscosity (η) at 20° C.: 24.2 mPa.s.

Compound No. 201 had the following physical properties, which were calculated from those of the liquid crystal composition and the mixing ratio of the compounds according to an extrapolation:

Clearing point ($T_{NI}$): 96.6° C.; Δε: −4.88; Δn: 0.120; viscosity (η) at 20° C.: 48.0 mpas.

Shown in the following Examples 9 to 53 are the components and the physical properties of the nematic liquid crystal compositions of the present invention comprising as the first component, the compounds of Formula (1) synthesized by the methods described above.

The compounds contained in the compositions are represented by the symbols in each column of a left terminal group, a bonding group, a ring structure and a right terminal group of the following Table 2.

TABLE 2

| Representation of compounds by the symbols $R-(A_1)-Z_1- \ldots -Z_n-(A_n)-X$ | Symbol |
|---|---|
| 1) Left terminal group R- | |
| $C_nH_{2n+1}$— | n- |
| $C_nH_{2n+1}O$— | nO— |
| $C_nH_{2n+1}OC_mH_{2m}$— | nOm- |
| $CH_2$═CH— | V- |
| $CH_2$═$CHC_nH_{2n}$— | Vn- |
| $C_nH_{2n+1}CH$═$CHC_mH_{2m}$— | nVm- |
| $CF_2$═CH— | VFF- |
| $CF_2$═$CHC_nH_{2n}$— | VFFn- |
| 2) Ring structure -($A_1$)-, -($A_n$)- | |
| 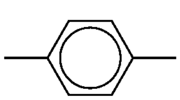 | B |
| 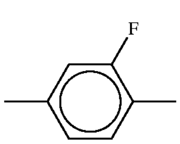 | B(F) |
| 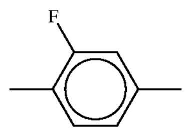 | B(2F) |
| 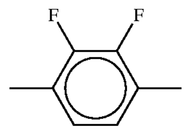 | B(2F,3F) |
| 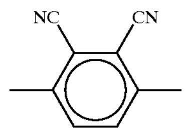 | B(2CN,3CN) |
| 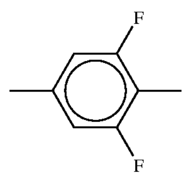 | B(F,F) |
| 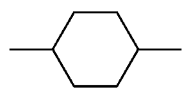 | H |
| 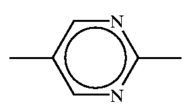 | Py |
| 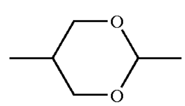 | G |
| 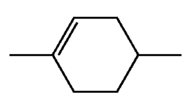 | Ch |
| 3) Bonding group -$Z_1$-, -$Z_n$- | |
| —$C_2H_4$— | 2 |
| —$C_4H_8$— | 4 |
| —$CH_2O$— | 1O |
| —COO— | E |
| —C≡C— | T |
| —CH═CH— | V |
| —$CF_2O$— | Z |
| —$C_2H_4CF_2O$— | 2Z |
| 4) Right terminal group -X | |
| —F | —F |
| —Cl | —CL |
| —CN | —C |
| —$CF_3$ | —CF3 |
| —$OCF_3$ | —OCF3 |
| —$OCF_2H$ | —OCF2H |
| —$C_nH_{2n+1}$ | -n |
| —$OC_nH_{2n+1}$ | —On |
| —$COOCH_3$ | -EMe |
| —$C_nH_{2n}CH$═$CH_2$ | -nV |

TABLE 2-continued

| Representation of compounds by the symbols R-($A_1$)-$Z_1$- . . . -$Z_n$-($A_n$)-X | Symbol |
|---|---|
| —$C_mH_{2m}CH{=}CHC_nH_{2n+1}$ | -mVn |
| —$C_mH_{2m}CH{=}CHC_nH_{2n}F$ | -mVnF |
| —$CH{=}CF_2$ | -VFF |
| —$C_nH_{2n}CH{=}CF_2$ | -nVFF |

5) Examples of Representation

Ex. 1 3-HH2ZB(F,F)—F

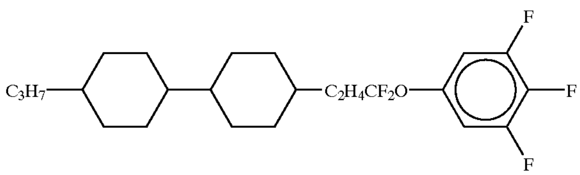

Ex. 2 3-HB(F)TB-2

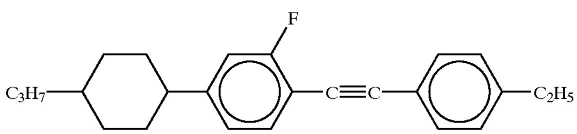

Ex. 3 1V2-BEB(F,F)—C

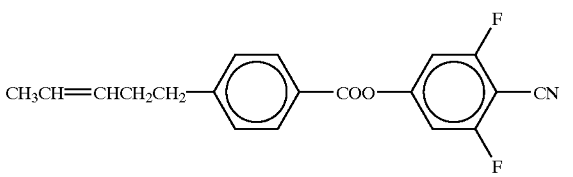

The numbers of the compounds contained in the compositions are the same as those shown in the examples described above, and the unit of contents of the compounds is % by weight unless otherwise described.

The property data of the composition examples are shown by NI (nematic-isotropic liquid transition temperature or clearing point), η (viscosity; measured at 20.0° C.), Δn (refractive anisotropy; measured at 25.0° C.), Δε (dielectric anisotropy; measured at 25.0° C.) and Vth (threshold voltage; measured at 25.0° C.).

EXAMPLE 9

| | |
|---|---|
| 5-HH2ZB(F,F)-F (No. 40) | 8.0% |
| 5-H2ZB(F,F)-C (No. 11) | 7.0% |
| 1V2-BEB(F,F)-C | 5.0% |
| 3-HB-C | 10.0% |
| 1-BTB-3 | 5.0% |
| 2-BTB-1 | 10.0% |
| 3-HH-4 | 11.0% |
| 3-HHB-1 | 11.0% |
| 3-HHB-3 | 9.0% |
| 3-H2BTB-2 | 4.0% |
| 3-H2BTB-3 | 4.0% |
| 3-H2BTB-4 | 4.0% |

-continued

| | |
|---|---|
| 3-HB(F)TB-2 | 6.0% |
| 3-HB(F)TB-3 | 6.0% |

NI = 92.4 (° C.)
η = 16.6 (mPa · s)
Δn = 0.154
Δε = 8.5
Vth = 1.99 (V)

When adding 0.8 part of CM33 to 100 parts of the above composition, the pitch was 10.7 μm.

EXAMPLE 10

| | |
|---|---|
| 3-HH2ZB(F)-OCF3 (No. 36) | 5.0% |
| 5-HH2ZB(F)-OCF3 (No. 37) | 5.0% |
| 3-H2ZB(F,F)B(F)-F (No. 99) | 7.0% |
| 5-H2ZB(F,F)B(F)-F (No. 100) | 6.0% |
| 2O1-BEB(F)-C | 5.0% |
| 3O1-BEB(F)-C | 15.0% |
| 4O1-BEB(F)-C | 8.0% |
| 5O1-BEB(F)-C | 8.0% |
| 2-HHB(F)-C | 9.0% |
| 3-HHB(F)-C | 8.0% |
| 3-HB(F)TB-2 | 4.0% |
| 3-HB(F)TB-3 | 4.0% |
| 3-HB(F)TB-4 | 4.0% |
| 3-HHB-1 | 8.0% |
| 3-HHB-O1 | 4.0% |

NI = 87.6 (° C.)
η = 79.0 (mPa · s)
Δn = 0.141
Δε = 29.9
Vth = 0.89 (V)

EXAMPLE 11

| | |
|---|---|
| 5-H2ZB(F,F)-F (No. 5) | 2.0% |
| 5-H2ZB(F)-OCF3 (No. 7) | 2.0% |
| 5-H2ZB(F)B(F,F)-F (No. 102) | 3.0% |
| 5-H2ZB(F,F)-C (No. 11) | 2.0% |
| 5-PyB-F | 2.0% |
| 3-PyB(F)-F | 2.0% |
| 2-BB-C | 3.0% |
| 4-BB-C | 3.0% |
| 5-BB-C | 3.0% |
| 2-PyB-2 | 2.0% |
| 3-PyB-2 | 2.0% |
| 4-PyB-2 | 2.0% |
| 6-PyB-O5 | 3.0% |
| 6-PyB-O6 | 3.0% |
| 6-PyB-O7 | 3.0% |
| 6-PyB-O8 | 3.0% |
| 3-PyBB-F | 6.0% |
| 4-PyBB-F | 6.0% |
| 5-PyBB-F | 6.0% |
| 3-HHB-1 | 6.0% |
| 3-HHB-3 | 8.0% |
| 2-H2BTB-2 | 4.0% |
| 2-H2BTB-3 | 4.0% |
| 2-H2BTB-4 | 5.0% |
| 3-H2BTB-2 | 5.0% |
| 3-H2BTB-3 | 5.0% |
| 3-H2BTB-4 | 5.0% |

NI = 93.5 (° C.)
η = 35.6 (mPa · s)
Δn = 0.193
Δε = 6.6
Vth = 2.26 (V)

EXAMPLE 12

| | |
|---|---|
| 3-HH2ZB(F,F)-F (No. 39) | 4.0% |
| 3-H2ZB(F,F)-F (No. 4) | 3.0% |
| 3-H2ZB(F)-OCF3 (No. 6) | 4.0% |
| 3-GB-C | 6.0% |
| 4-GB-C | 6.0% |
| 2-BEB-C | 12.0% |
| 3-BEB-C | 4.0% |
| 3-PyB(F)-F | 3.0% |
| 3-HEB-O4 | 8.0% |
| 4-HEB-O2 | 6.0% |
| 5-HEB-O1 | 6.0% |
| 3-HEB-O2 | 5.0% |
| 5-HEB-O2 | 4.0% |
| 5-HEB-5 | 5.0% |
| 4-HEB-5 | 5.0% |
| 1O-BEB-2 | 4.0% |
| 3-HHB-1 | 6.0% |
| 3-HHEBB-C | 3.0% |
| 3-HBEBB-C | 3.0% |
| 5-HBEBB-C | 3.0% |

NI = 68.7 (° C.)
η = 36.7 (mPa · s)
Δn = 0.112
Δε = 10.8
Vth = 1.34 (V)

EXAMPLE 13

| | |
|---|---|
| 3-H2ZB(F,F)-F (No. 4) | 4.0% |
| 5-H2ZB(F,F)-F (No. 5) | 4.0% |
| 3-HH2ZB(F)-OCF3 (No. 6) | 9.0% |
| 3-H2ZB(F,F)B(F)-F (No. 99) | 3.0% |
| 3-HB-C | 8.0% |
| 7-HB-C | 3.0% |
| 1O1-HB-C | 5.0% |
| 3-HB(F)-C | 5.0% |
| 2-PyB-2 | 2.0% |
| 3-PyB-2 | 2.0% |
| 4-PyB-2 | 2.0% |
| 1O1-HH-3 | 7.0% |
| 2-BTB-O1 | 7.0% |
| 3-HHB-1 | 7.0% |
| 3-HHB-F | 4.0% |
| 3-HHB-O1 | 4.0% |
| 3-HHB-3 | 8.0% |
| 3-H2BTB-2 | 3.0% |
| 3-H2BTB-3 | 3.0% |
| 2-PyBH-3 | 4.0% |
| 3-PyBH-3 | 3.0% |
| 3-PyBB-2 | 3.0% |

NI = 79.5 (° C.)
η = 16.4 (mPa · s)
Δn = 0.126
Δε = 7.7
Vth = 1.80 (V)

EXAMPLE 14

| | |
|---|---|
| 3-HH2ZB(F,F)-F (No. 39) | 3.0% |
| 5-HH2ZB(F)-OCF3 (No. 37) | 6.0% |
| 3-H2ZB(F,F)-C (No. 10) | 9.0% |
| 2-BEB(F)-C | 5.0% |
| 3-BEB(F)-C | 4.0% |
| 4-BEB(F)-C | 4.0% |
| 1V2-BEB(F,F)-C | 6.0% |
| 3-HH-EMe | 10.0% |
| 3-HB-O2 | 18.0% |
| 7-HEB-F | 2.0% |
| 3-HHEB-F | 2.0% |
| 5-HHEB-F | 2.0% |
| 3-HBEB-F | 4.0% |
| 2O1-HBEB(F)-C | 2.0% |
| 3-HB(F)EB(F)-C | 2.0% |
| 3-HBEB(F,F)-C | 2.0% |
| 3-HHB-F | 4.0% |
| 3-HHB-O1 | 4.0% |
| 3-HHB-3 | 7.0% |
| 3-HEBEB-F | 2.0% |
| 3-HEBEB-1 | 2.0% |

NI = 78.2 (° C.)
η = 33.6 (mPa · s)
Δn = 0.109
Δε = 23.7
Vth = 0.90 (V)

EXAMPLE 15

| | |
|---|---|
| 3-H2ZB(F,F)-C (No. 10) | 9.0% |
| 5-H2ZB(F,F)-C (No. 11) | 8.0% |
| 2-BEB(F)-C | 5.0% |
| 3-BEB(F)-C | 4.0% |
| 4-BEB(F)-C | 4.0% |
| 1V2-BEB(F,F)-C | 7.0% |
| 3-HB-O2 | 10.0% |
| 3-HH-4 | 3.0% |
| 3-HHB-F | 3.0% |
| 3-HHB-1 | 8.0% |
| 3-HHB-O1 | 4.0% |
| 3-HBEB-F | 4.0% |
| 3-HHEB-F | 7.0% |
| 5-HHEB-F | 7.0% |
| 3-H2BTB-2 | 4.0% |
| 3-H2BTB-3 | 4.0% |
| 3-H2BTB-4 | 4.0% |
| 3-HB(F)TB-2 | 5.0% |

NI = 87.5 (° C.)
η = 35.8 (mPa · s)
Δn = 0.131
Δε = 24.9
Vth = 1.15 (V)

EXAMPLE 16

| | |
|---|---|
| 5-HH2ZB(F,F)-F (No. 40) | 4.0% |
| 5-H2ZB(F,F)-F (No. 5) | 3.0% |
| 3-HH2ZB(F)-OCF3 (No. 36) | 3.0% |
| 5-HH2ZB(F)-OCF3 (No. 37) | 4.0% |
| 3-H2ZB(F,F)B(F)-F (No. 99) | 3.0% |
| 3-H2ZB(F)B(F,F)-F (No. 101) | 7.0% |
| 5-H2ZB(F)B(F,F)-F (No. 102) | 7.0% |
| 3-H2ZB(F,F)-C (No. 10) | 4.0% |
| 2-BEB-C | 4.0% |
| 3-BEB-C | 3.0% |
| 4-BEB-C | 3.0% |
| 3-HB-C | 5.0% |
| 3-HEB-O4 | 12.0% |
| 4-HEB-O2 | 8.0% |
| 5-HEB-O1 | 8.0% |
| 3-HEB-O2 | 6.0% |
| 5-HEB-O2 | 5.0% |

-continued

| | |
|---|---|
| 3-HHB-1 | 7.0% |
| 3-HHB-O1 | 4.0% |

NI = 63.4 (° C.)
η = 29.9 (mPa · s)
Δn = 0.092
Δε = 10.2
Vth = 1.34 (V)

EXAMPLE 17

| | |
|---|---|
| 3-H2ZB(F,F)B(F)-F (No. 99) | 5.0% |
| 5-H2ZBB(F,F)B-2 (No. 182) | 6.0% |
| 5-H2ZBB(F,F)B-F (No. 184) | 6.0% |
| 2-BEB-C | 10.0% |
| 5-BB-C | 7.0% |
| 7-BB-C | 7.0% |
| 1-BTB-3 | 7.0% |
| 2-BTB-1 | 10.0% |
| 1O-BEB-2 | 7.0% |
| 1O-BEB-5 | 9.0% |
| 2-HHB-1 | 4.0% |
| 3-HHB-F | 4.0% |
| 3-HHB-1 | 7.0% |
| 3-HHB-O1 | 4.0% |
| 3-HHB-3 | 7.0% |

EXAMPLE 18

| | |
|---|---|
| 3-HH2ZB(F)-OCF3 (No. 36) | 3.0% |
| 5-HH2ZB(F)-OCF3 (No. 37) | 3.0% |
| 2-HB-C | 5.0% |
| 3-HB-C | 12.0% |
| 3-HB-O2 | 15.0% |
| 2-BTB-1 | 3.0% |
| 3-HHB-1 | 8.0% |
| 3-HHB-F | 4.0% |
| 3-HHB-O1 | 5.0% |
| 3-HHB-3 | 14.0% |
| 3-HHEB-F | 4.0% |
| 5-HHEB-F | 4.0% |
| 2-HHB(F)-F | 5.0% |
| 3-HHB(F)-F | 5.0% |
| 5-HHB(F)-F | 5.0% |
| 3-HHB(F,F)-F | 5.0% |

NI= 101.3 (° C.)
η = 18.3 (mPa · s)
Δn = 0.100
Δε = 5.1
Vth = 2.49 (V)

EXAMPLE 19

| | |
|---|---|
| 5-H2ZB(F,F)B(F)-F (No. 100) | 3.0% |
| 3-H2ZB(F)B(F,F)-F (No. 101) | 3.0% |
| 3-H2ZB(F,F)-C (No. 10) | 2.0% |
| 3-BEB(F)-C | 4.0% |
| 3-HB-C | 4.0% |
| V-HB-C | 8.0% |
| 1V-HB-C | 8.0% |
| 3-HB-O2 | 3.0% |
| 3-HH-2V | 14.0% |
| 3-HH-2V1 | 7.0% |
| V2-HHB-1 | 15.0% |
| 3-HHB-1 | 5.0% |
| 3-HHEB-F | 7.0% |

-continued

| | |
|---|---|
| 3-H2BTB-2 | 6.0% |
| 3-H2BTB-3 | 6.0% |
| 3-H2BTB-4 | 5.0% |

NI = 98.8 (° C.)
η = 17.3 (mPa · s)
Δn = 0.129
Δε = 8.0
Vth = 2.24 (V)

EXAMPLE 20

| | |
|---|---|
| 3-HH2ZB(F,F)-F (No. 39) | 7.0% |
| 5-HH2ZB(F,F)-F (No. 40) | 7.0% |
| 3-H2ZB(F)B(F,F)-F (No. 101) | 3.0% |
| 5-H2ZB(F)B(F,F)-F (No. 102) | 3.0% |
| 3-H2ZB(F,F)-C (No. 10) | 6.0% |
| 5-H2ZB(F,F)-C (No. 11) | 5.0% |
| V2-HB-C | 6.0% |
| 1V2-HB-C | 6.0% |
| 3-HB-C | 5.0% |
| 3-HB(F)-C | 5.0% |
| 2-BTB-1 | 2.0% |
| 3-HH-4 | 8.0% |
| 3-HH-VFF | 6.0% |
| 2-HHB-C | 3.0% |
| 3-HHB-C | 6.0% |
| 3-HB(F)TB-2 | 8.0% |
| 3-H2BTB-2 | 5.0% |
| 3-H2BTB-3 | 5.0% |
| 3-H2BTB-4 | 4.0% |

NI = 87.8 (° C.)
η = 21.4 (mPa · s)
Δn = 0.137
Δε = 11.6
Vth = 1.73 (V)

EXAMPLE 21

| | |
|---|---|
| 5-HH2ZB(F)-OCF3 (No. 37) | 3.0% |
| 3-H2ZB(F,F)-C (No. 10) | 3.0% |
| 5-BEB(F)-C | 5.0% |
| V-HB-C | 5.0% |
| 5-PyB-C | 6.0% |
| 4-BB-3 | 11.0% |
| 3-HH-2V | 10.0% |
| 5-HH-V | 11.0% |
| V-HHB-1 | 7.0% |
| V2-HHB-1 | 15.0% |
| 3-HHB-1 | 9.0% |
| 1V2-HBB-2 | 10.0% |
| 3-HHEBH-3 | 5.0% |

NI = 92.9 (° C.)
η = 16.1 (mPa · s)
Δn = 0.112
Δε = 5.5
Vth = 2.28 (V)

EXAMPLE 22

| | |
|---|---|
| 5-H2ZB(F,F)-F (No. 5) | 2.0% |
| 3-H2ZB(F)-OCF3 (No. 6) | 3.0% |
| 3-HH2ZB(F)-OCF3 (No. 36) | 7.0% |
| 5-H2ZB(F)B(F,F)-F (No. 102) | 3.0% |
| 1V2-BEB(F,F)-C | 3.0% |
| 3-HB-C | 7.0% |

-continued

| | |
|---|---|
| V2V-HB-C | 7.0% |
| V2V-HH-3 | 19.0% |
| 3-HB-O2 | 4.0% |
| 3-HHB-1 | 10.0% |
| 3-HHB-3 | 15.0% |
| 3-HB(F)TB-2 | 4.0% |
| 3-HB(F)TB-3 | 4.0% |
| 3-H2BTB-2 | 4.0% |
| 3-H2BTB-3 | 4.0% |
| 3-H2BTB-4 | 4.0% |

NI = 101.3 (° C.)
η = 15.2 (mPa · s)
Δn = 0.117
Δε = 5.6
Vth = 2.30 (V)

EXAMPLE 23

| | |
|---|---|
| 3-HH2ZB(F,F)-F (No. 39) | 3.0% |
| 3-H2ZB(F,F)B(F)-F (No. 99) | 4.0% |
| 5-H2ZB(F,F)B(F)-F (No. 100) | 4.0% |
| V2-HB-TC | 10.0% |
| 3-HB-TC | 10.0% |
| 3-HB-C | 3.0% |
| 5-HB-C | 3.0% |
| 5-BB-C | 3.0% |
| 2-BTB-1 | 10.0% |
| 2-BTB-O1 | 5.0% |
| 3-HH-4 | 5.0% |
| 3-HHB-1 | 10.0% |
| 3-HHB-3 | 11.0% |
| 3-H2BTB-2 | 3.0% |
| 3-H2BTB-3 | 3.0% |
| 3-HB(F)TB-2 | 3.0% |
| 5-BTB(F)TB-3 | 10.0% |

NI = 101.2 (° C.)
η = 16.7 (mPa · s)
Δn = 0.202
Δε = 7.5
Vth = 2.15 (V)

EXAMPLE 24

| | |
|---|---|
| 3-H2ZB(F,F)-C (No. 10) | 8.0% |
| 5-H2ZB(F,F)-C (No. 11) | 8.0% |
| 1V2-BEB(F,F)-C | 3.0% |
| 3-HB-C | 5.0% |
| 2-BTB-1 | 10.0% |
| 5-HH-VFF | 30.0% |
| 1-BHH-VFF | 8.0% |
| 1-BHH-2VFF | 11.0% |
| 3-H2BTB-2 | 5.0% |
| 3-H2BTB-3 | 4.0% |
| 3-H2BTB-4 | 4.0% |
| 3-HHB-1 | 4.0% |

NI = 74.8 (° C.)
η = 13.5 (mPa · s)
Δn = 0.120
Δε = 8.1
Vth = 1.75 (V)

EXAMPLE 25

| | |
|---|---|
| 3-H2ZB(F,F)-C (No. 10) | 8.0% |
| 5-H2ZB(F,F)-C (No. 11) | 7.0% |

-continued

| | |
|---|---|
| 5-HBZB(F,F)-C | 3.0% |
| 3-HB(F,F)ZB(F,F)-C | 3.0% |
| 3-HB-C | 3.0% |
| 2-BTB-1 | 10.0% |
| 5-HH-VFF | 30.0% |
| 1-BHH-VFF | 8.0% |
| 1-BHH-2VFF | 11.0% |
| 3-H2BTB-2 | 5.0% |
| 3-H2BTB-3 | 4.0% |
| 3-H2BTB-4 | 4.0% |
| 3-HHB-1 | 4.0% |

NI = 76.6 (° C.)
η = 14.5 (mPa · s)
Δn = 0.120
Δε = 7.5
Vth = 1.81 (V)

EXAMPLE 26

| | |
|---|---|
| 3-HH2ZB(F,F)-F (No. 39) | 4.0% |
| 3-HH2ZB(F)-OCF3 (No. 36) | 3.0% |
| 5-H2ZB(F,F)B(F)-F (No. 100) | 3.0% |
| 5-H2ZB(F)B(F,F)-F (No. 102) | 5.0% |
| 2-HHB(F)-F | 5.0% |
| 3-HHB(F)-F | 14.0% |
| 5-HHB(F)-F | 16.0% |
| 2-H2HB(F)-F | 10.0% |
| 3-H2HB(F)-F | 5.0% |
| 5-H2HB(F)-F | 10.0% |
| 2-HBB(F)-F | 6.0% |
| 3-HBB(F)-F | 6.0% |
| 5-HBB(F)-F | 13.0% |

NI = 97.9 (° C.)
η = 27.3 (mPa · s)
Δn = 0.096
Δε = 6.4
Vth = 2.01 (V)

When adding 0.3 part of CN to 100 parts of the above composition, the pitch was 77.5 μm.

EXAMPLE 27

| | |
|---|---|
| 5-HH2ZB(F,F)-F (No. 40) | 7.0% |
| 5-HH2ZB(F)-OCF3 (No. 37) | 6.0% |
| 5-H2ZBB(F,F)B-2 (No. 182) | 5.0% |
| 5-H2ZBB(F,F)B-F (No. 184) | 4.0% |
| 7-HB(F,F)-F | 3.0% |
| 3-HB-O2 | 7.0% |
| 2-HHB(F)-F | 8.0% |
| 3-HHB(F)-F | 8.0% |
| 5-HHB(F)-F | 8.0% |
| 2-HBB(F)-F | 6.0% |
| 3-HBB(F)-F | 6.0% |
| 5-HBB(F)-F | 6.0% |
| 2-HBB-F | 4.0% |
| 3-HBB-F | 4.0% |
| 5-HBB-F | 3.0% |
| 3-HBB(F,F)-F | 5.0% |
| 5-HBB(F,F)-F | 10.0% |

EXAMPLE 28

| | |
|---|---|
| 3-HH2ZB(-F,F)-F (No. 39) | 3.0% |
| 3-H2ZB(F,F)-F (No. 4) | 3.0% |
| 3-H2ZB(F)-OCF3 (No. 6) | 3.0% |
| 3-HH2ZB(F)-OCF3 (No. 36) | 4.0% |
| 5-HH2ZB(F)-OCF3 (No. 37) | 4.0% |
| 3-H2ZB(F,F)B(F)-F (No. 99) | 3.0% |
| 5-HB-CL | 4.0% |
| 3-HH-4 | 12.0% |
| 3-HH-5 | 4.0% |
| 3-HHB-F | 4.0% |
| 3-HHB-CL | 3.0% |
| 4-HHB-CL | 4.0% |
| 3-HHB(F)-F | 7.0% |
| 4-HHB(F)-F | 7.0% |
| 5-HHB(F)-F | 7.0% |
| 7-HHB(F)-F | 7.0% |
| 5-HBB(F)-F | 4.0% |
| 5-HBBH-1O1 | 3.0% |
| 3-HHBB(F,F)-F | 2.0% |
| 4-HHBB(F,F)-F | 3.0% |
| 5-HHBB(F,F)-F | 3.0% |
| 3-HH2BB(F,F)-F | 3.0% |
| 4-HH2BB(F,F)-F | 3.0% |

NI = 115.8 (° C.)
η = 23.0 (mPa · s)
Δn = 0.087
Δε = 5.5
Vth = 2.42 (V)

EXAMPLE 29

| | |
|---|---|
| 3-HH2ZB(F,F)-F (No. 39) | 3.0% |
| 5-HH2ZB(F,F)-F (No. 40) | 4.0% |
| 5-H2ZB(F,F)-F (No. 5) | 3.0% |
| 5-H2ZB(F)-OCF3 (No. 7) | 3.0% |
| 3-HH2ZB(F)-OCF3 (No. 36) | 6.0% |
| 5-HH2ZB(F)-OCF3 (No. 37) | 6.0% |
| 3-H2ZB(F,F)B(F)-F (No. 99) | 3.0% |
| 5-H2ZB(F,F)B(F)-F (No. 100) | 4.0% |
| 3-H2ZB(F)B(F,F)-F (No. 101) | 3.0% |
| 5-H2ZB(F)B(F,F)-F (No. 102) | 4.0% |
| 3-HHB(F,F)-F | 9.0% |
| 3-H2HB(F,F)-F | 4.0% |
| 4-H2HB(F,F)-F | 4.0% |
| 5-H2HB(F,F)-F | 4.0% |
| 3-HBB(F,F)-F | 10.0% |
| 5-HBB(F,F)-F | 10.0% |
| 3-H2BB(F,F)-F | 4.0% |
| 5-HHBB(F,F)-F | 3.0% |
| 5-HHEBB-F | 2.0% |
| 3-HH2BB(F,F)-F | 3.0% |
| 4-HBBH-1O1 | 4.0% |
| 5-HBBH-1O1 | 4.0% |

NI = 97.6 (° C.)
η = 34.2 (mPa · s)
Δn = 0.106
Δε = 10.9
Vth = 1.56 (V)

EXAMPLE 30

| | |
|---|---|
| 3-HH2ZB(F)-OCF3 (No. 36) | 3.0% |
| 5-H2ZB(F)B(F,F)-F (No. 102) | 3.0% |
| 5-HB-F | 12.0% |
| 6-HB-F | 9.0% |
| 7-HB-F | 7.0% |
| 2-HHB-OCF3 | 7.0% |
| 3-HHB-OCF3 | 7.0% |

-continued

| | |
|---|---|
| 4-HHB-OCF3 | 7.0% |
| 5-HHB-OCF3 | 5.0% |
| 3-HH2B-OCF3 | 4.0% |
| 5-HH2B-OCF3 | 4.0% |
| 3-HHB(F,F)-OCF3 | 5.0% |
| 3-HBB(F)-F | 7.0% |
| 5-HBB(F)-F | 7.0% |
| 3-HH2B(F)-F | 3.0% |
| 3-HB(F)BH-3 | 3.0% |
| 5-HBBH-3 | 3.0% |
| 3-HHB(F,F)-OCF2H | 4.0% |

NI = 84.6 (° C.)
η = 15.5 (mPa · s)
Δn = 0.089
Δε = 5.0
Vth = 2.30 (V)

EXAMPLE 31

| | |
|---|---|
| 3-HH2ZB(-F)-OCF3 (No. 36) | 6.0% |
| 5-HH2ZB(F)-OCF3 (No. 37) | 6.0% |
| 3-H2ZB(F,F)B(F)-F (No. 99) | 4.0% |
| 5-H2ZB(F,F)B(F)-F (No. 100) | 4.0% |
| 3-H2ZB(F)B(F,F)-F (No. 101) | 8.0% |
| 5-H2ZB(F)B(F,F)-F (No. 102) | 8.0% |
| 2-HHB(F)-F | 3.0% |
| 2-HBB(F)-F | 3.0% |
| 3-HBB(F)-F | 7.0% |
| 4-HBB(F)-F | 2.0% |
| 5-HBB(F)-F | 7.0% |
| 2-H2BB(F)-F | 6.0% |
| 3-H2BB(F)-F | 6.0% |
| 3-HBB(F,F)-F | 6.0% |
| 5-HBB(F,F)-F | 6.0% |
| 2-HHB(F,F)-F | 5.0% |
| 3-HHB(F,F)-F | 5.0% |
| 4-HHB(F,F)-F | 5.0% |
| 3-HHB-F | 3.0% |

NI = 96.0 (° C.)
η = 37.8 (mPa · s)
Δn = 0.127
Δε = 10.2
Vth = 1.58 (V)

EXAMPLE 32

| | |
|---|---|
| 3-H2ZB(F,F)-F (No. 4) | 3.0% |
| 3-H2ZB(F,F)B(F)-F (No. 99) | 5.0% |
| 3-H2ZB(F)B(F,F)-F (No. 101) | 5.0% |
| 5-H2ZB(F)B(F,F)-F (No. 102) | 5.0% |
| 5-HB-CL | 3.0% |
| 3-HH-4 | 8.0% |
| 3-HBB(F,F)-F | 15.0% |
| 5-HBB(F,F)-F | 10.0% |
| 3-HHB(F,F)-F | 8.0% |
| 3-HHEB(F,F)-F | 10.0% |
| 4-HHEB(F,F)-F | 3.0% |
| 5-HHEB(F,F)-F | 3.0% |
| 2-HBEB(F,F)-F | 3.0% |
| 3-HBEB(F,F)-F | 5.0% |
| 5-HBEB(F,F)-F | 3.0% |
| 3-HHBB(F,F)-F | 6.0% |
| 3-HHB-1 | 5.0% |

NI = 78.5 (° C.)
η = 26.6 (mPa · s)
Δn = 0.102
Δε = 10.2
Vth = 1.42 (V)

EXAMPLE 33

| | |
|---|---|
| 3-HH2ZB(F,F)-F (No. 39) | 5.0% |
| 5-HH2ZB(F,F)-F (No. 40) | 5.0% |
| 3-HH2ZB(F)-OCF3 (No. 36) | 5.0% |
| 7-HB(F)-F | 6.0% |
| 5-H2B(F)-F | 6.0% |
| 3-HB-O2 | 4.0% |
| 3-HH-4 | 12.0% |
| 2-HHB(F)-F | 6.0% |
| 3-HHB(F)-F | 6.0% |
| 5-HHB(F)-F | 6.0% |
| 2-HBB(F)-F | 2.0% |
| 3-HBB(F)-F | 2.0% |
| 5-HBB(F)-F | 4.0% |
| 3-HBB(F,F)-F | 3.0% |
| 2-HHBB(F,F)-F | 4.0% |
| 3-HHBB(F,F)-F | 5.0% |
| 3-HHEB-F | 4.0% |
| 5-HHEB-F | 4.0% |
| 3-HHB-1 | 7.0% |
| 3-HHB-3 | 4.0% |

NI = 100.5 (° C.)
η = 20.4 (mPa · s)
Δn = 0.087
Δε = 5.7
Vth = 2.12 (V)

EXAMPLE 34

| | |
|---|---|
| 3-HH2ZB(F,F)-F (No. 39) | 6.0% |
| 5-HH2ZB(F,F)-F (No. 40) | 6.0% |
| 5-HH2ZB(F)-OCF3 (No. 37) | 3.0% |
| 3-H2ZB(F,F)B(F)-F (No. 99) | 6.0% |
| 5-H2ZB(F,F)B(F)-F (No. 100) | 6.0% |
| 3-H2ZB(F)B(F,F)-F (No. 101) | 13.0% |
| 5-H2ZB(F)B(F,F)-F (No. 102) | 12.0% |
| 3-HH-4 | 4.0% |
| 3-H2HB(F,F)-F | 6.0% |
| 4-H2HB(F,F)-F | 6.0% |
| 5-H2HB(F,F)-F | 4.0% |
| 3-HBB(F,F)-F | 13.0% |
| 5-HBB(F,F)-F | 12.0% |
| 3-HHBB(F,F)-F | 3.0% |

NI = 64.2 (° C.)
η = 33.9 (mPa · s)
Δn = 0.103
Δε = 12.2
Vth = 1.34 (V)

EXAMPLE 35

| | |
|---|---|
| 3-H2ZB(F)-OCF3 (No. 6) | 2.0% |
| 5-HH2ZB(F)-OCF3 (No. 37) | 5.0% |
| 3-H2ZB(F,F)B(F)-F (No. 99) | 5.0% |
| 7-HB(F,F)-F | 3.0% |
| 3-H2HB(F,F)-F | 12.0% |
| 4-H2HB(F,F)-F | 10.0% |
| 3-HHB(F,F)-F | 10.0% |
| 4-HHB(F,F)-F | 5.0% |
| 3-HBB(F,F)-F | 10.0% |
| 3-HHEB(F,F)-F | 10.0% |
| 4-HHEB(F,F)-F | 3.0% |
| 5-HHEB(F,F)-F | 3.0% |
| 2-HBEB(F,F)-F | 3.0% |
| 3-HBEB(F,F)-F | 5.0% |
| 5-HBEB(F,F)-F | 3.0% |

-continued

| | |
|---|---|
| 3-HGB(F,F)-F | 5.0% |
| 3-HHBB(F,F)-F | 6.0% |

NI = 77.5 (° C.)
η = 34.8 (mPa · s)
Δn = 0.086
Δε = 13.4
Vth = 1.36 (V)

EXAMPLE 36

| | |
|---|---|
| 3-HH2ZB(F,F)-F (No. 39) | 4.0% |
| 5-HH2ZB(F,F)-F (No. 40) | 4.0% |
| 5-H4HB(F,F)-F | 7.0% |
| 5-H4HB-OCF3 | 15.0% |
| 3-H4HB(F,F)-CF3 | 8.0% |
| 5-H4HB(F,F)-CF3 | 10.0% |
| 3-HB-CL | 6.0% |
| 5-HB-CL | 4.0% |
| 2-H2BB(F)-F | 5.0% |
| 3-H2BB(F)-F | 5.0% |
| 5-H2HB(F,F)-F | 4.0% |
| 3-HHB-OCF3 | 5.0% |
| 3-H2HB-OCF3 | 5.0% |
| V-HHB(F)-F | 5.0% |
| 3-HHB(F)-F | 4.0% |
| 5-HHB(F)-F | 4.0% |
| 3-HBEB(F,F)-F | 5.0% |

NI = 70.5 (° C.)
η = 25.4 (mPa · s)
Δn = 0.094
Δε = 8.9
Vth = 1.64 (V)

EXAMPLE 37

| | |
|---|---|
| 3-HH2ZB(F)-OCF3 (No. 36) | 5.0% |
| 5-HH2ZB(F)-OCF3 (No. 37) | 4.0% |
| 3-H2ZB(F,F)-C (No. 10) | 6.0% |
| 5-H2ZB(F,F)-C (No. 11) | 6.0% |
| 5-HB-CL | 5.0% |
| 7-HB(F,F)-F | 3.0% |
| 3-HH-4 | 10.0% |
| 3-HH-5 | 5.0% |
| 3-HB-O2 | 15.0% |
| 3-H2HB(F,F)-F | 5.0% |
| 4-H2HB(F,F)-F | 5.0% |
| 3-HHB(F,F)-F | 6.0% |
| 2-HHB(F)-F | 4.0% |
| 3-HHB(F)-F | 4.0% |
| 5-HHB(F)-F | 4.0% |
| 3-HHB-1 | 8.0% |
| 3-HHB-O1 | 5.0% |

NI = 71.6 (° C.)
η = 19.3 (mPa · s)
Δn = 0.074
Δε = 6.7
Vth =1.75 (V)

EXAMPLE 38

| | |
|---|---|
| 5-HH2ZB(F,F)-F (No. 40) | 4.0% |
| 5-H2ZB(F,F)-F (No. 5) | 3.0% |
| 5-H2ZB(F)-OCF3 (No. 7) | 4.0% |
| 3-HH2ZB(F)-OCF3 (No. 36) | 3.0% |
| 5-HH2ZB(F)-OCF3 (No. 37) | 3.0% |

-continued

| | |
|---|---|
| 5-HB-CL | 4.0% |
| 4-HHB(F)-F | 10.0% |
| 5-HHB(F)-F | 9.0% |
| 7-HHB(F)-F | 9.0% |
| 3-HHB(F,F)-F | 8.0% |
| 4-HHB(F,F)-F | 3.0% |
| 3-H2HB(F,F)-F | 12.0% |
| 3-HBB(F,F)-F | 13.0% |
| 2-HHBB(F,F)-F | 6.0% |
| 3-GHB(F,F)-F | 3.0% |
| 4-GHB(F,F)-F | 3.0% |
| 5-GHB(F,F)-F | 3.0% |

NI = 79.9 (° C.)
η = 26.6 (mPa · s)
Δn = 0.082
Δε = 8.0
Vth =1.65 (V)

EXAMPLE 39

| | |
|---|---|
| 3-HH2ZB(F,F)-F (No. 39) | 5.0% |
| 5-H2ZB(F,F)B(F)-F (No. 100) | 3.0% |
| 3-H2ZB(F)B(F,F)-F (No. 101) | 3.0% |
| 3-H2ZB(F,F)-C (No. 10) | 5.0% |
| 2-HHB(F)-F | 7.0% |
| 3-HHB(F)-F | 8.0% |
| 5-HHB(F)-F | 7.0% |
| 3-HHB(F,F)-F | 8.0% |
| 3-HBB(F,F)-F | 11.0% |
| 3-H2HB(F,F)-F | 10.0% |
| 3-HHEB(F,F)-F | 10.0% |
| 4-HHEB(F,F)-F | 3.0% |
| 2-HBEB(F,F)-F | 2.0% |
| 3-HBEB(F,F)-F | 3.0% |
| 3-GHB(F,F)-F | 3.0% |
| 4-GHB(F,F)-F | 4.0% |
| 5-GHB(F,F)-F | 4.0% |
| 3-HHBB(F,F)-F | 4.0% |

NI = 79.4 (° C.)
η = 35.5 (mPa · s)
Δn = 0.089
Δε = 11.8
Vth =1.40 (V)

EXAMPLE 40

| | |
|---|---|
| 3-H2ZB(F)-OCF3 (No. 6) | 4.0% |
| 3-H2ZB(F,F)B(F)-F (No. 99) | 4.0% |
| 7-HB(F)-F | 3.0% |
| 5-HB-CL | 3.0% |
| 3-HH-4 | 9.0% |
| 3-HH-EMe | 23.0% |
| 3-HHEB(F,F)-F | 10.0% |
| 4-HHEB(F,F)-F | 5.0% |
| 3-HHEB-F | 8.0% |
| 5-HHEB-F | 8.0% |
| 4-HGB(F,F)-F | 5.0% |
| 5-HGB(F,F)-F | 6.0% |
| 2-H2GB(F,F)-F | 4.0% |
| 3-H2GB(F,F)-F | 5.0% |
| 5-GHB(F,F)-F | 3.0% |

NI = 79.1 (° C.)
η = 19.5 (mPa · s)
Δn = 0.065
Δε = 5.8
Vth =1.79 (V)

EXAMPLE 41

| | |
|---|---|
| 3-H2ZB(F,F)B(F)-F (No. 99) | 4.0% |
| 5-H2ZB(F,F)B(F)-F (No. 100) | 5.0% |
| 3-H2ZB(F)B(F,F)-F (No. 101) | 7.0% |
| 5-H2ZB(F)B(F,F)-F (No. 102) | 8.0% |
| 3-H2HB(F,F)-F | 5.0% |
| 5-H2HB(F,F)-F | 5.0% |
| 3-HBB(F,F)-F | 20.0% |
| 5-HBB(F,F)-F | 16.0% |
| 5-HBB(F)B-2 | 10.0% |
| 5-HBB(F)B-3 | 10.0% |
| 3-BB(F)B(F,F)-F | 5.0% |
| 5-B2D(F,F)B(F)-F | 5.0% |

NI = 100.8 (° C.)
η = 53.6 (mPa · s)
Δn = 0.149
Δε = 11.8
Vth =1.50 (V)

EXAMPLE 42

| | |
|---|---|
| 3-HH2ZB(F,F)-F (No. 39) | 4.0% |
| 3-H2ZB(F,F)-F (No. 4) | 4.0% |
| 3-H2ZB(F)-OCF3 (No. 6) | 4.0% |
| 5-H2ZB(F)-OCF3 (No. 7) | 3.0% |
| 3-HH2ZB(F)-OCF3 (No. 36) | 3.0% |
| 5-H2ZB(F)B(F,F)-F (No. 102) | 3.0% |
| 3-HB(F,F)ZB(F,F)-F | 5.0% |
| 5-HB(F,F)ZB(F,F)-F | 5.0% |
| 5-HB-CL | 3.0% |
| 3-HH-4 | 14.0% |
| 2-HH-5 | 4.0% |
| 3-HHB-1 | 4.0% |
| 3-HHEB-F | 6.0% |
| 5-HHEB-F | 6.0% |
| 3-HHB(F,F)-F | 6.0% |
| 4-HHB(F,F)-F | 3.0% |
| 3-HHEB(F,F)-F | 3.0% |
| 4-HHEB(F,F)-F | 3.0% |
| 5-HHEB(F,F)-F | 2.0% |
| 2-HBEB(F,F)-F | 3.0% |
| 3-HBEB(F,F)-F | 3.0% |
| 5-HBEB(F,F)-F | 3.0% |
| 2-HHBB(F,F)-F | 3.0% |
| 3-HHBB(F,F)-F | 3.0% |

NI = 79.0 (° C.)
η = 18.6 (mPa · s)
Δn = 0.072
Δε = 7.6
Vth =1.69 (V)

EXAMPLE 43

| | |
|---|---|
| 3-HH2ZB(F,F)-F (No. 39) | 3.0% |
| 5-HH2ZB(F,F)-F (No. 40) | 3.0% |
| 3-H2ZB(F,F)-F (No. 4) | 4.0% |
| 5-H2ZB(F,F)-F (No. 5) | 3.0% |
| 3-H2ZB(F)-OCF3 (No. 6) | 4.0% |
| 5-H2ZB(F)-OCF3 (No. 7) | 3.0% |
| 3-HH2ZB(F)-OCF3 (No. 36) | 3.0% |
| 5-HH2ZB(F)-OCF3 (No. 37) | 3.0% |
| 3-H2ZB(F,F)B(F)-F (No. 99) | 3.0% |
| 5-H2ZB(F,F)B(F)-F (No. 100) | 2.0% |
| 3-H2ZB(F)B(F,F)-F (No. 101) | 4.0% |
| 5-H2ZB(F)B(F,F)-F (No. 102) | 3.0% |
| 3-BB(F,F)ZB(F,F)-F | 10.0% |
| 3-HH-4 | 8.0% |
| 3-HHB(F,F)-F | 6.0% |
| 3-H2HB(F,F)-F | 9.0% |

-continued

| | |
|---|---|
| 3-HBB(F,F)-F | 6.0% |
| 2-HHBB(F,F)-F | 3.0% |
| 3-HHBB(F,F)-F | 3.0% |
| 3-HH2BB(F,F)-F | 4.0% |
| 3-HHB-1 | 6.0% |
| 5-HBBH-1O1 | 7.0% |

NI = 83.2 (° C.)
η = 24.1 (mPa · s)
Δn = 0.095
Δε = 9.3
Vth =1.59 (V)

EXAMPLE 44

| | |
|---|---|
| 5-H2ZB(2F,3F)-O2 (No. 14) | 11.0% |
| 3-H2ZB(2F,3F)B(2F,3F)-O2 (No. 106) | 11.0% |
| 5-H2ZBB(F,F)B-2 (No. 182) | 6.0% |
| 5-H2ZBB(F,F)B-F (No. 184) | 6.0% |
| 3-HEB-O4 | 17.0% |
| 4-HEB-O2 | 15.0% |
| 5-HEB-O1 | 14.0% |
| 3-HEB-O2 | 12.0% |
| 5-HEB-O2 | 8.0% |

EXAMPLE 45

| | |
|---|---|
| 3-H2ZB(2F,3F)-O2 (No. 13) | 7.0% |
| 3-HH2ZB(2F,3F)-O2 (No. 46) | 6.0% |
| 5-HH2ZB(2F,3F)-O2 (No. 47) | 7.0% |
| 3-H2ZB(2F,3F)B(2F,3F)-O2 (No. 106) | 10.0% |
| 3-HH-2 | 5.0% |
| 3-HH-4 | 6.0% |
| 3-HH-O1 | 4.0% |
| 3-HH-O3 | 5.0% |
| 5-HH-O1 | 4.0% |
| 3-HB(2F,3F)-O2 | 8.0% |
| 5-HB(2F,3F)-O2 | 8.0% |
| 3-HHB(2F,3F)-O2 | 8.0% |
| 5-HHB(2F,3F)-O2 | 8.0% |
| 3-HHB(2F,3F)-2 | 14.0% |

NI = 89.2 (° C.)
Δn = 0.085
Δε = −3.7

EXAMPLE 46

| | |
|---|---|
| 5-H2ZB(2F,3F)-O2 (Uo. 14) | 5.0% |
| 3-HH2ZB(2F,3F)-O2 (No. 46) | 6.0% |
| 3-HH-5 | 5.0% |
| 3-HH-4 | 5.0% |
| 3-HH-O1 | 6.0% |
| 3-HH-O3 | 6.0% |
| 3-HB-O1 | 5.0% |
| 3-HB-O2 | 5.0% |
| 3-HB(2F,3F)-O2 | 8.0% |
| 5-HB(2F,3F)-O2 | 7.0% |
| 3-HHB(2F,3F)-O2 | 9.0% |
| 5-HHB(2F,3F)-O2 | 10.0% |
| 3-HHB(2F,3F)-2 | 4.0% |
| 2-HHB(2F,3F)-1 | 4.0% |
| 3-HHEH-3 | 5.0% |

-continued

| | |
|---|---|
| 3-HHEH-5 | 5.0% |
| 4-HHEH-3- | 5.0% |

NI = 87.4 (° C.)
Δn = 0.078
Δε = −3.1

EXAMPLE 47

| | |
|---|---|
| 5-H2ZB(2F,3F)-O2 (No. 14) | 3.0% |
| 5-HH2ZB(2F,3F)-O2 (No. 47) | 6.0% |
| 3-BB(2F,3F)-O2 | 9.0% |
| 3-BB(2F,3F)-O4 | 10.0% |
| 5-BB(2F,3F)-O4 | 10.0% |
| 2-BB(2F,3F)B-3 | 19.0% |
| 3-BB(2F,3F)B-5 | 13.0% |
| 5-BB(2F,3F)B-5 | 14.0% |
| 5-BB(2F,3F)B-7 | 16.0% |

NI = 78.9 (° C.)
Δn = 0.195
Δε = −3.5

EXAMPLE 48

| | |
|---|---|
| 3-H2ZB(2F,3F)-O2 (No. 13) | 3.0% |
| 3-H2ZB(2F,3F)B(2F,3F)-O2 (No. 106) | 4.0% |
| 3-HB-O1 | 15.0% |
| 3-HB-O2 | 6.0% |
| 3-HEB(2F,3F)-O2 | 8.0% |
| 4-HEB(2F,3F)-O2 | 8.0% |
| 5-HEB(2F,3F)-O2 | 8.0% |
| 2-BB2B-O2 | 6.0% |
| 3-BB2B-O2 | 6.0% |
| 5-BB2B-O1 | 6.0% |
| 5-BB2B-O2 | 6.0% |
| 1-B2BB(2F)-5 | 7.0% |
| 3-B2BB(2F)-5 | 7.0% |
| 5-B(F)BB-O2 | 7.0% |
| 3-BB(2F,3F)B-3 | 3.0% |

NI = 79.3 (° C.)
ηn = 23.4 (mPa · s)
Δn = 0.161

EXAMPLE 49

| | |
|---|---|
| 3-H2ZB(2F,3F)-O2 (No. 13) | 11.0% |
| 5-HH2ZB(2F,3F)-O2 (No. 47) | 6.0% |
| 3-H2ZB(2F,3F)B(2F,3F)-O2 (No. 106) | 3.0% |
| 3-HH-O1 | 8.0% |
| 5-HH-O1 | 4.0% |
| 3-HH-4 | 5.0% |
| 3-HB(2F,3F)-O2 | 10.0% |
| 5-HB(2F,3F)-O2 | 16.0% |
| 2-HHB(2F,3F)-1 | 4.0% |
| 3-HHB(2F,3F)-1 | 5.0% |
| 3-HHB(2F,3F)-O2 | 14.0% |
| 5-HHB(2F,3F)-O2 | 14.0% |

NI = 65.0 (° C.)
η = 24.9 (mPa · s)
Δn = 0.079
Δε = −3.9

EXAMPLE 50

| | |
|---|---|
| 3-HH2ZB(2F,3F)-O2 (No. 46) | 9.0% |
| 5-HH2ZB(2F,3F)-O2 (No. 47) | 9.0% |
| 3-H2ZB(2F,3F)B(2F,3F)-O2 (No. 106) | 14.0% |
| 3-HB-O1 | 15.0% |
| 3-HH-4 | 5.0% |
| 3-HB(2F,3F)-O2 | 12.0% |
| 5-HB(2F,3F)-O2 | 12.0% |
| 2-HHB(2F,3F)-1 | 5.0% |
| 3-HHB(2F,3F)-1 | 5.0% |
| 3-HHB(2F,3F)-O2 | 4.0% |
| 5-HHB(2F,3F)-O2 | 4.0% |
| 3-HHB-1 | 6.0% |

NI = 87.5 (° C.)
η = 41.7 (mPa · s)
Δn = 0.095
Δε = −3.2

EXAMPLE 51

| | |
|---|---|
| 3-H2ZB(2F,3F)-O2 (No. 13) | 6.0% |
| 5-H2ZB(2F,3F)-O2 (No. 14) | 6.0% |
| 3-HH2ZB(2F,3F)-O2 (No. 46) | 7.0% |
| 5-HH2ZB(2F,3F)-O2 (No. 47) | 7.0% |
| 3-H2ZB(2F,3F)B(2F,3F)-O2 (No. 106) | 10.0% |
| 3-HB-O1 | 15.0% |
| 3-HH-4 | 5.0% |
| 3-HB(2F,3F)-O2 | 6.0% |
| 5-HB(2F,3F)-O2 | 6.0% |
| 2-HHB(2F,3F)-1 | 7.0% |
| 3-HHB(2F,3F)-1 | 7.0% |
| 3-HHB(2F,3F)-O2 | 6.0% |
| 5-HHB(2F,3F)-O2 | 6.0% |
| 6-HEB(2F,3F)-O2 | 6.0% |

NI = 85.9 (° C.)
η = 39.3 (mPa · s)
Δn = 0.09
Δε = −3.3

EXAMPLE 52

| | |
|---|---|
| 3-H2ZB(2F,3F)-O2 (No. 13) | 5.0% |
| 3-HH2ZB(2F,3F)-O2 (No. 46) | 3.0% |
| 5-HH2ZB(2F,3F)-O2 (No. 47) | 3.0% |
| 3-HB-O2 | 20.0% |
| 1O1-HH-3 | 6.0% |
| 1O1-HH-5 | 5.0% |
| 3-HH-EMe | 7.0% |
| 4-HEB-O1 | 9.0% |
| 4-HEB-O2 | 7.0% |
| 5-HEB-O1 | 8.0% |
| 3-HHB-1 | 3.0% |
| 3-HHB-3 | 3.0% |
| 4-HEB(2CN,3CN)-O4 | 3.0% |
| 6-HEB(2CN,3CN)-O4 | 3.0% |
| 3-HEB(2CN,3CN)-O5 | 4.0% |
| 4-HEB(2CN,3CN)-O5 | 3.0% |
| 5-HEB(2CN,3CN)-O5 | 2.0% |
| 2-HBEB(2CN,3CN)-O2 | 2.0% |
| 4-HBEB(2CN,3CN)-O4 | 4.0% |

NI = 62.3 (° C.)
η = 41.1 (mpa · s)
Δn = 0.076
Δs = −6.0

EXAMPLE 53

| | |
|---|---|
| 3-HH2ZB(2F,3F)-O2 (No. 46) | 4.0% |
| 2O-B(2F,3F)2ZBH-3 (No. 201) | 4.0% |
| 3-HEB-O4 | 28.0% |
| 4-HEB-O2 | 20.0% |
| 5-HEB-O1 | 20.0% |
| 3-HEB-O2 | 18.0% |
| 5-HEB-O2 | 10.0% |

NI = 76.2 (° C.)
η = 22.0 (mPa · s)
Δn = 0.089

EXAMPLE 54

| | |
|---|---|
| 2O-B(2F,3F)2ZBH-3 (No. 201) | 14.0% |
| 3-HH-2 | 5.0% |
| 3-HH-4 | 6.0% |
| 3-HH-O1 | 4.0% |
| 3-HH-O3 | 5.0% |
| 5-HH-O1 | 4.0% |
| 3-HB(2F,3F)-O2 | 12.0% |
| 5-HB(2F,3F)-O2 | 11.0% |
| 5-HHB(2F,3F)-O2 | 15.0% |
| 3-HHB(2F,3F)-2 | 24.0% |

NI = 78.6 (° C.)
Δn = 0.080
Δε = −3.9

Effects of the Invention

The present invention provides a liquid crystalline compound, which is excellent in compatibility with other liquid crystalline compounds and has a low viscosity and a low threshold voltage.

The present invention also provides a novel liquid crystal composition comprising the above liquid crystalline compound as a component, which has the desired physical properties as shown in the above examples by suitably selecting rings, substituents and bonding groups constituting the above liquid crystalline compound, and further provides a liquid crystal display element comprising the above liquid crystal composition.

What is claimed is:

1. A liquid crystalline compound represented by Formula (1):

(1)

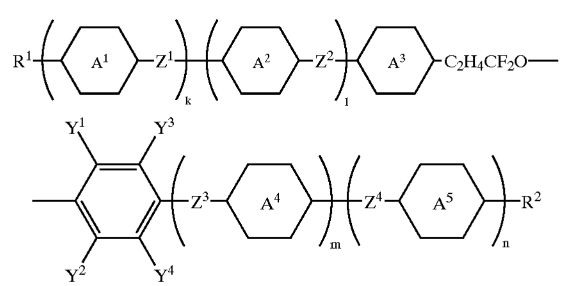

wherein $R^1$ and $R^2$ each independently represent hydrogen, halogen, a cyano group or an alkyl group having 1 to 20 carbon atoms, in which at least one —$CH_2$— may be substituted with —CH═CH—, —C≡C—, —O— or —S— but —O— is not adjacent to another —O—, and in which at least one hydrogen may be substituted with halogen; rings $A^1$ to $A^5$ each independently represent a 1,4-cyclohexylene group in which at least one —$CH_2$— not adjacent to each other may be substituted with —O— or —S—, a 1,4-cyclohexenylene group, or a 1,4-phenylene group in which at least one =CH— may be substituted with =N— and hydrogen on the ring may be substituted with halogen; $Z^1$ to $Z^4$ each independently represent a single bond, —$CH_2CH_2$—, —$CH_2O$—, —$OCH_2$—, —COO—, —OCO—, —CH=CH—, —C≡C—, —$CF_2O$— or —$OCF_2$—; $Y^1$, $Y^2$, $Y^3$ and $Y^4$ each independently represent hydrogen or fluorine; and k, l, m and n each independently represent 0 or 1.

2. The liquid crystalline compound as claimed in claim 1, which is represented by Formulas (1-1) to (1-6):

4. The liquid crystalline compound of Formula (1) as claimed in claim 1 , wherein both $Y^1$ and $Y^3$ are fluorine atoms, and both $Y^2$ and $Y^4$ are hydrogen atoms.

5. The liquid crystalline compound of Formula (1) as claimed in claim 1, wherein both $Y^1$ and $Y^2$ are hydrogens.

6. The liquid crystalline compound of Formula (1-1) as claimed in claim 2, wherein ring $A^3$ is a 1,4-cyclohexylene group, both $Y^1$ and $Y^3$ are fluorines, and both $Y^2$ and $Y^4$ are hydrogens.

7. The liquid crystalline compound of Formula (1-1) as claimed in claim 2, wherein ring $A^3$ is a 1,4-cyclohexylene group, and both $Y^1$ and $Y^2$ are hydrogens.

(1-1)

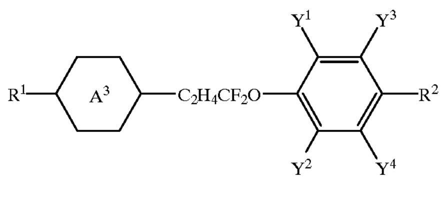

(1-2)

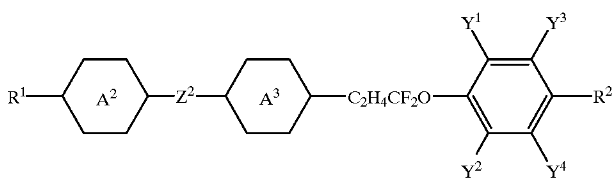

(1-3)

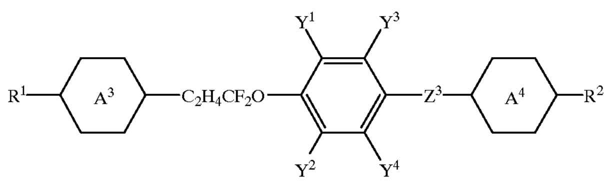

(1-4)

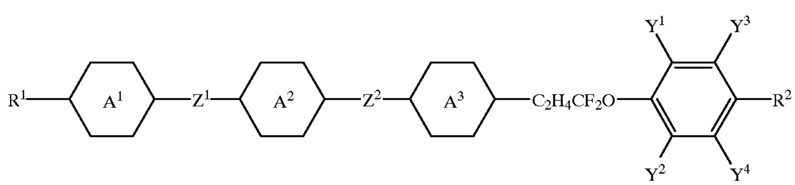

(1-5)

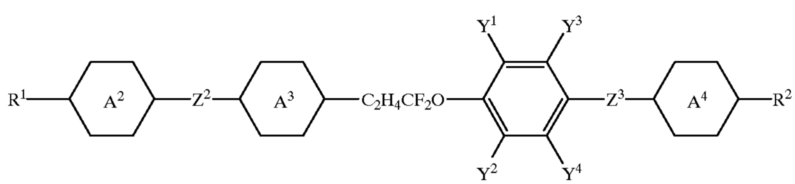

(1-6)

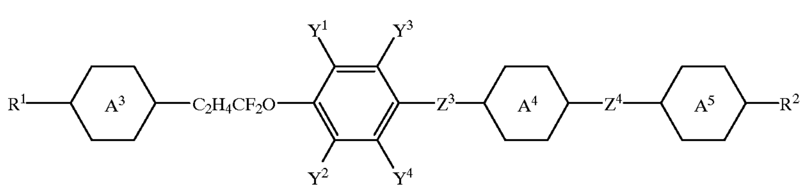

wherein $R^1$, $R^2$, rings $A^1$ to $A^5$, $Z^1$ to $Z^4$ and $Y^1$ to $Y^4$ have the same meanings as defined in claim 1.

3. The liquid crystalline compound of Formula (1) as claimed in claim 1, wherein ring $A^3$ is a 1,4-cyclohexylene group.

8. The liquid crystalline compound of Formula (1-2) as claimed in claim 2, wherein both ring $A^2$ and ring $A^3$ are 1,4-cyclohexylene groups, both $y^1$ and $Y^3$ are fluorines, and both $Y^2$ and $Y^4$ are hydrogens.

9. The liquid crystalline compound of Formula (1-2) as claimed in claim 2, wherein both ring $A^2$ and ring $A^3$ are 1,4-cyclohexylene groups, both $Y^1$ and $Y^3$ are hydrogens, both $Y^3$ and $Y^4$ are fluorines, and $R^2$ is an alkoxy group.

10. The liquid crystalline compound of Formula (1-2) as claimed in claim 2, wherein both ring $A^2$ and ring $A^3$ are 1,4-cyclohexylene groups; and both $Y^1$ and $Y^2$ are hydrogens.

11. The liquid crystalline compound of Formula (1-2) as claimed in claim 2, wherein both ring $A^2$ and ring $A^3$ are 1,4-cyclohexylene groups, both $Y^1$ and $Y^2$ are hydrogens, both $Y^3$ and $Y^4$ are fluorines, and $R^2$ is fluorine.

12. The liquid crystalline compound of Formula (1-2) as claimed in claim 2, wherein both ring $A^2$ and ring $A^3$ are 1,4-phenylene groups in which hydrogen on the ring may be substituted with fluorine, $Z^2$ is a single bond, both $Y^1$ and $Y^2$ are hydrogens, both $Y^3$ and $Y^4$are fluorines, and $R^2$ is fluorine.

13. The liquid crystalline compound of Formula (1-3) as claimed in claim 2, wherein ring $A^3$ is a 2,3-difluoro-1,4-phenylene group.

14. A liquid crystal composition comprising at least two components, at least one of which is a compound as claimed in claim 1.

15. A liquid crystal composition comprising at least one compound as claimed in claim 1 as a first component and at least one compound selected from the group consisting of compounds represented by Formulas (2), (3) and (4) as a second component:

(2)

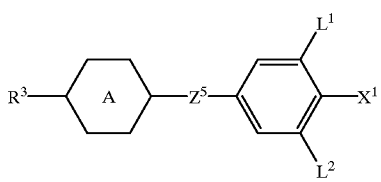

(3)

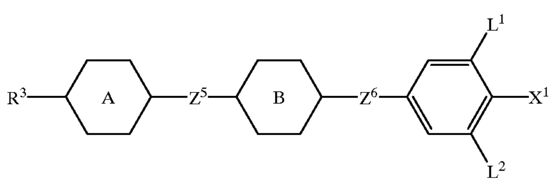

(4)

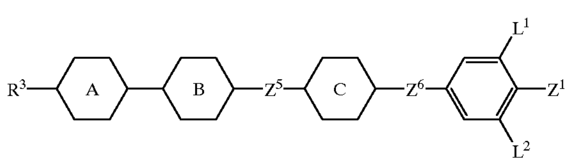

wherein $R^3$ represents an alkyl group having 1 to 10 carbon atoms, in which any —$CH_2$— not adjacent to each other may be substituted with —O— or —CH═CH— and any hydrogen may be substituted with fluorine; $X^1$ represents fluorine, chlorine, —$OCF_3$, —$OCF_2H$, —$CF_3$, —$CF_2H$, —$CFH_2$, —$OCF_2CF_2H$ or —$OCF_2CFHCF_3$; $L^1$ and $L^2$ each independently represent hydrogen or fluorine; $Z^5$ and $Z^6$ each independently represent —$(CH_2)_2$—, —$(CH_2)_4$—, —COO—, —$CF_2O$—, —$OCF_2$—, —CH═CH— or a single bond; rings A and B each independently represent 1,4-cyclohexylene, 1,3-dioxane-2,5-diyl, or 1,4-phenylene in which hydrogen may be substituted with fluorine; and ring C represents 1,4-cyclohexylene or 1,4-phenylene in which hydrogen may be substituted with fluorine.

16. A liquid crystal composition comprising at least one compound as cl-aimed in claim 1 as a first component and at least one compound selected from the group consisting of compounds represented by Formulas (5) and (6) as a second component:

(5)

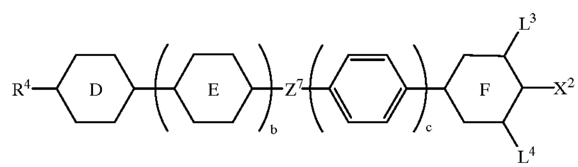

(6)

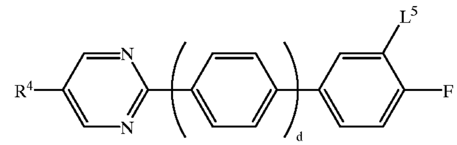

wherein $R^4$ and $R^5$ each independently represent an alkyl group having 1 to 10 carbon atoms, in which any —$CH_2$— not adjacent to each other may be substituted with —O— or —CH═CH— and any hydrogen may be substituted with fluorine; $X^2$ represents —CN or —C≡C—CN; ring D represents 1,4-cyclohexylene, 1,4-phenylene, 1,3-dioxane-2,5-diyl or pyrimidine-2,5-diyl; ring E represents 1,4-cyclohexylene, 1,4-phenylene in which hydrogen may be substituted with fluorine, or pyrimidine-2,5-diyl; ring F represents 1,4-cyclohexylene or 1,4-phenylene; $Z^7$ represents —$(CH_2)_2$—, —COO—, —$CF_2O$—, —$OCF_2$— or a single bond; $L^3$, $L^4$ and $L^5$ each independently represent hydrogen or fluorine; and b, c and d each independently represent 0 or 1.

17. A liquid crystal composition comprising at least one compound as claimed in claim 1 as a first component and at least one compound selected from the group consisting of compounds represented by Formulas (7), (8) and (9) as a second component:

(7)

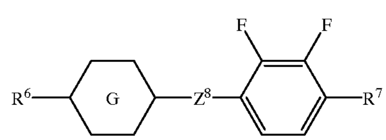

(8)

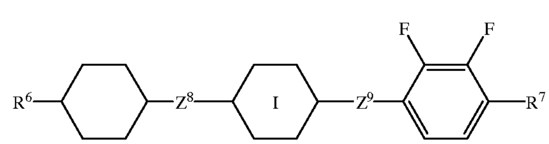

(9)

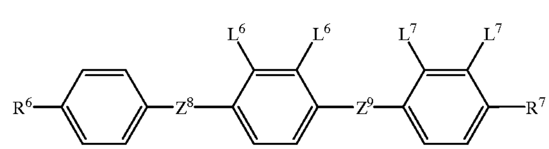

wherein $R^6$ and $R^7$ each independently represent an alkyl group having 1 to 10 carbon atoms, in which any —$CH_2$— not adjacent to each other may be substituted with —O— or —CH═CH— and any hydrogen may be substituted with fluorine; rings G and I each independently represent 1,4-cyclohexylene or 1,4-phenylene; $L^6$ and $L^7$ each independently represent hydrogen or fluorine, but $L^6$ and $L^7$ are not hydrogens at the same time; and $Z^8$ and $Z^9$ each independently represent —$(CH_2)_2$—, —COO— or a single bond.

18. A liquid crystal composition comprising at least one compound as claimed in claim 1 as a first component, at least one compound selected from the group consisting of the compounds represented by Formulas (2), (3) and (4) as a second component and at least one compound selected from the group consisting of compounds represented by Formulas (10), (11) and (12) as a third component:

(2)

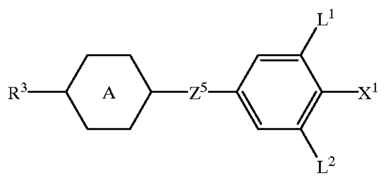

(3)

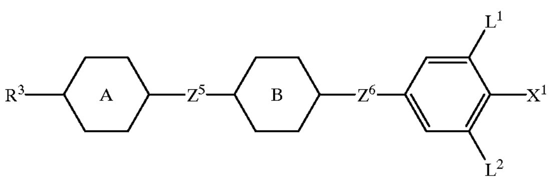

(4)

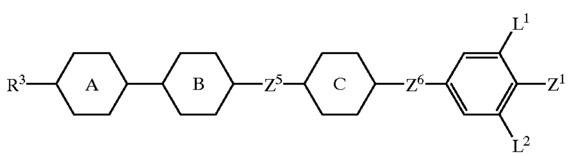

wherein $R^3$ represents an alkyl group having 1 to 10 carbon atoms, in which any —$CH_2$— not adjacent to each other may be substituted with —O— or —CH═CH— and any hydrogen may be substituted with fluorine; $X^1$ represents fluorine, chlorine, —$OCF_3$, —$OCF_2H$, —$CF_3$, —$CF_2H$, —$CFH_2$, —$OCF_2CF_2H$ or —$OCF_2CFHCF_3$; $L^1$ and $L^2$ each independently represent hydrogen or fluorine; $Z^5$ and $Z^6$ each independently represent —$(CH_2)_2$—, —$(CH_2)_4$—, —COO—, —$CF_2O$—, —$OCF_2$—, —CH═CH— or a single bond; rings A and B each independently represent 1,4-cycloheXylene, 1,3-dioxane -2,5-diyl, or 1,4-phenylene in which hydrogen may be substituted with fluorine; and ring C represents 1,4-cyclchexylene or 1,4-phenylene in which hydrogen may be substituted with fluorine.)

(10)

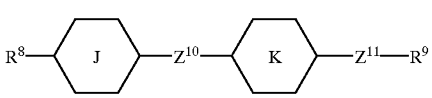

(11)

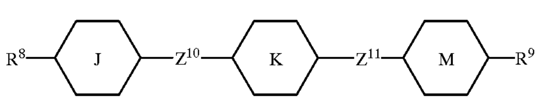

-continued (12)

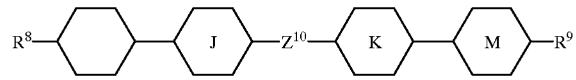

wherein $R^8$ and $R^9$ each independently represent an alkyl group having 1 to 10 carbon atoms, in which any —$CH_2$— not adjacent to each other may be substituted with —O— or —CH═CH— and any hydrogen may be substituted with fluorine; rings J, K and M each independently represent 1,4-cyclohexylene, pyrimidine-2,5-diyl, or 1,4-phenylene in which hydrogen may be substituted with fluorine; and $Z^{10}$ and $Z^{11}$ each independently represent —C≡—, —COO—, —$(CH_2)_2$—, —CH═CH— or a single bond.

19. A liquid crystal composition comprising at least one compound as claimed in claim 1 as a first component, at least one compound selected from the group consisting of the compounds represented by Formulas (5) and (6) as a second component and at least one compound selected from the group consisting of the compounds represented by Formulas (10), (11) and (12) as a third component:

(5)

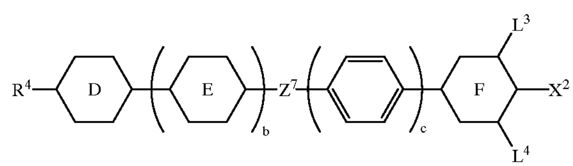

(6)

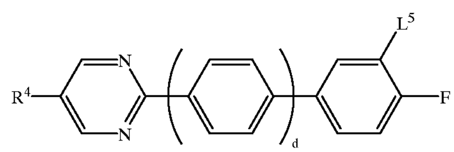

wherein $R^4$ and $R^5$ each independently represent an alkyl group having 1 to 10 carbon atoms, in which any —$CH_2$— not adjacent to each other may be substituted with —O— or —CH═CH— and any hydrogen may be substituted with fluorine; $X^2$ represent —CN or —C≡C—CN; ring D represents 1,4-cyclohexylene, 1,4-phenylene, 1,3-dioxane-2,5-diyl or pyrimidine-2,5-diyl; ring E represents 1,4-cyclohexylene, 1,4-phenylene in which hydrogen may be substituted with fluorine, or pyrimidine-2,5-diyl; ring F represents 1,4- cyclohexylene or 1,4-phenylene; $Z^7$ represents —$(CH_2)_2$—, —COO—, —$CF_2O$—, —$OCF_2$— or a single bond; $L^3$, $L^4$ and $L^5$ each independently represent hydrogen or fluorine; and b, c and d each independently represent 0 or 1, (10)

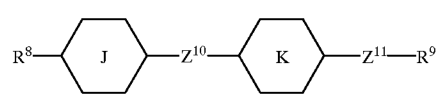

(11)

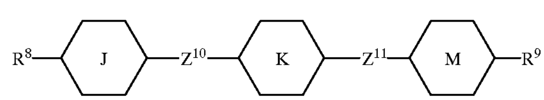

-continued (12)

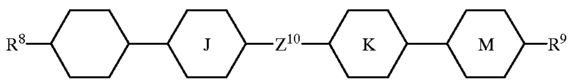

wherein $R^8$ and $R^9$ each independently represent an alkyl group having 1 to 10 carbon atoms, in which any —$CH_2$— not adjacent to each other may be substituted with —O— or —CH═CH—and any hydrogen may be substituted with fluorine; rings J, K and M each independently represent 1,4-cyclohexylene, pyrimidine-2,5-diyl, or 1,4-phenylene in which hydrogen may be substituted with fluorine; and $Z^{10}$ and $Z^{11}$ each independently represent —C≡C—, —COO—, —$(CH_2)_2$—, —CH═CH— or a single bond.

20. A liquid crystal composition comprising at least one compound as claimed in claim 1 as a first component, at least one compound selected from the group consisting of the compounds represented by Formulas (7), (8) and (9) as a second component and at least one compound selected from the group consisting of the compounds represented by Formulas (10), (11) and (12) as a third component:

(7)

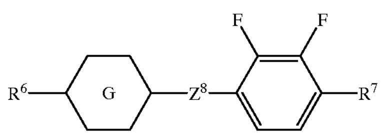

(8)

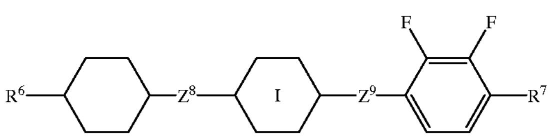

(9)

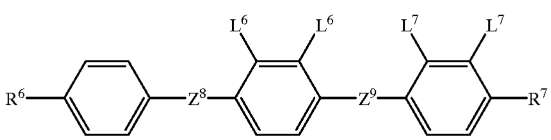

wherein $R^6$ and $R^7$ each independently represent an alkyl group having 1 to 10 carbon atoms, in which any —$CH_2$— not adjacent to each other may be substituted with —O— or —CH═CH— and any hydrogen may be substituted with fluorine; rings G and I each independently represent 1,4-cyclohexylene or 1,4-phenylene; $L^6$ and $L^7$ each independently represent hydrogen or fluorine, but $L^6$ and $L^7$ are not hydrogens at the same time; and $Z^8$ and $Z^9$ each independently represent —$(CH_2)_2$—, —COO— or a single bond, (10)

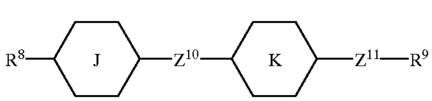

(11)

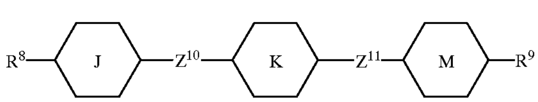

-continued (12)

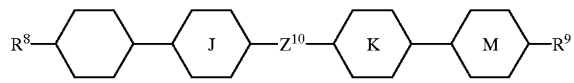

wherein $R^8$ and $R^9$ each independently represent an alkyl group having 1 to 10 carbon atoms, in which any —$CH_2$— not adjacent to each other may be substituted with —O— or —CH═CH— and any hydrogen may be substituted with fluorine; rings J, K and M each independently represent 1,4-cyclohexylene, pyrimidine-2,5-diyl, or 1,4-phenylene in which hydrogen may be substituted with fluorine; and $Z^{10}$ and $Z^{11}$ each independently represent —C≡C—, —COO—, —$(CH_2)_2$—, —CH═CH— or a single bond.

21. A liquid crystal composition comprising at least one compound as claimed in claim 1 as a first component, at least one compound selected from the group consisting of the compounds represented by Formulas (2), (3) and (4) as a second component, at least one compound selected from the group consisting of the compounds represented by Formulas (5) and (6) as a third component and at least one compound selected from the group consisting of the compounds represented by Formulas (10), (11) and (12) as a fourth component:

(2)

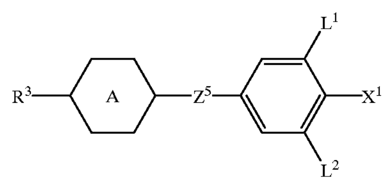

(3)

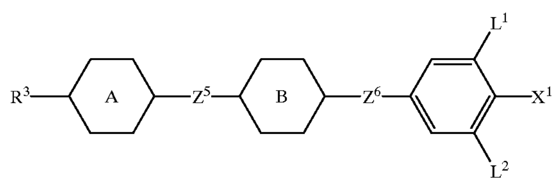

(4)

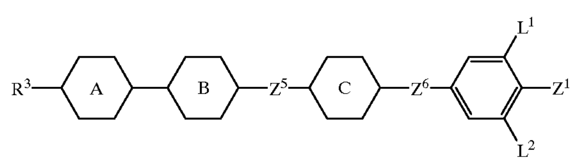

wherein $R^3$ represents an alkyl group having 1 to 10 carbon atoms, in which any —$CH_2$— not adjacent to each other may be substituted with —O— or —CH═CH— and any hydrogen may be substituted with fluorine; $X^1$ represents fluorine, chlorine, —$OCF_3$, —$OCF_2H$, —$CF_3$ , —$CF_2H$, —$CFH_2$, —$OCF_2CF_2H$ or —$OCF_2CFHCF_3$; $L^1$ and $L^2$ each independently represent hydrogen or fluorine; $Z^5$ and $Z^6$ each independently represent —$(CH_2)_2$—, —$(CH_2)_4$—, —COO—, —$CF_2O$—, —$OCF_2$—, —CH═CH— or a single bond; rings A and B each independently represent 1,4-cyclohexylefle, 1,3-dioxane -2,5-diyl, or 1,4-phenylene in which hydrogen may be substituted with fluorine; and ring C represents 1,4-cyclohexylene or 1,4-phenylene in which hydrogen may be substituted with fluorine, (5)

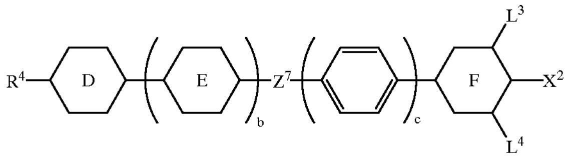

(6)

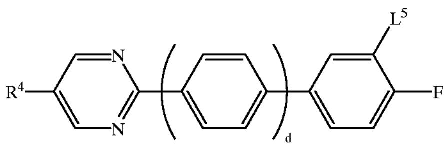

wherein $R^4$ and $R^5$ each independently represent an alkyl group having 1 to 10 carbon atoms, in which any —$CH_2$— not adjacent to each other may be substituted with —O— or —CH═CH— and any hydrogen may be substituted with fluorine; $X^2$ represents —CN or —C≡C—CN; ring D represents 1,4- cyclohexylene, 1,4-phenylene, 1,3-dioxane-2,5-diyl or pyrimidine-2,5-diyl; ring E represents 1,4-cyclohexylene, 1,4-pheflylefle in which hydrogen may be substituted with fluorine, or pyrimidine-2,5-diyl ring F represents 1,4-cyclohexylerle or 1,4-phenylene $Z^7$ represents —$(CH_2)_2$—, —COO—, —$CF_2O$—, —$OCF_2$— or a single bond; $L^3$, $L^4$ and $L^5$ each independently represent hydrogen or fluorine and b, c and d each independently represent 0 or 1, (10)

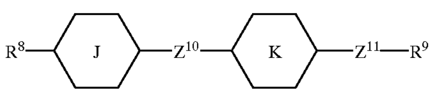

(11)

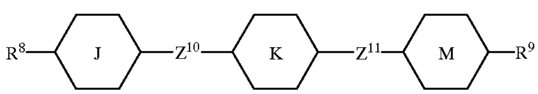

-continued (12)

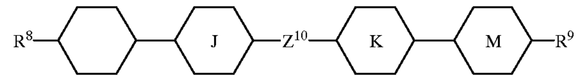

wherein $R^8$ and $R^9$ each independently represent an alkyl group having 1 to 10 carbon atoms, in which any —$CH_2$— not adjacent to each other may be substituted with —O— or —CH═CH— and any hydrogen may be substituted with fluorine; rings J, K and M each independently represent 1,4-cyclohexylene, pyrimidine-2,5-diyl, or 1,4-phenylene in which hydrogen may be substituted with fluorine; and $Z^{10}$ and $Z^{11}$ each independently represent —C≡C—, —COO—, —$(CH_2)_2$—, —CH═CH— or a single bond.

22. A liquid crystal composition comprising the liquid crystal composition as claimed in claim 14, and further, at least one optically active compound.

23. A liquid crystal display element comprising the liquid crystal composition as claimed in claim 14.

24. A liquid crystal display element comprising the liquid crystal composition as claimed in claim 22.

25. A compound having the following formula:

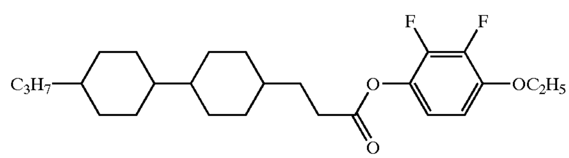

* * * * *